(12) United States Patent
Nanut et al.

(10) Patent No.: US 8,553,440 B1
(45) Date of Patent: Oct. 8, 2013

(54) POWER CONVERSION CIRCUITS

(76) Inventors: James Nanut, Toorak (AU); Pia Nanut, Toorak (AU)

( * ) Notice: Subject to any disclaimer, the term of this patent is extended or adjusted under 35 U.S.C. 154(b) by 254 days.

(21) Appl. No.: 12/890,311

(22) Filed: Sep. 24, 2010

(51) Int. Cl.
*H02M 7/155* (2006.01)

(52) U.S. Cl.
USPC .......................................................... 363/129

(58) Field of Classification Search
USPC .......................................... 363/44, 128–129
See application file for complete search history.

(56) References Cited

U.S. PATENT DOCUMENTS

| | | | | |
|---|---|---|---|---|
| 3,838,330 | A | * | 9/1974 | Rosa .............................. 363/129 |
| 4,255,784 | A | * | 3/1981 | Rosa .............................. 363/129 |
| 4,276,589 | A | | 6/1981 | Okawa et al. |
| 4,366,532 | A | * | 12/1982 | Rosa et al. ..................... 363/129 |
| 4,460,950 | A | * | 7/1984 | Finney ........................... 363/129 |
| 6,657,633 | B1 | | 12/2003 | Casey |
| 7,050,313 | B2 | * | 5/2006 | Huang et al. .................. 363/128 |

FOREIGN PATENT DOCUMENTS

GB  2108784 A  5/1983

OTHER PUBLICATIONS

International Search Report and Written Opinion mailed Feb. 27, 2012, for International Application No. PCT/IB2011/002171, 11 pages.

* cited by examiner

*Primary Examiner* — Jue Zhang
(74) *Attorney, Agent, or Firm* — Blakely Sokoloff Taylor & Zafman LLP

(57) ABSTRACT

According to one embodiment, an AC power system includes a first AC/DC converter to be coupled to a direct current (DC) load and a multi-phase AC power supply. The system further includes a second AC/DC converter coupled in parallel with the first AC/DC converter via an interphase transformer to the DC load and the multi-phase AC power supply. The system further includes a controller coupled to the first and second AC/DC converters, where the controller is configured to generate a gate trigger signal for firing each of the rectifiers for the first and second AC/DC converters. During a first power cycle, a rectifier of the first AC/DC converter is fired at a firing angle advanced to a firing angle of a corresponding rectifier of the second DC/DC converter. During a second power cycle, the rectifier of the first AC/DC converter is fired at a firing angle lagging to a firing angle of the corresponding rectifier of the second AC/DC converter.

17 Claims, 40 Drawing Sheets

POWER CONVERSION CIRCUITS

FIELD OF THE INVENTION

The present invention relates generally to power conversion technologies. More particularly, this invention relates to power conversion circuits.

BACKGROUND

Conversion of three-phase power has found many industrial applications throughout this century. The proportion of converters connected to the supply grid has reached high levels in the industrialized world. In its simplest and most economical form, conversion of three-phase power is achieved by controlling the supply current in six steps per power supply cycle.

FIG. 1 is a schematic diagram illustrating a typical six-pulse AC to DC converter. Referring to FIG. 1, a typical converter 100 includes a three-phase alternating current (AC) power supply 101 coupled to each of three inductors or alternate current (AC) reactors (or inductors) 110-112, each connected to a pair of rectifiers 103 and 106, 104 and 107, 105 and 108, respectively. Rectifiers 103-108 are controlled or switched on by a controller or gate trigger circuit 102 to provide a DC output (DC voltage and DC current) to a DC load 109. Reactors 110-112 (also referred to as AC chokes or inductors) and DC load 109 (which can be considered a resistance in series with a DC reactor, sometimes in combination with a battery and/or capacitor) are combined to limit the rate of rise of current and smooth the DC ripple current, respectively. Other electrical components, typically used for protection from overvoltage and rate of change of voltage, protection, detection etc have been omitted from FIG. 1 for the purpose of simplicity and clarity.

A control voltage generated by controller 102 determines a delay angle alpha, α (also referred to as a firing angle), for rectifiers 103-108. The alpha delay angle is used to control the DC voltage and/or DC current magnitude. Each rectifier switches once per power cycle (or period). For a constant control voltage signal each of rectifiers 103-108 is triggered on at a constant delay angle of α degrees past its anode-cathode voltage crossover point (in this example, α is approximately 90 degrees as the load is considered mostly reactive), resulting in a corresponding phase shift between line voltage and line current in each phase, and a change in DC voltage (or DC current). Voltages 113-115 are phased to neutral voltages, each being displaced by 120 degrees from each other. Considering 113 as a reference 114 lags 113 by 120 degrees, 115 lags 113 by 240 degrees. Voltage V1 is equal to the difference between 113 and 115; voltage V2 is the difference between 114 and 113; and voltage V3 is the difference between 115 and 114.

Waveform 201 of FIG. 2 shows the three-phase supply line to line voltages V1, V2 and V3 connected to the AC terminals of the bridge. T0 of V1, V2, V3 in waveform 201 is referred to as the anode-cathode zero voltage crossover point for thyristors 103, 104 and 105, respectively. T0 of V1, V2, V3 in waveform 301 is referred to as the anode-cathode zero voltage crossover point for thyristors 106, 107 and 108, respectively. The delay time between anode-cathode voltage crossover point (e.g. T0 in Waveform 201) and rectifier firing signal (e.g. waveform 203-205), typically measured in degrees, is known as the alpha control angle of the three-phase bridge. In steady state conditions the alpha control angle is substantially the same for each of rectifiers 103-108. In waveform 201 this is approximately 90 degrees (shown). For a constant control voltage from controller 102 the delay angle, or alpha, is substantially the same for each power cycle. As can be seen, each rectifier begins conducting at the same delay angle to its corresponding supply voltage, producing a three-phase AC current in reactors 110-112 that is 90 degrees out of phase with the three-phase supply voltage.

Waveforms 201 and 301 of FIGS. 2 and 3 show the three-phase line to line supply voltage for the converter. Waveform 202 shows the current through rectifiers 103-105, and waveform 203-205 shows the gate trigger signals generated by controller 102 to rectifiers 103-105. Waveform 302 shows the current through rectifiers 106-108 (labeled) and waveforms 303-305 show the gate trigger signals generated by controller 102 to rectifiers 106-108. Gate trigger signals, for the positive and negative groups, are only required to turn the rectifier on in a three-phase bridge. In this example, the rectifiers are considered to be thyristors. Hence the turn on of the next device in the series of the same group will switch off the previous device in the series of the same group.

For example, in the positive group of thyristors 103-105, turn on of device 104 will turn off device 103. Turn on of device 105 will turn off device 104 and so on. Using waveform 201 as a reference, two power cycles of duration "period 1" are shown in FIG. 2, where the delay angle of thyristors 103, 104 and 105 is substantially the same in each cycle. The rectifiers belonging to the positive group, 103-105, are switched in the same sequence in each period. The current in each rectifier is phase shifted by 90 degrees from its corresponding phase to neutral supply voltage. As can be seen in FIG. 3, using waveform 301 as a reference, the delay angle of rectifiers 106, 107 and 108 are substantially the same in each cycle. Waveform 302 shows the rectifiers of the negative group of rectifiers 106-108 are switched in the same sequence in each period. The current in each rectifier is phase shifted by 90 degrees from its corresponding phase to neutral supply voltage.

FIG. 4 shows the AC current in each phase of the bridge. The resulting AC current waveform, observed through chokes 110, 111, and 112 is a quasi-square waveform with a conduction angle of substantially 120 degrees in the positive half cycle and substantially 120 degrees in the negative half cycle, substantially regardless of the alpha control angle. Waveform 321 shows the three-phase line to line voltage reference V1, V2 and V3. The resultant line current waveforms flowing through inductors 110-112 are shown in waveforms 322-324, respectively. The DC current and voltage across load 109 is shown in waveform 325 and 326, respectively. As can be seen the DC current contains 6 "pulses" per period, or a ripple of 300 Hz (in this example the supply is 50 Hz). The gate trigger signals to each rectifier, generated by controller 102, are shown in FIG. 5. Waveform 341 shows the three-phase line to line AC supply voltage V1, V2, and V3. Waveforms 342-347 show the gate trigger signals to each rectifier 103-108 respectively, shown over a minimum of four cycles.

Each of the AC line current waveforms (322-324) contains in practice at least 20% of fifth harmonic current (in addition to higher order harmonics) which contributes to voltage distortion of the AC supply at the point at which the converter is connected. Further, presence of harmonics in the AC supply can cause misoperation, misfiring or shutdown of sensitive equipment connected to the same AC bus, overvoltage due to harmonic resonance with passive components connected to the network, etc. Various worldwide regulations, standards, and user specifications require converter manufacturers to substantially reduce the harmonic currents generated by new equipment (i.e. IEEE 519).

There are various harmonic mitigation techniques that can be used. In one conventional approach, a harmonic filter is utilized that is tuned to the frequency of the problematic harmonic on the network. A filter connected at the terminals of the three-phase bridge provides a low impedance shunt pathway at the frequency of the harmonic targeted, but high impedance for all other frequencies, thereby preventing the harmonic travelling upstream to the AC supply network and affecting other users connected to the same supply. However, as harmonic currents increase with load, there is generally a need to switch filters in discrete steps to compensate for changes in harmonic currents, and to avoid an adverse effect on the power factor seen by the supply network due to the inserted filter. Also, expensive and inefficient blocking reactors may be required to avoid filter overloading by harmonics produced elsewhere in the plant or in the supply network. Generally a plant fitted with filters requires preliminary studies to be made and careful designs to be completed before installing new equipment. Filters can reduce harmonics if properly designed, but can also amplify harmonics when changes to the plant supply are made. Harmonic filters are also a cost burden that a client must pay in addition to the original purchase of electronic equipment in order to comply with standards.

In another conventional approach, phase shifting of the AC supply voltage is used as a method to cancel harmonics. With this method, three incoming phases are split into two groups of isolated three phases and phase shifted with respect to each other by 30 degrees. If the converters equally share the load, the addition of their AC currents may cancel the fifth harmonic current. However, phase shifting of the AC supply requires the use of one or more transformers. This substantially increases the costs, operating losses, and equipment size and weight of converting equipment. A typical three-phase transformer typically costs and weighs more than the AC/DC converter that is connected to it. Despite the significant disadvantages associated with both of these methods, they remain the dominant techniques of alleviating harmonic distortion in AC power conversion systems.

SUMMARY OF THE DESCRIPTION

According to one embodiment, an AC power system includes a first AC/DC converter to be connected to a direct current (DC) load and a multi-phase AC power supply, the first AC/DC converter having multiple rectifiers. The system further includes a second AC/DC converter with its AC terminals connected in parallel with the first AC/DC converter and its DC terminals connected in parallel via an interphase transformer. The load is connected between the midpoints (or center tap) of the interphase transformers. The second AC/DC converter has multiple rectifiers. The system further includes a controller coupled to the first and second AC/DC converters, where the controller is configured to generate a gate trigger signal for firing each of the rectifiers for the first and second AC/DC converters. During a first power cycle, a rectifier of the first AC/DC converter is fired at a firing angle advanced to a firing angle of the corresponding rectifier of the second DC/DC converter. During a second power cycle, the rectifier of the first AC/DC converter is fired at a firing angle lagging to the firing angle of the corresponding rectifier of the second AC/DC converter.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
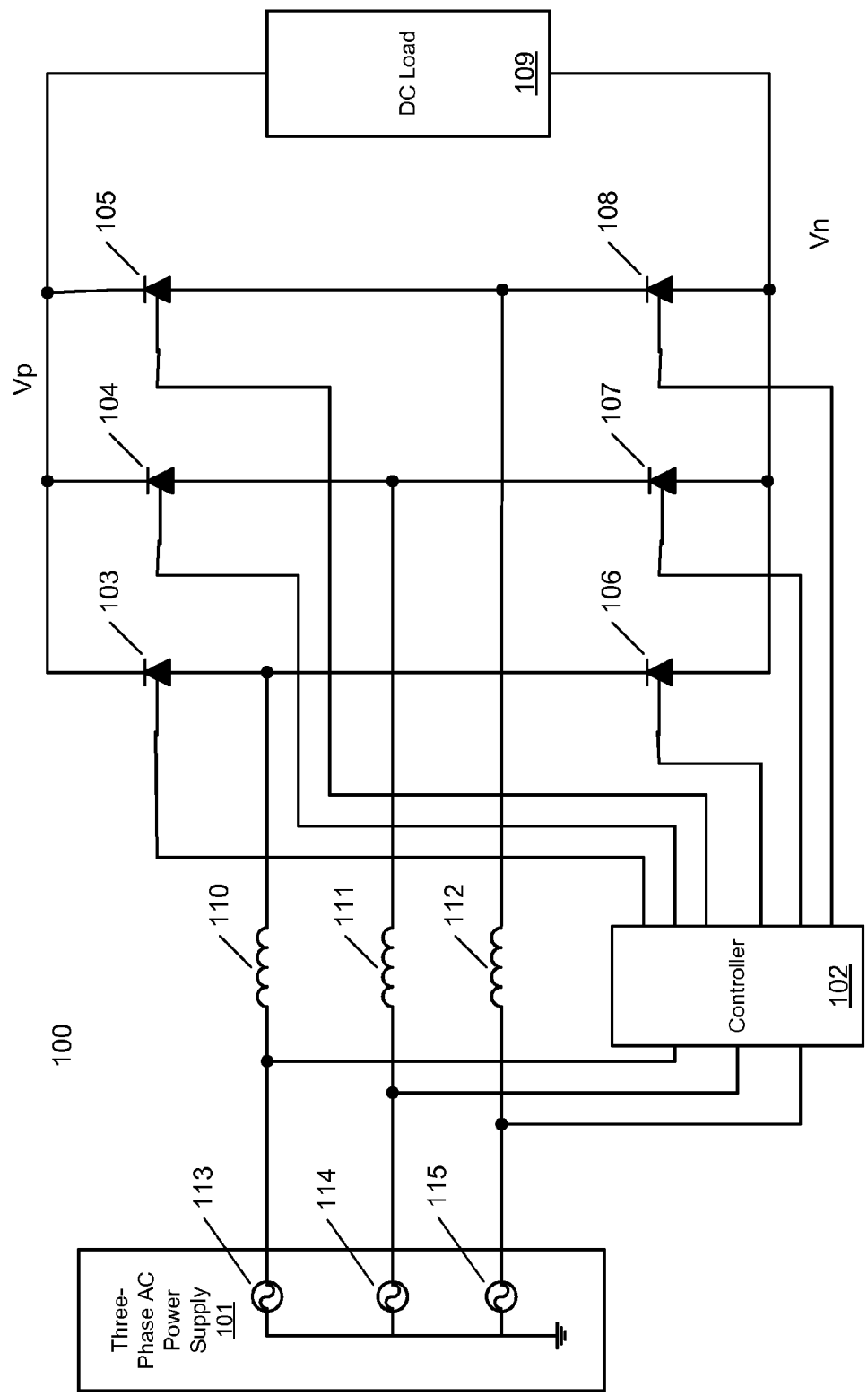
FIG. 1 is a schematic diagram illustrating a typical six-pulse converter.
Figure 2:
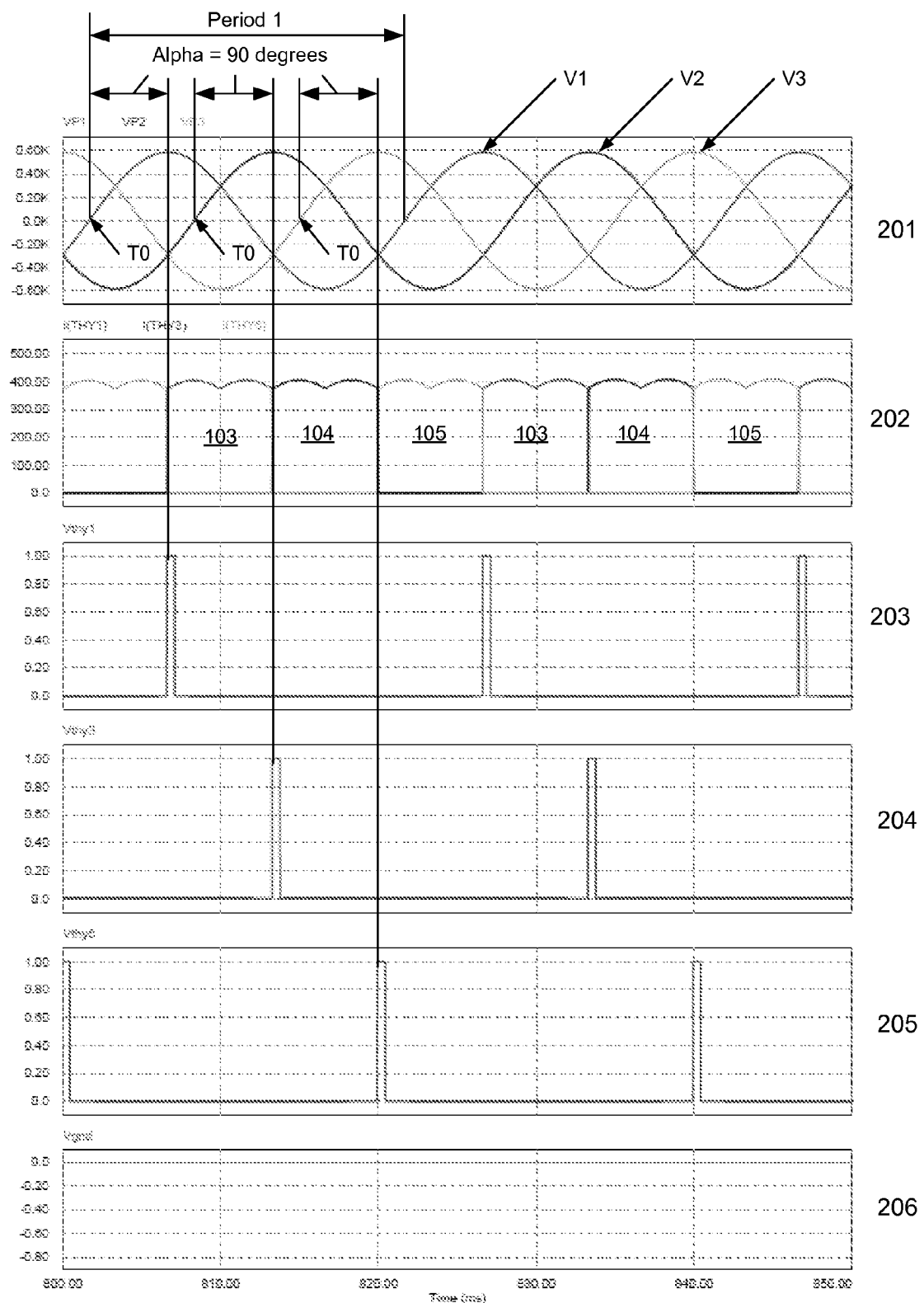
FIGS. 2-5 show certain signals of a typical six-pulse converter as shown in FIG. 1.
Figure 3:
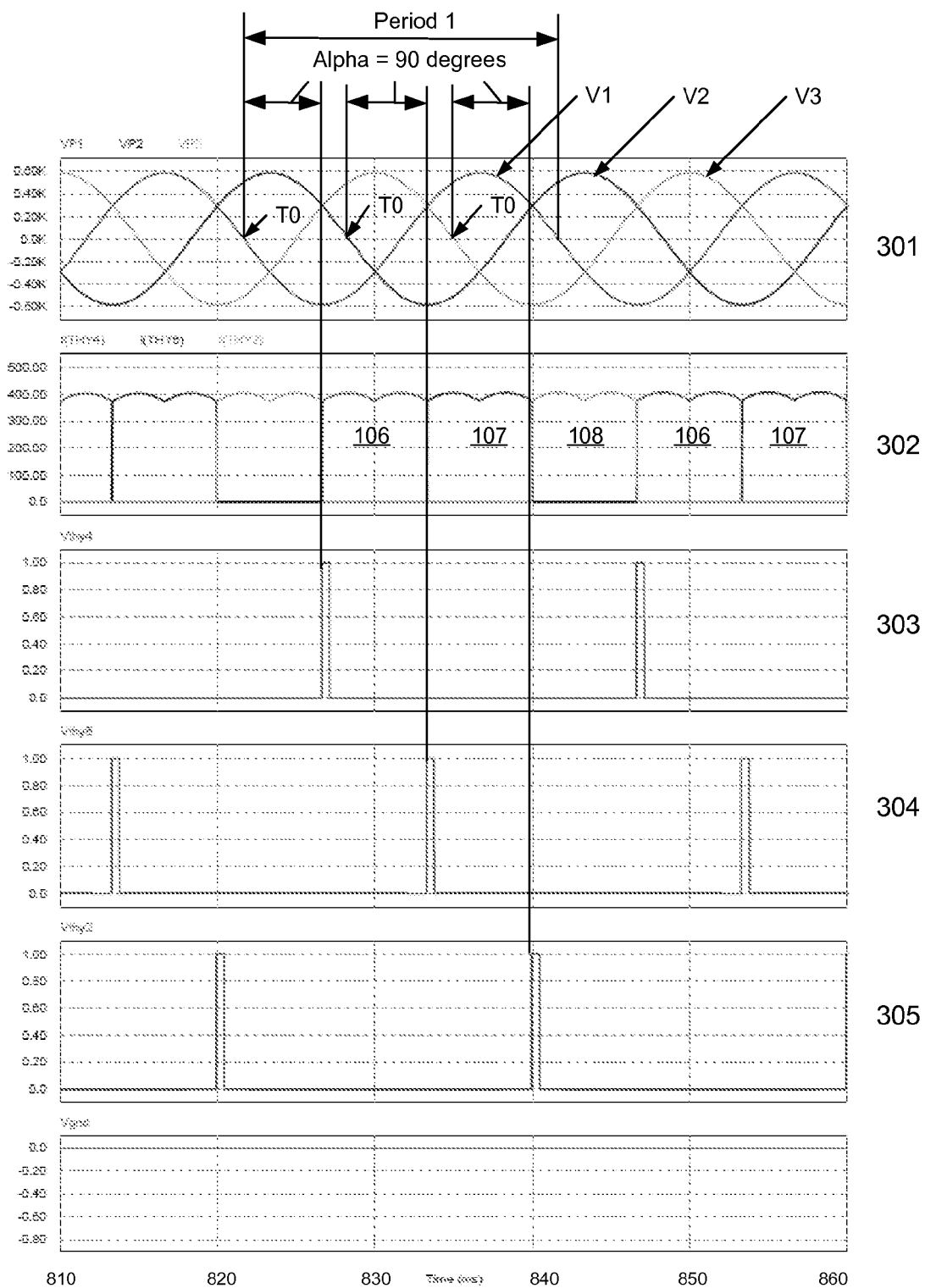
Figure 4:
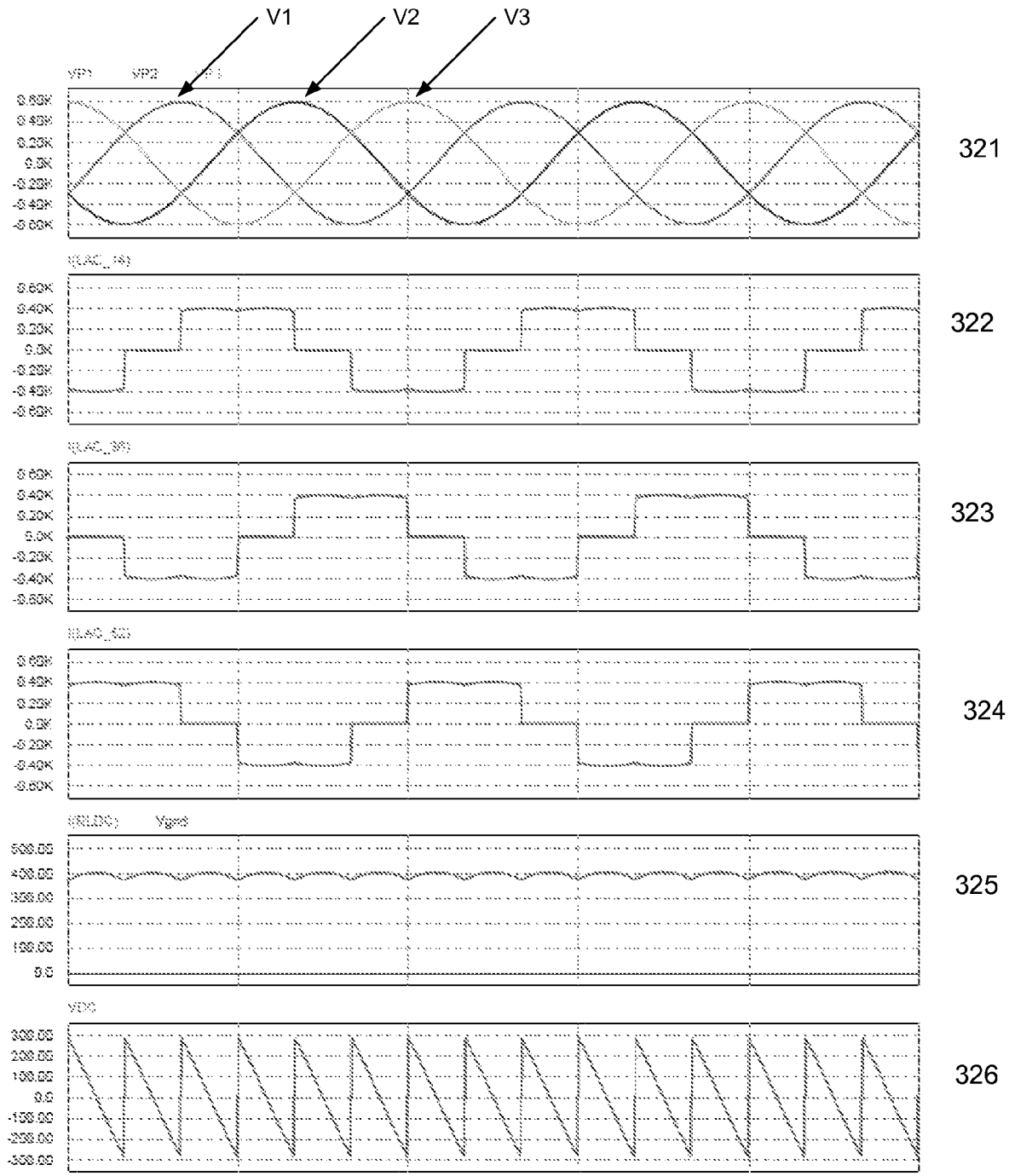
Figure 5:
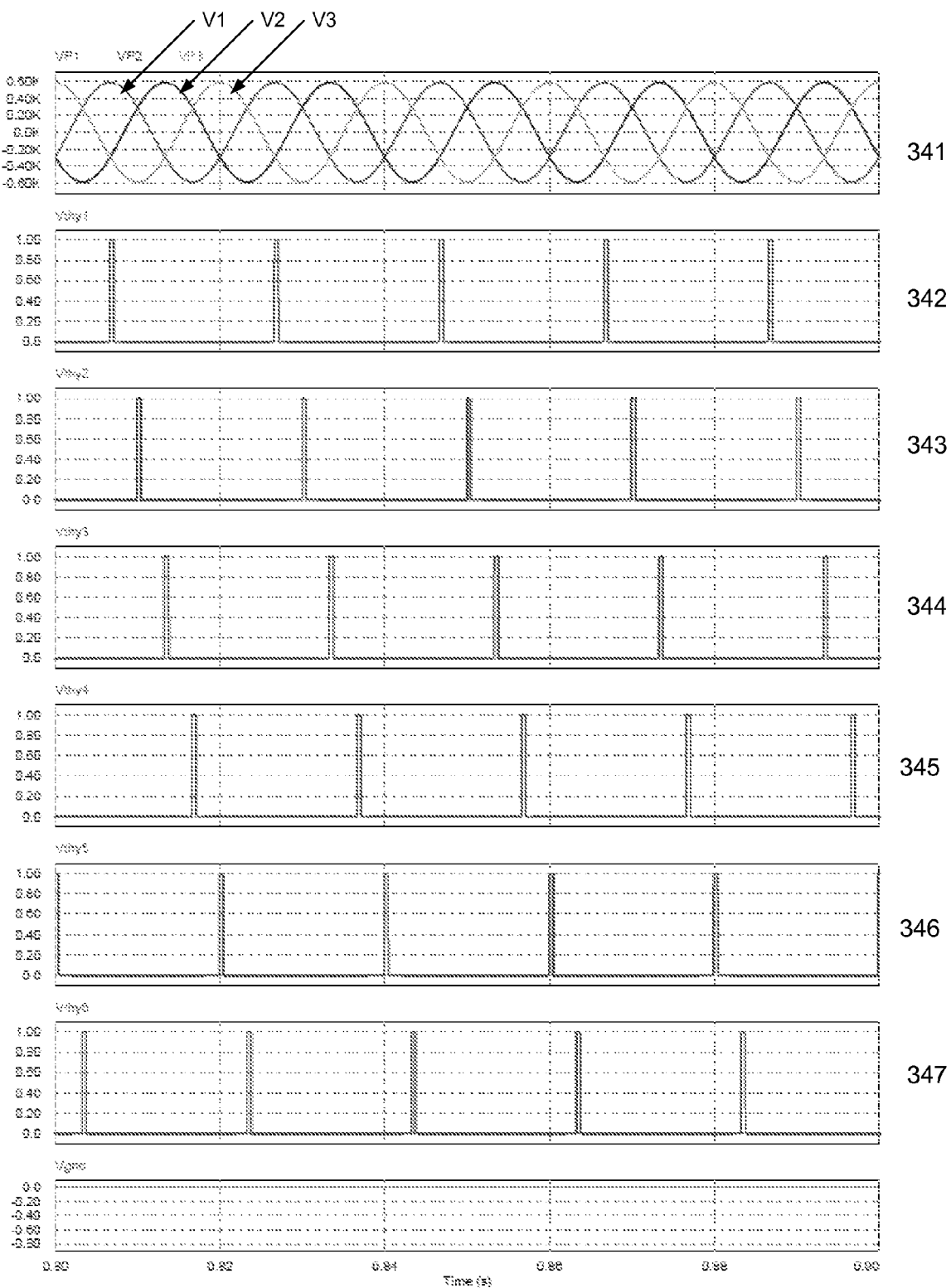

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. Reference to a "power cycle", also referred to as the period, refers to the time interval required for the AC supply voltage to complete one cycle at which point it repeats itself periodically; the period is defined as the inverse of the frequency, F, defined in Hz. Most utility networks operate at 50 or 60 Hz; however a network can theoretically operate at any frequency, depending on the application. Reference to a "rectifier" for the purpose of this paper refers to a thyristor. However, any electronic, power electronic, electronically triggered subcycle switching element can be substituted to the same effect.

Three-Phase Converter Embodiments

According to some embodiments, an improved arrangement is provided for harmonic reduction in AC power converters. In one embodiment, a symmetrical control of firing angles of multiple (e.g., two or more) parallel complementary switched AC power converters about an nominal (or average) control angle, alpha, can be used to increase the number of pulse components provided by the converters, and to at least partly cancel harmonic currents generated by the converters, thus providing a relatively simple and effective technique for reducing harmonic currents transmitted to the AC network.

In one embodiment, an AC power conversion system includes at least two AC power converter (e.g., AC/DC converters) circuits connected in parallel to a multiphase AC power supply. Each converter circuit includes at least six controllable rectifiers for passing respective phases of the AC power supply in turn at a respective firing angle for each circuit. Each converter circuit further includes a controller for symmetrically controlling the respective rectifiers so that the firing angles for the respective rectifiers in each converter circuit are substantially identical but oppositely offset from a nominal control angle (also referred to as a base or average angle). As a result, the net (or combined) AC and DC current of the converter circuits has a greater number of component pulses than if either converter circuit operated alone.

In addition, according to one embodiment the AC power conversion system further includes two (or more in the case of higher order pulse systems) interphase transformers (IPTs) connected between two positive and two negative DC terminals of each converter circuit. The IPT serves to limit a circulation current in the DC terminals during the time that there is a difference in DC voltage between the DC nodes of the two bridges. The IPT also provides a means to apply a 12 pulse ripple voltage to the DC load. DC reactors can be used in place of interphase transformers to perform the same task of circulating current limitation (this is often not the case due to the IPT being cheaper from an economical point of view. Additionally, the DC reactors used for circulation current limitation may also affect current ripple and the response time of the converter). The potential across the load is equal to the resulting average DC voltage between the positive and negative DC terminals.

In one embodiment, the AC power supply is a three-phase power supply and two converter circuits are utilized. The two converter circuits may be substantially identical or similar. In a further embodiment, the conversion system provides a 12 pulse current. The firing angles are substantially the same but oppositely offset from a nominal control angle by approximately 15° (e.g., $\Delta\alpha=\pm 15°$). This value can be varied to adjust the cancellation of harmonic current components. A thyristor may be used as an example of a rectifier.

The choices of a nominal control angle (e.g., the base firing angle $\alpha$) can be selected and/or adjusted as required to provide the operation of the conversion system in rectifier (0<alpha<90), inverter (90<alpha<180), and/or reactive compensator (alpha ~90 deg) modes. Embodiments of the invention also include conversion systems having a greater number of converter circuits which can be used together to provide, for example, a 24 pulse current with further reduced harmonic content.

Figure 6A:
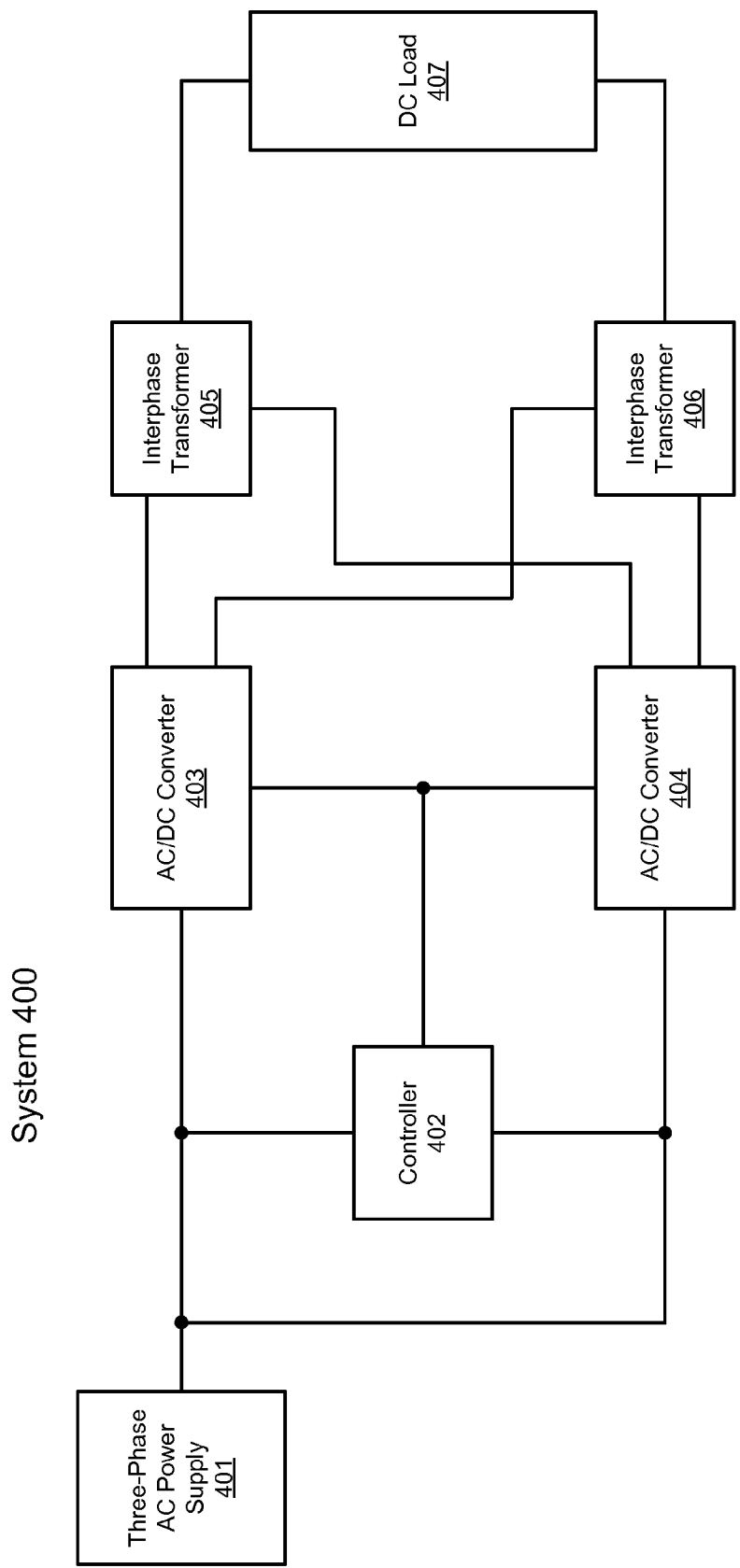
FIGS. 6A-6C are block diagrams illustrating a power conversion system according to some embodiments of the invention.

FIG. 6A is a block diagram illustrating an example of an AC power conversion system according to one embodiment of the invention. Referring to FIG. 6A, AC power conversion system 400 includes, but is not limited to, three-phase AC power supply 401, controller 402, AC/DC converters 403-404, interphase transformers 405-406, and a DC load 407. Controller 402 is configured to provide gate control signals (e.g., pulse signals to turn on the respective rectifiers) to one or more rectifiers of AC/DC converters 403-404. The positive DC terminals of power converter 403-404 are connected in parallel via interphase transformer (or DC reactors) 405. The negative DC terminals of power converters 403-404 are connected in parallel via interphase transformer (or DC reactor) 406. Note that in this example, single controller 402 is used to control both converters 403-404. However, multiple controllers may also be utilized to individually control converters 403-404.

Figure 6B:
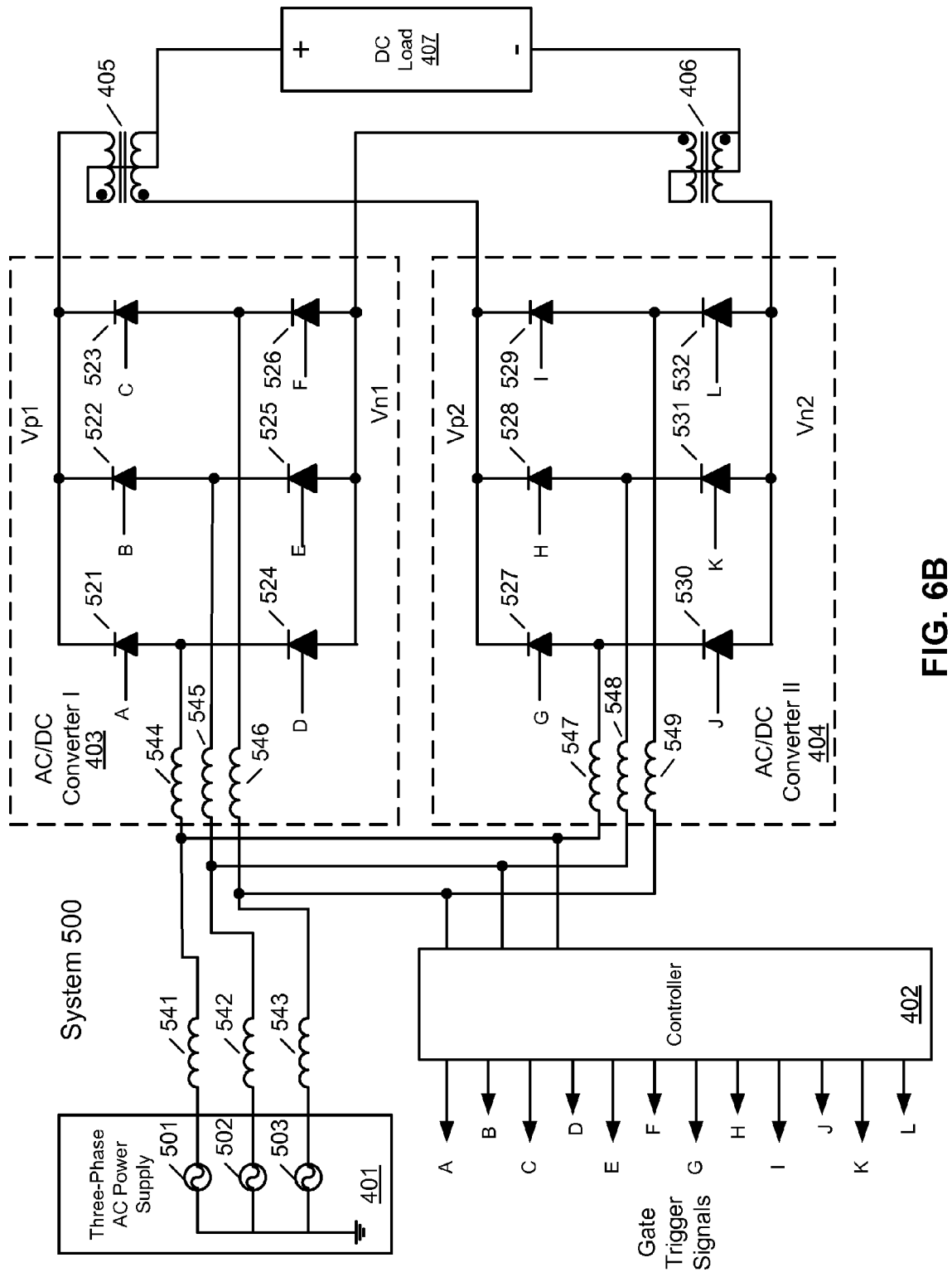

Reference to "corresponding rectifier" throughout this application is taken to mean, in the case that multiple bridges that are substantially similar or identical in an embodiment, the rectifier in an alternate bridge that is connected in the same position as the original bridge. Referring to FIG. 6B, for example, rectifier 527 is the corresponding rectifier of rectifier 521. Similarly, rectifier 521 can be referred to as the corresponding rectifier of rectifier 527. Similarly, Rectifier 530 is the corresponding rectifier of rectifier 524. Similarly, rectifier 524 can also be referred to as the corresponding rectifier of rectifier 530. And so on.

Three-phase electric power is a common method of AC electric power transmission. It is a type of polyphase systems, and is the most common method used by electric power distribution grids worldwide to distribute power. It is also used to power large motors and other large loads. A three-phase system is generally more economical than others because it uses less conductor material to transmit electric power than equivalent single-phase or two-phase systems at the same voltage. In a three-phase system, three circuit conductors carry three alternating currents (of the same frequency) which reach their instantaneous peak values at different times. Taking one conductor as the reference, the other two currents are delayed in time by one-third and two-thirds of one cycle of the electrical current. This delay between phases has the effect of giving constant power transfer over each cycle of the current, and also makes it possible to produce a rotating magnetic field in an electric motor.

A rectifier is an electrical device that converts AC to DC, a process known as rectification. Rectifiers have many uses including as components of power supplies and as detectors of radio signals. Rectifiers may be made of solid state diodes, vacuum tube diodes, mercury arc valves, and other components. In one embodiment, a thyristor is used as an example of a rectifier. Turn on of the thyristor may be accomplished by a "positive current" pulse between the gate and cathode terminals. Turn off of a thyristor, in a line commutated three-phase AC/DC converter, is achieved by reversing the current in the thyristor. This can be achieved by firing the next thyristor that shares a common cathode (or anode) in sequence, setting up a circulating current between phases that reverses the current direction and turns off the device. Although a thyristor is used as an example of a rectifier through this application, it will be appreciated that other types of controlled switches can also be utilized.

Referring back to FIG. 6A, in one embodiment, each of converters 403-404 includes six controllable rectifiers for passing respective phases of the AC power supply in turn at a respective firing angle for each circuit. Controller 402 is configured to provide control signals for symmetrically controlling the respective rectifiers of converters 403 and 404, such that during any power cycle the firing angles for the respective (or corresponding) rectifiers inside converters 403-404 are substantially equally but oppositely offset from a base angle. Additionally, interphase transformers (IPTs) are connected between the two positive and two negative DC terminals of each converter circuit. The IPT serves to limit the circulation current between the terminals of each bridge for the period of time that there is a difference in voltage between two terminals. It also serves to provide a 12 pulse ripple voltage across the DC load. The load experiences the average DC voltage of converters 403 and 404. As a result, the net AC and DC currents of the converters 403-404 have a greater number of component pulses than for each of converters 403-404 operating alone.

In one embodiment, converters 403-404 may be substantially equal, and the respective loads and their DC currents are substantially equal. The firing angles for the corresponding rectifiers in each converter may be substantially equal but oppositely offset from a nominal delay angle ($\alpha$) by, for example, 15° (e.g., $\Delta\alpha = \pm 15°$) in an alternated manner. For example, given a rectifier of a first AC/DC converter (e.g., converter 403), a first firing angle of the rectifier may be $(\alpha + \Delta\alpha)$ during a first power cycle (or period) and a second firing angle may be $(\alpha - \Delta\alpha)$ during a second power cycle. The next firing angle is configured back to $(\alpha + \Delta\alpha)$ in the third power cycle, etc. For the corresponding rectifier of a second or complementary AC/DC converter (e.g., converter 404), the corresponding firing angle is $(\alpha - \Delta\alpha)$ for the first power cycle and $(\alpha + \Delta\alpha)$ for the second power cycle, and $(\alpha - \Delta\alpha)$ for the third power cycle etc. The magnitude of the offset value (e.g., $\Delta\alpha$) can be varied to adjust the cancellation of harmonic current components. Note that although two AC/DC converters are described with respect to FIG. 6A, three or more converters may also be utilized in parallel for the objective of increasing the number of pulses per power cycle (i.e. to 18, 24 pulses etc), for example, a 18 pulse circuit as shown in FIG. 11D.

FIG. 6B is a schematic diagram illustrating an AC power conversion system according to another embodiment of the invention. For example, system 500 may be implemented as part of system 400 of FIG. 6A. For purposes of illustration, certain reference numbers of components having identical or similar functionalities are retained from previous figures herein. Referring to FIG. 6B, similar to system 400 of FIG. 6A, system 500 includes, but not limited to, AC power supply 401 having respective phase to neutral voltages 501-503, controller 402, AC/DC converters 403-404, interphase transformers 405-406, and a DC load 407. Supply voltages 501, 502 and 503 are connected between phase and neutral (or ground) and are phase displaced from one another. Given 501 is a reference, 502 lags 501 by 120 degrees and 503 lags 501 by 240 degrees. For the purpose of illustration, line to line voltages are defined as V1, V2, and V3. V1 is defined as the difference in potential between AC node voltage 501 and 503; V2 is defined as the difference in potential between AC node voltage 502 and 501; V3 is defined as the difference in potential between AC node voltage 503 and 502. Converter 403 includes rectifiers 521-526 and converter 404 includes rectifiers 527-532, respectively. In one embodiment, a thyristor can be used as an example of any of rectifiers 521-532. Controller 402 is configured to provide gate control signals to rectifiers 521-532 of AC/DC converters 403-404. Interphase transformers 405-406 are connected between the two positive and two negative DC terminals of each converter circuit 403-404. Alternatively, DC reactors may be connected in place of each IPT coil. The load 407 is connected between the midpoints (or center tap) of each IPT.

Voltages 501-503 represent respective phases of a three-phase AC power supply 401, for example, as supplied by an electrical power utility. In this example, converters 403-404 are connected in parallel to three-phase AC power supply 401 and are paralleled through interphase transformers 405-406 to DC load 407, which represents an inductance and resistance of the load in this example; however, the load can also be a DC source (battery) or an Inverter. Reactors 544-546, 547-549 and 541-543 represent transformer, cabling and connection impedances and are considered to be of sizing typical to a three-phase AC transmission network. For example, the total series reactance is typically approximately (or less than) 5% of the voltage drop at full current rating of the supply.

Controller 402 (also referred to as a gate trigger unit) may be implemented using analog circuitry or, more preferably, by using a microprocessor or microcontroller (e.g., field programmable gate arrays or FPGAs) which can be more readily programmed or adjusted as required to control the firing of converters 403-404. For example, controller 402 may include a machine-readable storage medium (e.g., memory) to store machine executable instructions that have been programmed according to one or more predetermined algorithms and a processor or processing logic or signal generator to generate proper gate trigger signals having proper firing angles for each of rectifiers 521-532 based on the programmed algorithms.

In this example, controller 402 may produce 12 gate trigger signals, one for each of rectifiers 521-532. In this example, converter 403 includes six rectifiers 521-526 and requires six triggering pulses to drive rectifiers 521-526 and converter 404 includes six rectifiers 527-532 and requires another six gate triggering pulses to drive rectifiers 527-532. Converters 403-404 are also referred to as three-phase bridges. Rectifiers 521, 522 and 523 are referred to as the positive group of rectifiers of converter 403. Rectifiers 527, 528 and 529 are referred to as the positive group of rectifiers of converter 404. Rectifiers 527, 528 and 529 are considered corresponding rectifiers to 521 522 and 523 respectively. Rectifiers 524, 525 and 526 are referred to as the negative group of rectifiers of bridge 403. Rectifiers 530, 531 and 532 are referred to as the negative group of rectifiers of bridge 404. Rectifiers 530, 531 and 532 are considered corresponding rectifiers to 524, 525 and 526 respectively.

According to one embodiment, system 500 is controlled at a nominal control angle $\alpha$ (e.g. approximately 90 degrees), therefore drawing substantially only reactive power from the AC supply 401 in this example. DC load 407 is considered mostly inductive. Rectifiers inside converter circuits 403-404 are switched in a complementary fashion, at firing angles which are substantially equally offset (offset, meaning advanced or delayed, or added/subtracted) from the nominal control angle by an offset angle $\Delta\alpha$.

Figure 7:
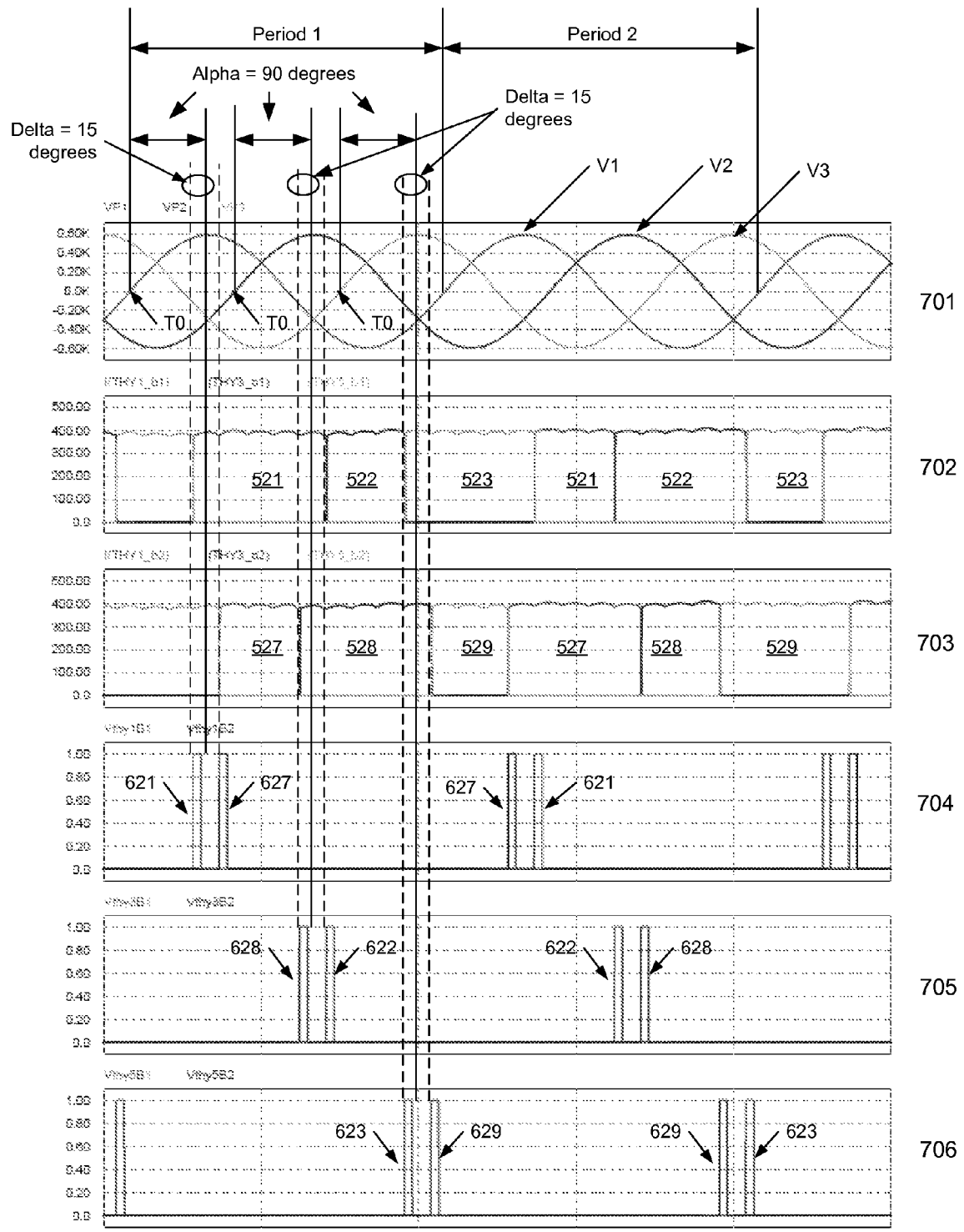
FIGS. 7-8, 9A-9B, 10A-10B, and 11A-11C show certain switching waveforms of rectifier pairs of a power conversion system as shown in FIGS. 6A-6C according to some embodiments of the invention.
Figure 8:
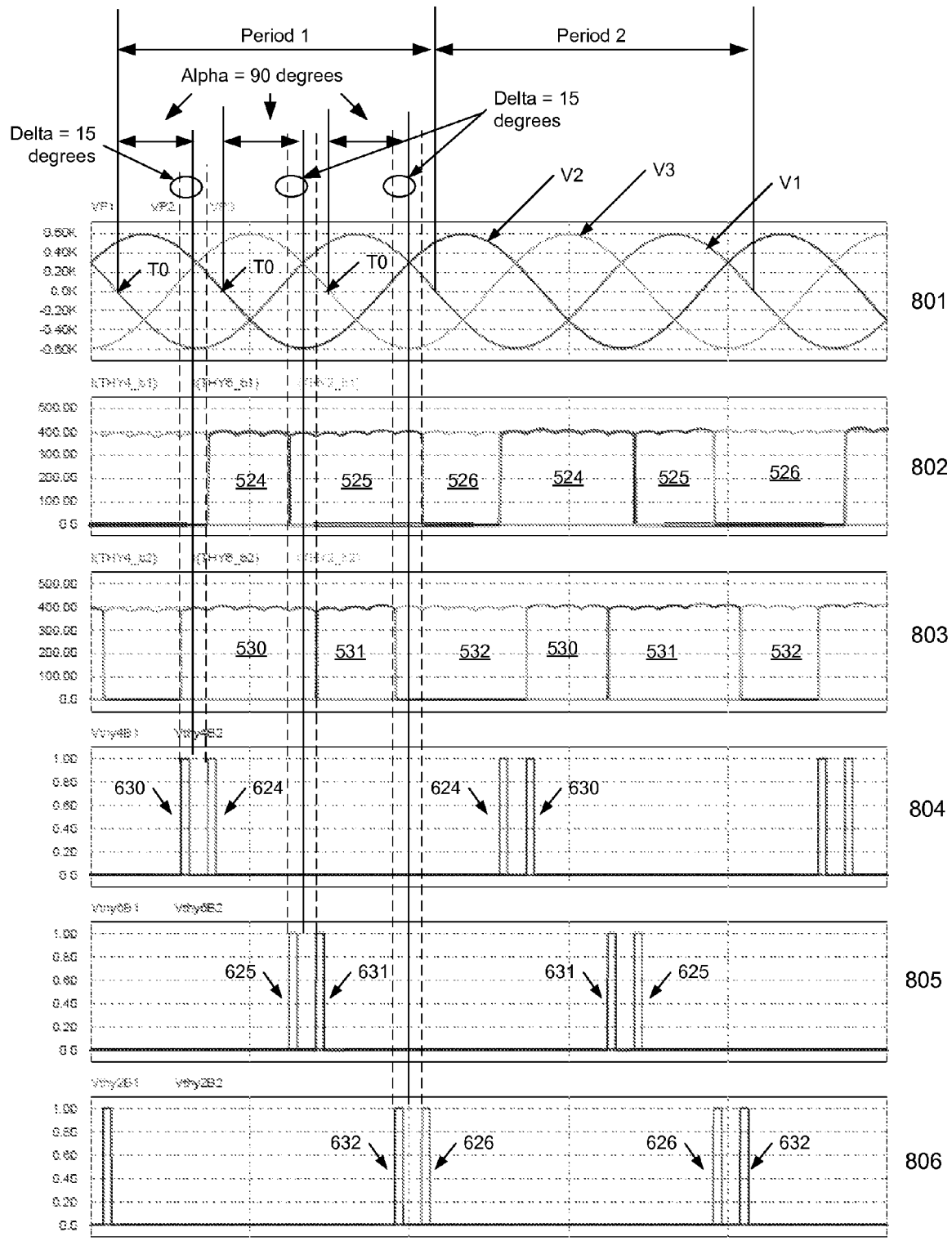

For purpose of illustration, the firing sequence of the positive group of rectifiers of bridges 403 and 404 and the negative group of rectifiers are shown in FIGS. 7 and 8. FIG. 9 shows the AC current in each converter 403 and 404 (the current through reactors 544-549) and the total combined AC current of bridges 403 and 404 (the AC current through reactors 541-543).

Referring to FIG. 7, waveform 701 is the three-phase line to line voltage of the AC supply used as a reference by controller 402 to produce signals 621, 622, 623, 627, 628, and 629 to fire positive group rectifiers 521, 522, 523 and 527, 528, 529 respectively. T0 of V1, V2, and V3 in waveform 701 is considered the anode-cathode zero voltage crossover point for positive group thyristors 521 and 527, 522 and 528, 523 and 529, respectively. V1 is defined as the difference in potential between AC node voltage 501 and 503. V2 is defined as the difference in potential between AC node voltage 502 and 501. V3 is defined as the difference in potential between AC node voltage 503 and 502. Waveform 702 shows the instantaneous current through each positive group rectifier 521, 522, and 523. Waveform 703 is the instantaneous current through each corresponding positive group rectifier 527, 528, and 529 shown over two power cycles. Waveform 704 shows the gate trigger signals 621 and 627 generated by controller 402 to fire rectifiers 521 and 527. Waveform 705 shows the gate trigger signals 622 and 628 for rectifiers 522 and 528. Waveform 706 shows the gate trigger signals 623 and 629 for rectifiers 523 and 529.

Referring to FIG. 8, waveform 801 is the three-phase reference voltage of the AC supply used as a reference by controller 402 to produce signals 624, 625, 626, 630, 631, and 632 to fire negative group rectifiers 524, 525, 526 and 530, 531, 532 respectively. T0 of V1, V2, and V3 in waveform 801 is considered the anode-cathode zero voltage crossover point for negative group thyristors 524 and 530, 525 and 531, 526 and 532 respectively. Waveform 802 shows the instantaneous current through each negative group rectifier 524, 525, and 526 and waveform 803 is the instantaneous current through each corresponding negative group rectifier 530, 531, and 532 shown over two power cycles. Waveform 804 shows gate trigger signals 624 and 630 generated by controller 402 to fire rectifiers 524 and 530. Waveform 805 contains gate trigger signals 625 and 631 for rectifiers 525 and 531. Waveform 806 contains gate trigger signals 626 and 632 for rectifiers 526 and 532.

Referring to FIG. 9, waveform 901 is equivalent to waveform 701. Waveform 902 and 903 and 904 show the AC current through reactors 544, 547, and 541 respectively. Waveform 905, 906, and 907 show the AC current through reactors 545, 548, and 542 respectively. Waveform 908, 909, and 910 show the AC current through reactors 546, 549, and 543 respectively. Referring to FIG. 10A, waveform 1001 is equivalent to waveform 701. Waveforms 1002, 1003, 1004, 1005, 1006, and 1007 show gate trigger signals, over 4 power cycles, of rectifiers 521 and 527, 526 and 532, 522 and 528, 524 and 530, 523 and 529, and 525 and 531, respectively.

Referring back to FIG. 7, which contains the firing sequence for the positive group of rectifiers in converters 403 and 404, the nominal alpha delay angle, α, for both bridges 403 and 404 is approximately 90 degrees (shown as a continuous line). The nominal alpha control angle is the delay, in degrees, between the anode-cathode zero voltage crossover (shown as T0 for each respective phase and rectifier) and the trigger signal generated by controller 402 for the relevant rectifier. A positive voltage trigger signal voltage turns on rectifier 521, corresponding to an instantaneous rise of current through the device (waveform 702). All rectifiers 521-532 in this example are considered line commutated devices (e.g. thyristors), meaning the process of turn off is not gate controlled but controlled by the AC voltage of the supply. Hence, no gate signals for turn off are shown (or required in practice). Observing waveform 701 as a reference voltage, in the first power cycle (period 1), it can be seen that rectifier 521 is fired at an alpha delay angle of (α−Δα).

In the second power cycle of waveform 701 (e.g. period 2), rectifier 521 is fired at an alpha delay angle of (α+Δα). By the third cycle of waveform 701 (not fully shown), the firing pattern described repeats itself. In each period the corresponding rectifier of bridge 404, rectifier 527, is fired in a complementary fashion to rectifier 521. That is in the first power cycle of waveform 701 (period 1) rectifier 527 is fired at an alpha delay angle of (α+Δα). In the second power cycle of waveform 701 (period 2) rectifier 527 is fired at an alpha delay angle of (α−Δα). The third power cycle of waveform 701 (period 3) rectifier 527 is fired at an alpha delay angle of (α+Δα); by the third cycle the firing patter described repeats itself (hence it is only partly shown). The switching algorithm for any rectifier has duration of two power cycles before repeating itself. Waveform 704 shows the gate signals 621 and 627 for corresponding rectifiers 521 and 527 respectively in bridge 403 and 404 on the same axis to give the reader a clearer understanding of the symmetry of the firing signals to corresponding rectifiers about a nominal delay angle, α, on a cycle per cycle basis. Δα in this example is 15 degrees.

Additionally in FIG. 7, within each of bridges 403 and 404, the switching order (i.e. the order that each rectifier belonging to the same group is switched within a single power cycle) of each rectifier is shown. In the positive and negative rectifier group of each converter 403 and 404, within a single power cycle, each rectifier is triggered at an opposite advance or delay angle (Δα) to the previous rectifier of the same group as the sequence of switching progresses. In this example, a positive group of rectifiers of converter 403 includes rectifiers 521-523 while a negative group of rectifiers of converter 403 includes rectifiers 524-526. A positive group of rectifiers of converter 404 includes rectifiers 527-529, while the negative group of rectifiers of converter 404 includes rectifiers 530-532. Within the first power cycle (period 1) shown by waveform 701, waveform 704 (and 702) shows rectifier 521 is switched at an angle of (α−Δα), waveform 705 (and 702) shows rectifier 522 is switched at an angle of (α+Δα), and waveform 706 (and 702) shows rectifier 523 is switched at an angle of (α−Δα). Within a second power cycle (e.g., period 2) of waveform 701, waveform 704 (and 702) shows rectifier 521 is switched at an angle of (α+Δα), waveform 705 (and 702) shows rectifier 522 is switched at an angle of (α−Δα), and waveform 706 (and 702) shows rectifier 523 is switched at an angle of (α+Δα). In the third switching cycle (period 3) of 701 the switching sequence repeats itself.

Similarly, within the first power cycle (e.g., period 1), rectifier 527 is switched at an angle of (α+Δα), rectifier 528 is switched at an angle of (α−Δα), and rectifier 529 is switched at an angle of (α+Δα). During the second power cycle, rectifier 527 is switched at an angle of (α−Δα), rectifier 528 is switched at an angle of (α+Δα), and rectifier 529 is switched at an angle of (α−Δα).

Observing waveform 801 of FIG. 8, which contains the firing sequence of the negative group of rectifiers in converters 403 and 404, as a reference voltage in the first power cycle (e.g., period 1), it can be seen that rectifier 524 is fired at an alpha delay angle of (α+Δα). In the second power cycle of waveform 801 (e.g., period 2), rectifier 524 is fired at an alpha delay angle of (α−Δα). By the third cycle of waveform 801 (not fully shown) the firing pattern described repeats itself. In each period, corresponding rectifier 530 is fired in a complementary fashion to rectifier 524. In the first power cycle of waveform 801 (e.g., period 1), rectifier 530 is fired at an alpha delay angle of (α−Δα). In the second power cycle of waveform 801 (e.g., period 2), rectifier 530 is fired at an alpha delay angle of (α+Δα). The third power cycle of waveform 801 (e.g., period 3), rectifier 530 is fired at an alpha delay angle of (α−Δα); by the third cycle the firing patter described repeats itself. The switching algorithm for any rectifier has duration of two power cycles before repeating itself. Waveform 804 shows the gate signals 624 and 630 for corresponding rectifiers 524 and 530 respectively in bridge 403 and 404 on a cycle per cycle basis on the same axis to give the reader a clearer understanding of the symmetry of the firing signals about a nominal delay angle, α, on a cycle per cycle basis. Δα in this example is 15 degrees.

Additionally in FIG. 8, within each bridge 403 and 404, the switching order (i.e. the order that each rectifier belonging to the same group is switched within a single power cycle) of each rectifier is shown. In the positive and negative rectifier group of each converter 403 and 404, within a single power cycle, each rectifier is triggered at an opposite advance or delay angle (Δα) to the previous rectifier of the same group as the sequence of switching progresses. In this example, the negative group of rectifiers of converter 403 includes rectifiers 524-526, and 530-532 of converter 404. Within a first power cycle (e.g., period 1) shown by waveform 801, waveform 804 (and 802) shows rectifier 524 is switched at an angle of (α+Δα), waveform 805 (and 802) shows rectifier 525 is switched at an angle of (α−Δα), and waveform 806 (and 802) shows rectifier 526 is switched at an angle of (α+Δα). Within a second power cycle (e.g., period 2) of waveform 801, waveform 804 (and 802) shows rectifier 524 is switched at an angle of (α−Δα), waveform 805 (and 802) shows rectifier 525 is switched at an angle of (α+Δα), and waveform 806 and 802 shows rectifier 526 is switched at an angle of (α−Δα). In the third switching cycle (e.g., period 3) of 801 the switching sequence repeats itself.

Similarly, during the first power cycle (e.g., period 1), rectifier 530 is switched at an angle of (α−Δα), rectifier 531 is switched at an angle of (α+Δα), and rectifier 532 is switched at an angle of (α−Δα). During the second power cycle (e.g., period 2), rectifier 530 is switched at an angle of (α+Δα), rectifier 531 is switched at an angle of (α−Δα), and rectifier 532 is switched at an angle of (α+Δα).

Figure 9A:
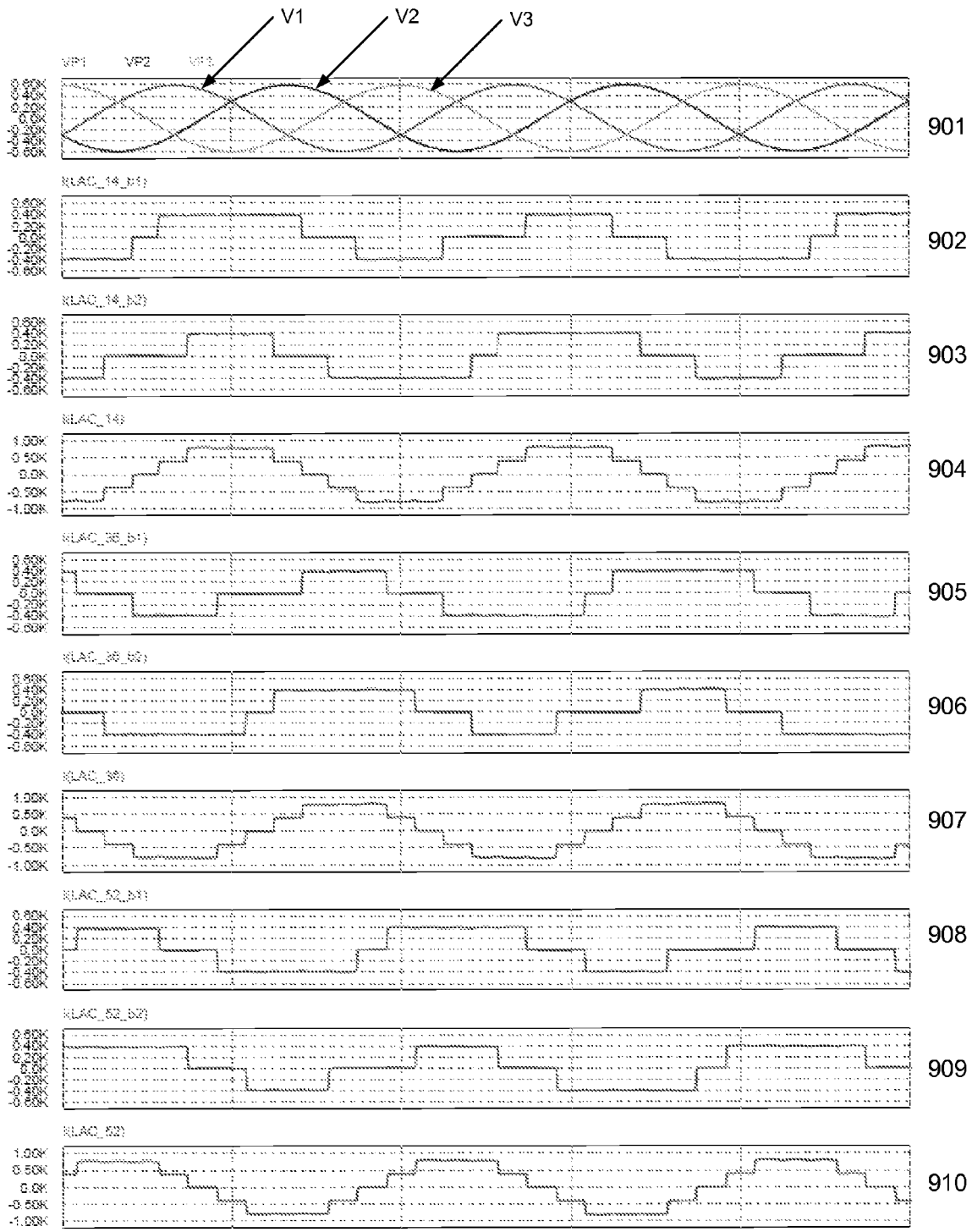
Figure 10A:
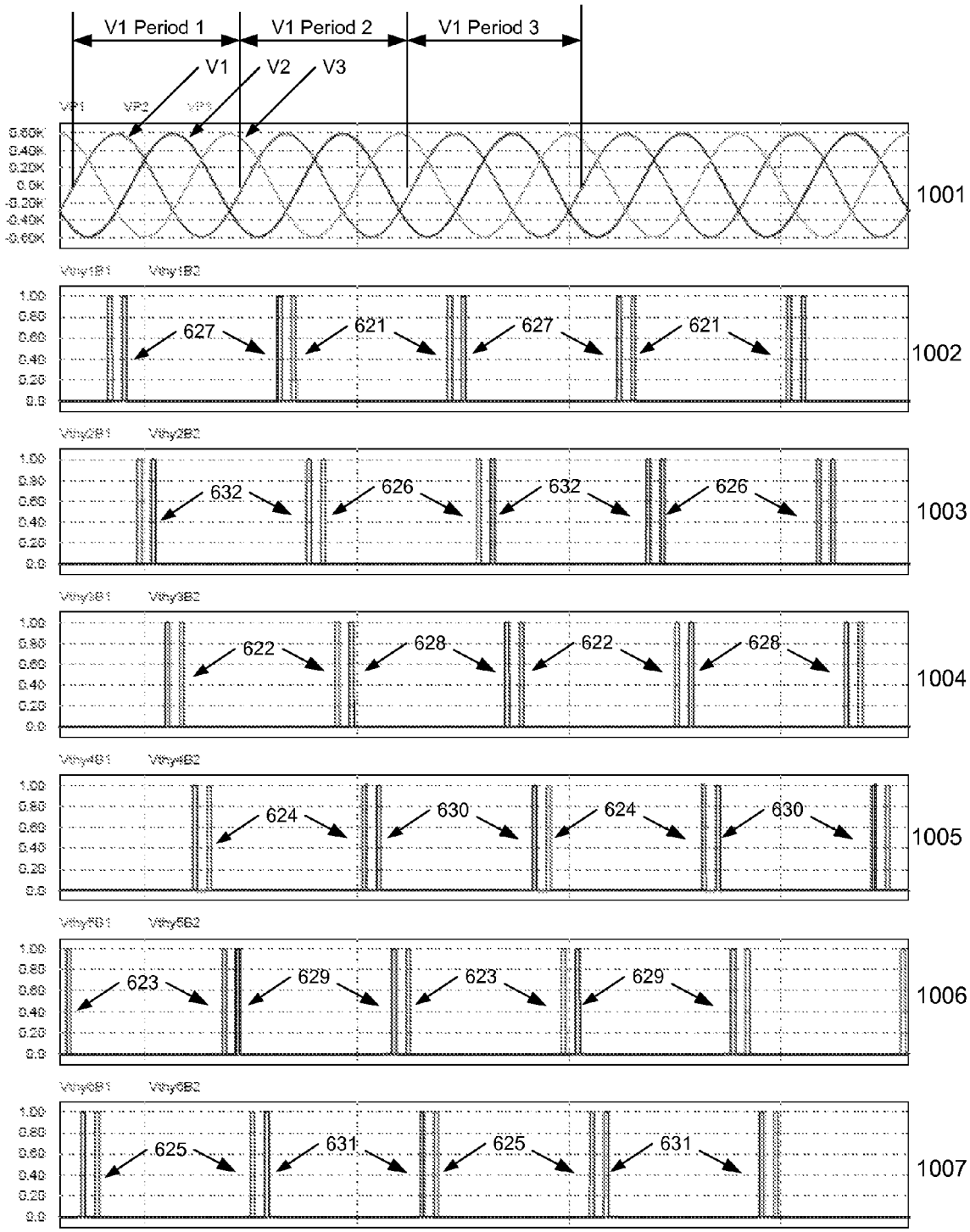

FIG. 9A shows the resulting AC current in the three-phase supply of each bridge 403 and 404, i.e., the current through line reactors 544-546 and 547-549, and also the total AC current in each reactor 541-543. Waveform 901 is the three-phase supply voltage connected to the AC terminals of the bridge (equivalent to waveform 701). Waveform 902 is the addition (taking into account phase and magnitude and polarity) of the current in rectifiers 521 and 524. In the addition of each current, phase magnitude and polarity of the current may be taken into account. For instance, in waveform 802 the current waveform in rectifier 524 is shown as positive (as a thyristor can only conduct unidirectional). However, from the perspective of the AC supply network the current is considered negative in polarity, and is shown thus. Waveform 903 is the addition (taking into account phase, magnitude and polarity) of the current in rectifiers 527 and 530. Waveform 904 is the addition (taking into account phase magnitude and polarity) of waveforms 902 and 903. As can be seen, the AC current supplied by the network contains more "steps" and has a higher number of pulses than a typical six pulse bridge (described in prior art). The total harmonic distortion of waveform 904 is reduced to about half of that of a typical six pulse bridge (waveforms 322-324). Waveforms 905-907 represent currents of inductors 545, 548, and 542, respectively. Waveforms 908-910 represent currents of inductors 546, 549, and 543, respectively. For an offset angle Δα of 15°, for example, the 12 pulse current is symmetrical and the fifth harmonic is reduced to about 6% from about 20% in existing 6 pulse systems.

Referring to FIG. 10A, waveform 1002 shows the firing sequence for corresponding rectifiers 521 of converter 403 and rectifier 527 of converter 404, where signal 621 represents gate trigger signal for rectifier 521 and signal 627 represents gate trigger signal for rectifier 527. As can be seen, rectifier 521 of converter 403 is alternatively fired at delay angle (α−Δα) and (α+Δα) over two power cycles of V1 before repeating the delay angle (in period 3). At the same time rectifier 527 of converter 404 is fired in a complementary fashion with delay angle of (α+Δα) and (α−Δα) over two power cycles before repeating the delay angle (e.g., in period 3).

Similarly, waveform 1003 shows the firing sequence for corresponding rectifiers 526 of converter 403 and rectifier 532 of converter 404, where signal 626 represents a gate trigger signal for rectifier 526 and signal 632 represents a gate trigger signal for rectifier 532. As can be seen, rectifier 526 of converter 403 is alternatively fired at delay angle (α−Δα) and (α+Δα) over two power cycles of V3 before repeating itself. Meanwhile, rectifier 532 of converter 404 is fired in a complementary fashion with delay angle of (α+Δα) and (α−Δα) over two power cycles before repeating itself.

Similarly, waveform 1004 shows the firing sequence for corresponding rectifiers 522 of converter 403 and rectifier 528 of converter 404, where signal 622 represents a gate trigger signal for rectifier 522 and signal 628 represents a gate trigger signal for rectifier 528. As can be seen, rectifier 522 of converter 403 is alternatively fired at delay angle (α+Δα) and (α−Δα) over two power cycles of V2 before repeating itself. Meanwhile, rectifier 528 of converter 404 is fired in a complementary fashion with delay angle of (α−Δα) and (α+Δα) over two power cycles before repeating itself.

Similarly, waveform 1005 shows the firing sequence for rectifier 524 of converter 403 and rectifier 530 of converter 404, where signal 624 represents a gate trigger signal for rectifier 524 and signal 630 represents a gate trigger signal for rectifier 530. As can be seen, rectifier 524 of converter 403 is alternatively fired at delay angle (α+Δα) and (α−Δα) over two power cycles of V1 before repeating itself. Meanwhile, rectifier 530 of converter 404 is fired in a complementary fashion with delay angle of (α−Δα) and (α+Δα) over two power cycles before repeating itself.

Similarly, waveform 1006 shows the firing sequence for corresponding rectifiers 523 of converter 403 and rectifier 529 of converter 404, where signal 623 represents a gate trigger signal for rectifier 523 and signal 629 represents a gate trigger signal for rectifier 529. As can be seen, rectifier 523 of converter 403 is alternatively fired at delay angle (α−Δα) and (α+Δα) over two power cycles of V3 before repeating itself. Meanwhile, rectifier 529 of converter 404 is fired in a complementary fashion with delay angle of (α+Δα) and (α−Δα) over two power cycles before repeating itself.

Similarly, waveform 1007 shows the firing sequence for corresponding rectifiers 525 of converter 403 and rectifier 531 of converter 404, where signal 625 represents a gate trigger signal for rectifier 525 and signal 631 represents a gate trigger signal for rectifier 531. As can be seen, rectifier 525 of converter 403 is alternatively fired at delay angle (α−Δα) and (α+Δα) over two power cycles of V2 before repeating itself. Meanwhile rectifier 531 of converter 404 is fired in a complementary fashion with delay angle of (α+Δα) and (α−Δα) over two power cycles before repeating itself.

In other embodiments the offset angle, Δα, for the positive group of rectifiers of each of bridges 403 and 404 may be reversed in polarity compared to what has been described above. In other words, a trigger signal having a firing angle of (α−Δα) applied to any of rectifiers 521-523 and 527-529 as shown in FIG. 10A may be replaced with a trigger signal having a corresponding firing angle of (α+Δα), and correspondingly any trigger signal having a firing angle of (α+Δα) for rectifiers 521-523 and 527-529 may be replaced with a trigger signal having a firing angle of (α−Δα). The total resulting AC current through reactors 541-543 will be substantially the same (see e.g., waveforms 904, 907, and 910).

Similarly, in other embodiments, the offset angle, $\Delta\alpha$, for the negative group of rectifiers of each of bridges 403 and 404 may be reversed in polarity compared to what has been described above. In other words, a trigger signal having a firing angle of $(\alpha-\Delta\alpha)$ applied to any of rectifiers 524-526 and 530-532 as shown in FIG. 10A may be replaced with a trigger signal having a corresponding firing angle of $(\alpha+\Delta\alpha)$, and correspondingly any trigger signal firing angle of $(\alpha+\Delta\alpha)$ for rectifiers 524-526 and 530-532 may be replaced with a trigger signal firing angle of $(\alpha-\Delta\alpha)$. The total resulting AC current through reactors 541-543 will be substantially the same (waveforms 904, 907, 910).

Figure 9B:
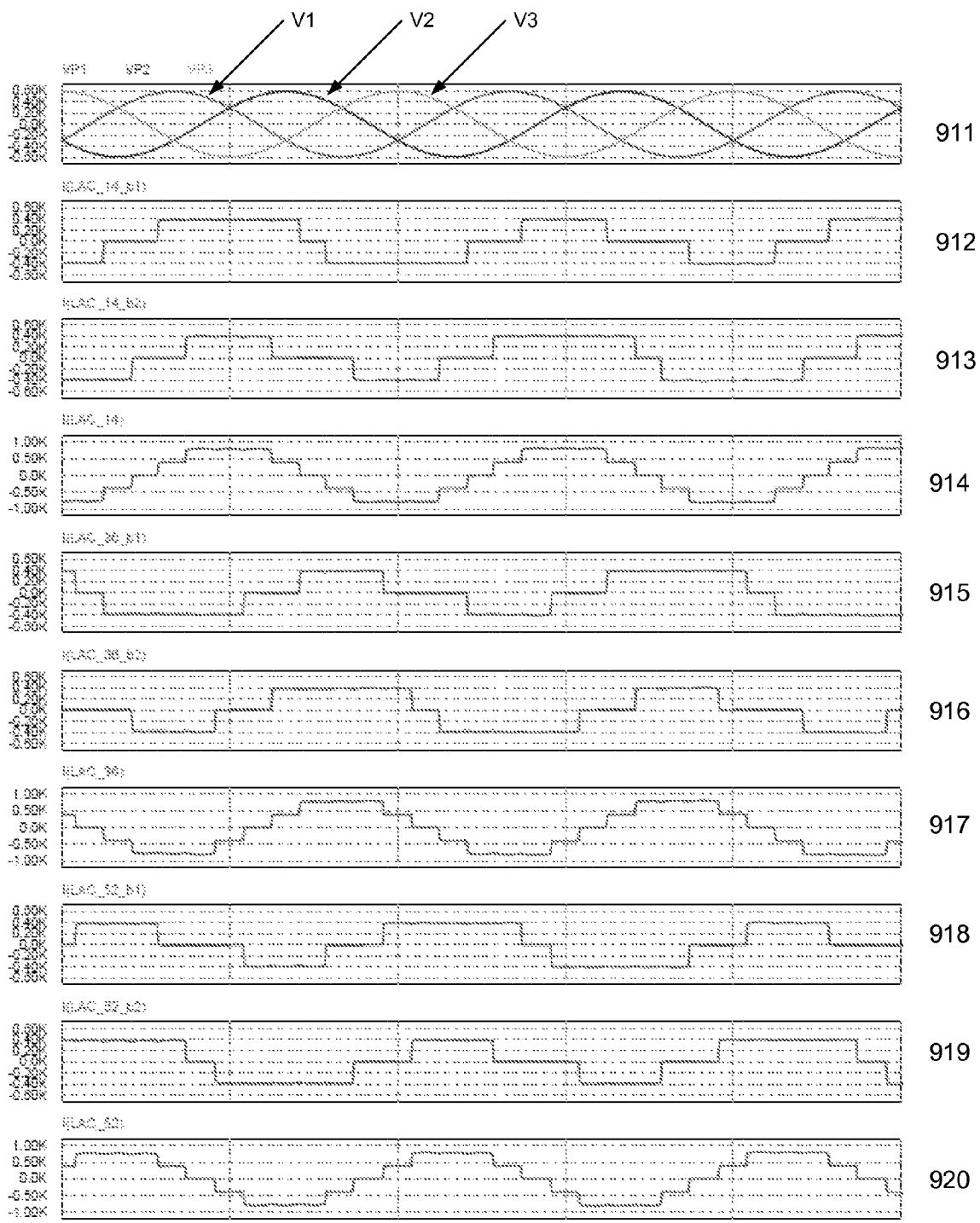
Figure 10B:
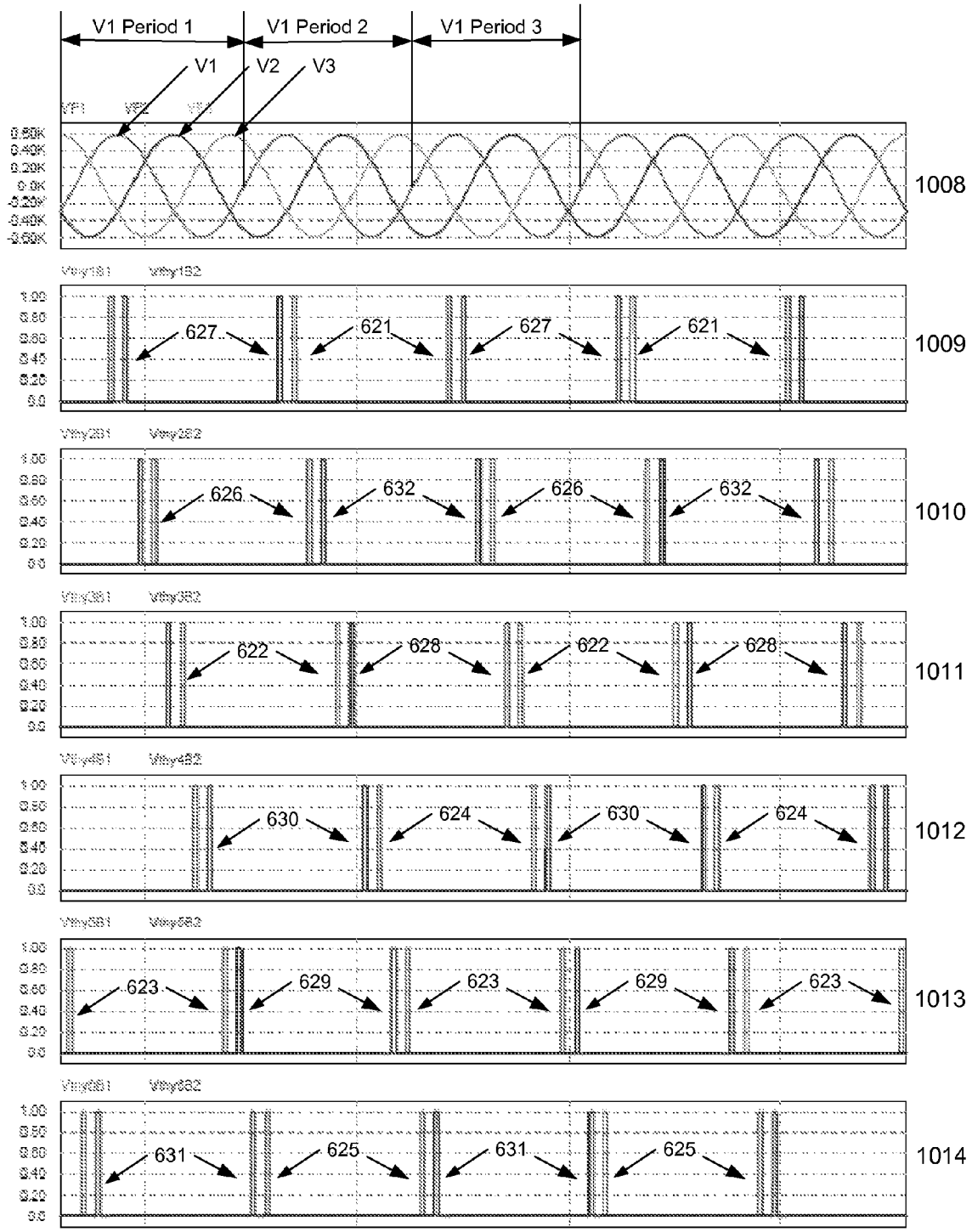

For example, FIG. 10B illustrates a converter circuit having a different polarity of $\Delta\alpha$ in the negative group of rectifiers of bridges 403 and 404. The positive group of trigger signals, i.e., waveforms 1009, 1011, and 1013 are substantially similar or identical to waveforms 1002, 1004, and 1006, respectively. The trigger signals in waveforms 1010, 1012, and 1014 are oppositely offset in polarity from the nominal delay angle to the trigger signals in waveforms 1003, 1005, and 1007, respectively. FIG. 9B shows the resulting AC current waveforms for the switching pattern of FIG. 10B. As can be seen, the AC current waveforms of 914, 917, and 920 are substantially the same as 904, 907, and 910.

In a further embodiment, the switching sequence frequency may be repeated every four (or more) cycles instead of every two cycles without a substantial effect to the AC current through reactors 541-543. This would require a rectifier to be triggered in advance (or delay) two (or more) times in succession before being triggered in delay (or advance) another two times (or more) in succession. The resulting AC current waveforms in FIG. 9A, 904, 907, and 910, would remain unchanged, however the IPTs 405 and 406 would be required to increase in size by two (or more) times to cope with the lower AC voltage frequency applied across its terminals.

Figure 11A:
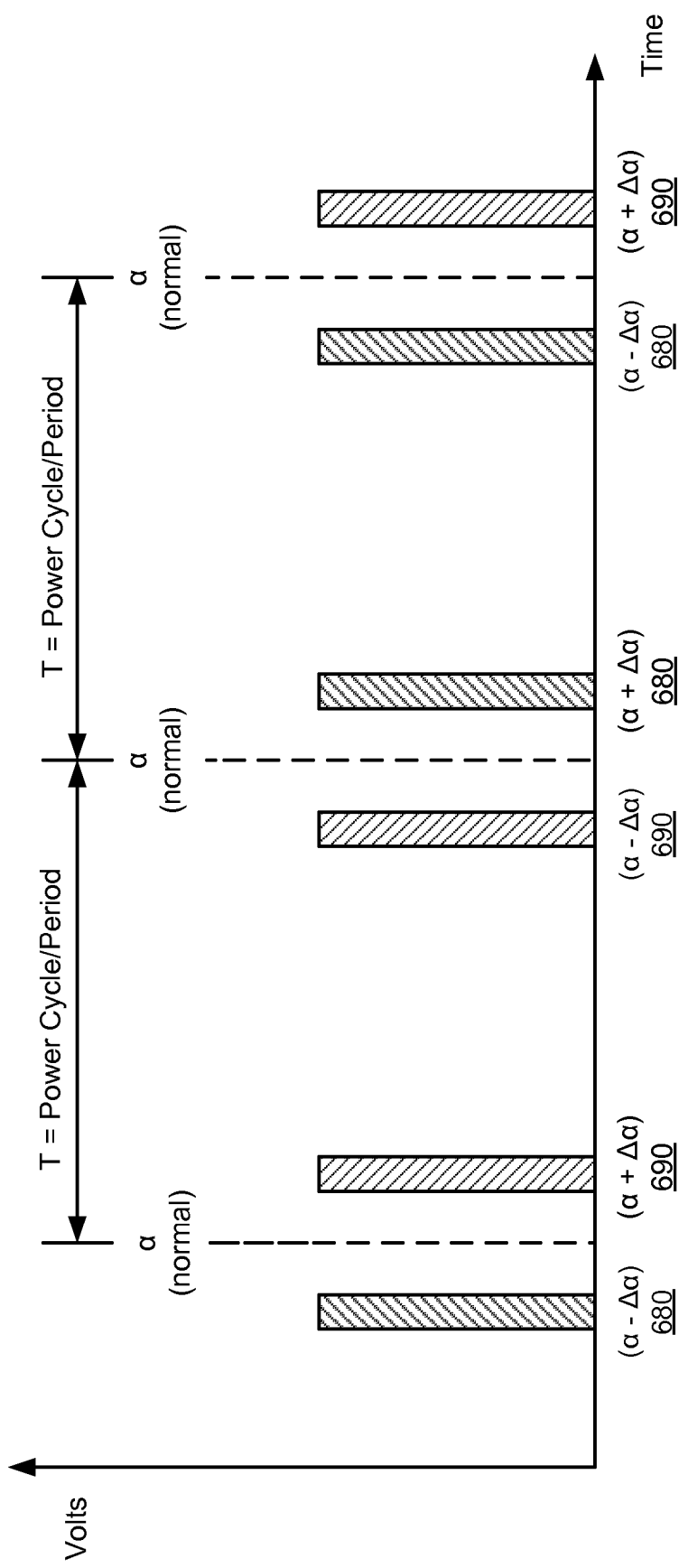

FIG. 11A is a diagram representing an enlarged waveform which may represent any one of waveforms 704-706 of FIG. 7, waveforms 804-806 of FIG. 8, waveforms 1002-1007 of FIG. 10A, and waveforms 1009-1014 of FIG. 10B. For example, considering the circuit of FIG. 6B and considering the positive group of rectifiers: signal 680 may represent any one of signals 621, 628, and 623, while signal 690 may represent any one of signals 627, 622, and 629 which are counterpart signals to signals 621, 628, and 623, respectively. Alternatively, signal 680 may represent any one of signals 627, 622, and 629, while signal 690 may represent any one of signals 621, 628, and 623, which are counterpart signals to signals 627, 622, and 629, respectively.

Similarly, considering the circuit of FIG. 6B and the negative group of rectifiers: signal 680 may represent any one of signals 630, 625, and 632 while signal 690 may represent any one of signals 624, 631, and 626 which are counterpart signals to signals 630, 625, and 632. Alternatively, signal 680 may represent any one of signals 624, 631, and 626 while signal 690 may represent any one of signals 630, 625, and 632, which are counterpart signals to signals 624, 631, and 626, respectively.

Figure 11B:
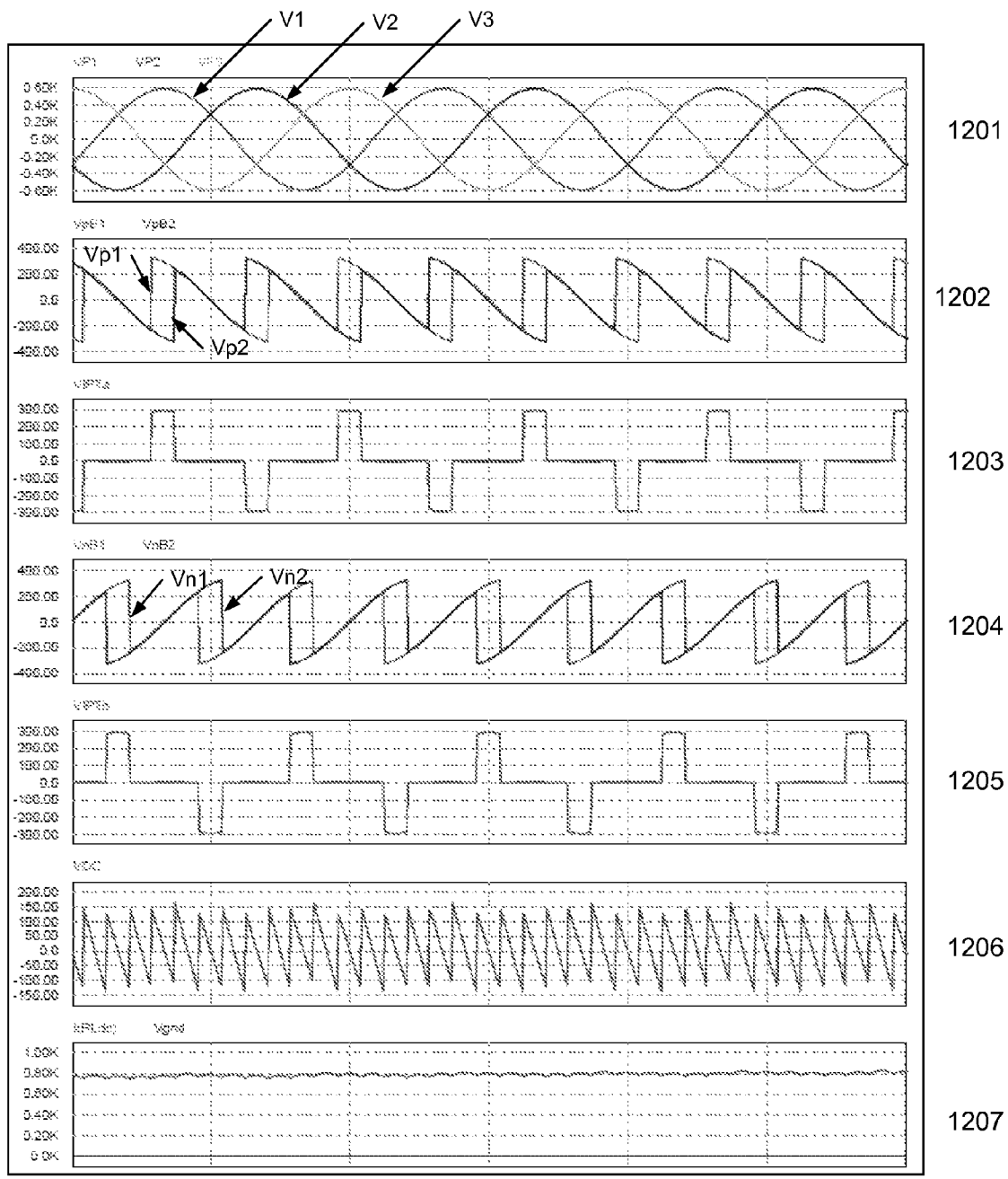
Figure 11C:
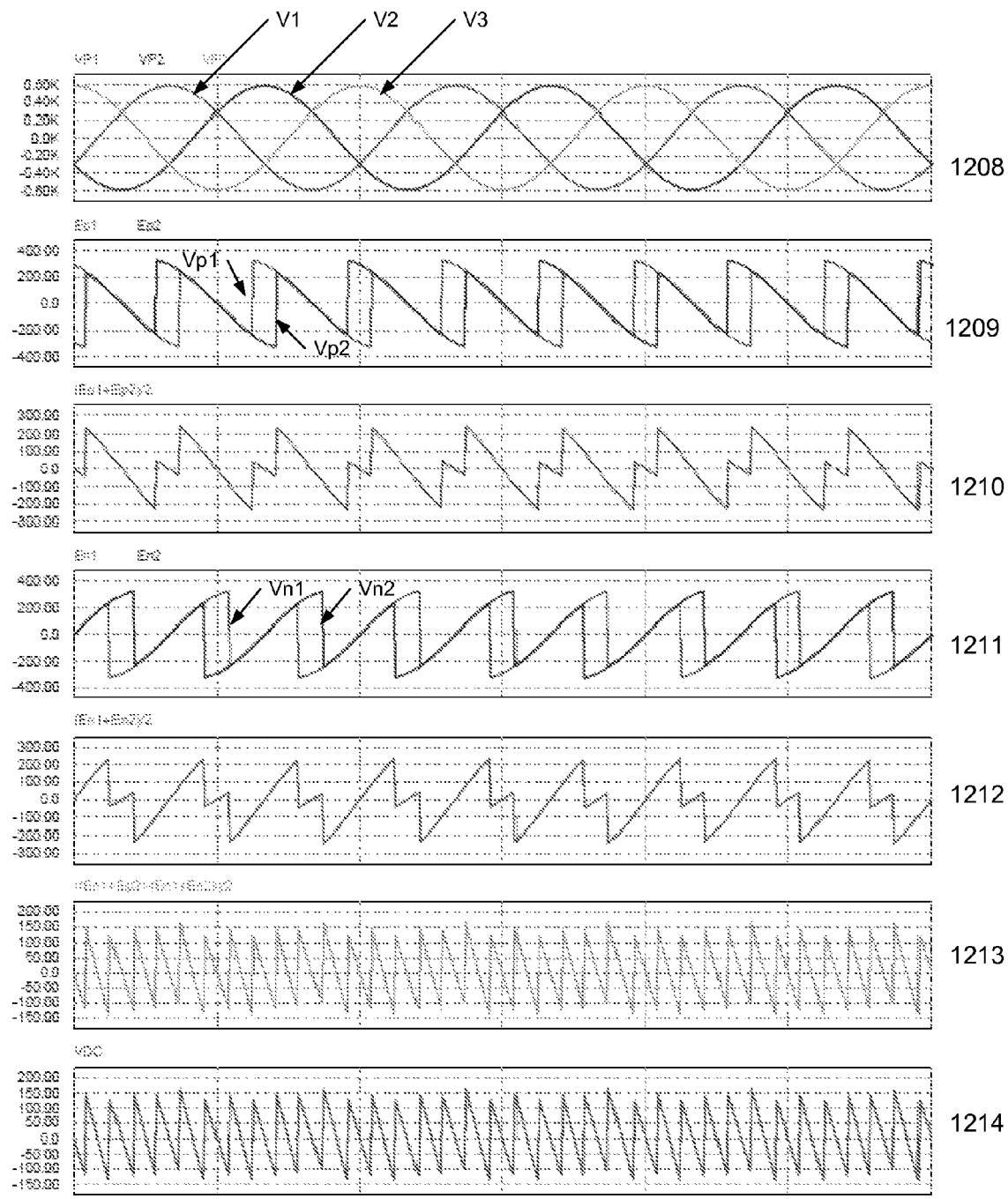
Figure 11D:
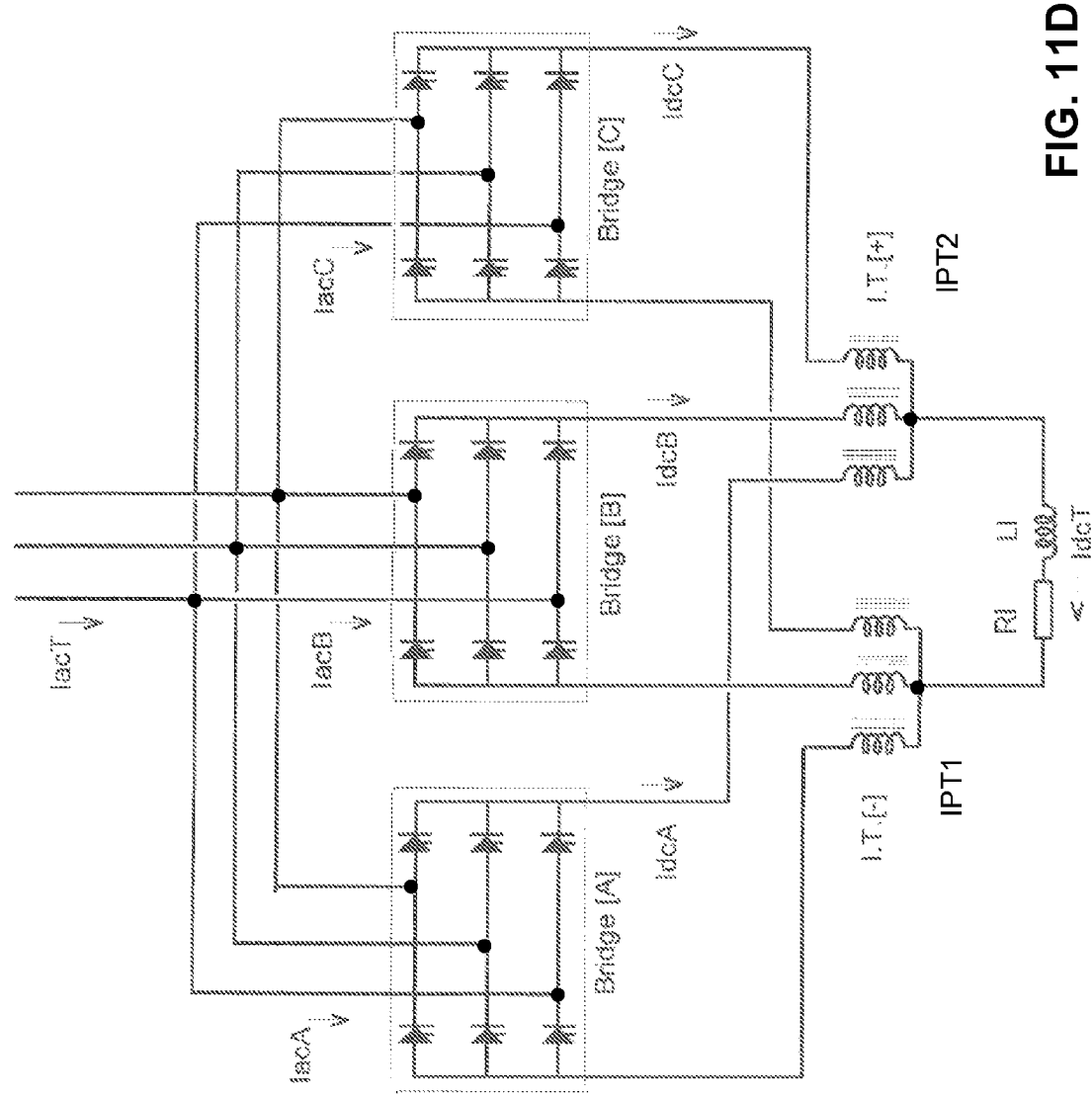
FIG. 11D is a schematic diagram illustrating a converter circuit according to another embodiment of the invention.

For an embodiment, the AC supply current passing through reactors 541-543 remains substantially the same for each trio of rectifiers chosen (from the positive or negative groups) to represent signal 680 and 690 of FIG. 11B, once the rules of assignment described above are followed. The assignment of signals 608 and 609 of FIG. 11A to respective rectifiers in the positive group of converters 403 and 404 is not influenced by the assignment of signals 608 and 609 of FIG. 11A to respective rectifiers in the negative group of converters 403 and 404, as AC current in the power supply through reactors 541-543 remains unaffected. Similarly, according to one embodiment, the assignment of signals 608 and 609 of FIG. 11A to respective rectifiers in the negative group of converters 403 and 404 is not influenced by the assignment of signals 608 and 609 of FIG. 11A to respective rectifiers in the positive group of converters 403 and 404, as the AC current in the supply through reactors 541-543 remains unaffected.

For example, in FIG. 10A, triggering signals 630, 625, and 632 can be considered to represent signal 680, and triggering signals 624, 631, and 626 can be considered to represent signal 690 from FIG. 11A. FIG. 9A shows the current in AC reactors 541-549 for this sequence of rectifier triggering signals. In FIG. 10B, triggering signals 624, 631, and 626 represent signal 680 and triggering signals 630, 625, and 632 represent signal 690 from FIG. 11A. FIG. 9B shows the current in the AC reactors 541-549 for this sequence of rectifier triggering signals. In both FIGS. 10A and 10B, the positive group of rectifiers has not changed their sequence with respect to V1, V2, and V3. As can be seen in FIGS. 9A and 9B, there is a change in the AC current waveforms at the terminals of each bridge in reactors 544-549, however, the resulting (added) AC currents in 541-543 remain unchanged.

According to one embodiment, an AC power conversion system includes a first AC/DC converter to be coupled to a direct current (DC) load and a multi-phase AC power supply, the first AC/DC converter having multiple rectifiers. The system further includes a second AC/DC converter coupled in parallel with the first AC/DC converter via an interphase transformer to the DC load and the multi-phase AC power supply, the second AC/DC converter having multiple rectifiers. The system further includes a controller coupled to the first and second AC/DC converters, where the controller is configured to generate a gate trigger signal for firing each of the rectifiers for the first and second AC/DC converters. During a first power cycle, a rectifier of the first AC/DC converter is fired at a firing angle advanced to a firing angle of a corresponding rectifier of the second DC/DC converter. During a second power cycle, the rectifier of the first AC/DC converter is fired at a firing angle lagging to a firing angle of the corresponding rectifier of the second AC/DC converter.

According to another embodiment, an AC power conversion system includes at least two AC power converter circuits for coupling respective loads in parallel to a multi-phase AC power supply, each AC power converter circuit containing multiple rectifiers (e.g., six rectifiers) for passing respective phases of the AC power supply in turn at respective firing angles. The system further includes a controller coupled to the at least two AC power converter circuits for symmetrically controlling the rectifiers of the at least two AC power converter circuits, such that the firing angles for the corresponding rectifiers in the at least two AC power converter circuits are substantially equally, but oppositely offset from a nominal control angle. A net current of the at least two AC power converter circuits has a greater number of component pulses than an individual AC power converter operating alone. The system further includes two interphase transformers (IPTs) that are connected between the two positive and two negative DC terminals of each converter circuit. The potential between the midpoint (or center tap) of IPTs is the average of the instantaneous DC voltage between the two positive and two negative rectifier groups in each converter bridge. The load is connected between the two midpoints of the IPT. As a result, the net current of the converters has a greater number of component pulses than for each of converters operating alone.

According to a further embodiment, an AC power conversion system includes a first AC/DC converter to be coupled to a direct current (DC) load and a multi-phase AC power supply, the first AC/DC converter having a first rectifier, a second rectifier, a third rectifier, a fourth rectifier, a fifth rectifier, and a sixth rectifier, forming a first three-phase bridge. The system further includes a second AC/DC converter coupled with the first AC/DC converter via an interphase transformer (IPT) to the DC load and the multi-phase AC power supply, the second AC/DC converter having a seventh rectifier, a eighth rectifier, a ninth rectifier, a tenth rectifier, a eleventh rectifier, and a twelfth rectifier, forming a second three-phase bridge. The first and second three-phase bridges are coupled to each other in parallel. The system further includes a controller coupled to the first and second AC/DC converters, where the controller is configured to generate a gate trigger signal for firing each of the rectifiers for the first and second AC/DC converters.

In one embodiment, during a first power cycle the first rectifier of the first AC/DC converter is fired at a firing angle advanced to a firing angle of the seventh rectifier of the second DC/DC converter, and during a second power cycle, the first rectifier of the first AC/DC converter is fired at a firing angle lagging to a firing angle of the seventh rectifier of the second AC/DC converter. In addition, during the first power cycle, the second rectifier of the first AC/DC converter is fired at a firing angle lagging to a firing angle of the eighth rectifier of the second DC/DC converter, and during the second power cycle, the second rectifier of the first AC/DC converter is fired at a firing angle advanced to a firing angle of the eighth rectifier of the second AC/DC converter.

In one embodiment, during the first power cycle, the third rectifier of the first AC/DC converter is fired at a firing angle advanced to a firing angle of the ninth rectifier of the second DC/DC converter, and during the second power cycle, the third rectifier of the first AC/DC converter is fired at a firing angle lagging to a firing angle of the ninth rectifier of the second AC/DC converter. In addition, during the first power cycle, the fourth rectifier of the first AC/DC converter is fired at a firing angle lagging to a firing angle of the tenth rectifier of the second DC/DC converter, and during the second power cycle, the fourth rectifier of the first AC/DC converter is fired at a firing angle advanced to a firing angle of the tenth rectifier of the second AC/DC converter.

In one embodiment, during the first power cycle, the fifth rectifier of the first AC/DC converter is fired at a firing angle lagging to a firing angle of the eleventh rectifier of the second DC/DC converter, and during the second power cycle, the fifth rectifier of the first AC/DC converter is fired at a firing angle advanced to a firing angle of the eleventh rectifier of the second AC/DC converter. In addition, during the first power cycle, the sixth rectifier of the first AC/DC converter is fired at a firing angle advanced to a firing angle of the twelfth rectifier of the second DC/DC converter, and during the second power cycle, the sixth rectifier of the first AC/DC converter is fired at a firing angle lagging to a firing angle of the twelfth rectifier of the second AC/DC converter.

Referring back to FIG. 6B, as converters 403-404 are coupled on the DC load 407 via interphase transformers 405-406 and converters 403-404 are symmetrically controlled. DC reactors limiting the rate of rise of circulating current between the positive set of rectifiers and the negative set of rectifiers can be used in place of the IPTs. The decision in practice of whether to use DC reactors or IPTs would normally be an economic one influenced by the application and system parameters such as AC supply frequency, AC supply voltage, and raw material costs, and so on. The purpose of the IPT (or DC reactor) is to limit the circulating current between positive and negative sets of rectifiers in each bridge. The net current provided by converters 403-404 includes more component pulses than a produced if each of the converters 403-404 operated alone on the three-phase supply. As a result, at least some higher order harmonics in the net current are partly cancelled.

Referring to FIG. 6B, using a neutral (or earth) as a reference for the positive and negative voltages of each bridge (Vp1, Vp2, Vn1, Vn2), the positive terminal of load 407, designated '+', is equal at all times to one half the addition of Vp1 and Vp2 (waveform 1210).

Using the neutral (or earth) point as a reference the negative terminal of load 407, designated '−' is equal at all times to one half the addition of Vn1 and Vn2 (waveform 1212). The resulting voltage across the load is the difference between plus (+) and minus (−), or the difference between waveforms 1210 and 1212. This is represented by waveform 1213, as can be seen this is a low amplitude voltage with a 12 pulse (600 Hz) ripple.

FIG. 11B shows various DC voltage waveforms for the conversion system shown in FIG. 6B according to one embodiment. Waveform 1202 contains graphs of the cathode (Vp1, Vp2) DC voltage of converter circuit 403-404, and waveform 1204 contains graphs of the anode (Vn1, Vn2) DC voltage of converter circuit 403-404, when an offset $\Delta\alpha$ is used. Waveforms 1203 and 1205 represent the voltages across the windings of the interphase transformers 405-406, respectively. One purpose of the interphase transformers 405-406 is to limit the circulating current between the positive and negative rectifier groups, respectively. A circulating current may be formed when there is an instantaneous voltage difference between the nodes Vp1 and Vp2, or Vn1 and Vn2. Specifically, at the instant when one rectifier of the positive group of 403 is fired in advance of a rectifier in positive group of converter 404 (e.g. rectifier 521 is fired in advance to rectifier 527), a voltage may appear between nodes Vp1 and Vp2 equal to substantially the instantaneous difference between node voltage 501 and 503 at the time of firing.

Additionally, when one rectifier of the negative group of 403 is fired in advance (or delay) of a rectifier in the negative group of converter 404 (e.g. rectifier 524 is fired in advance to rectifier 530), a voltage may appear between nodes Vn1 and Vn2 equal substantially to the difference between node voltage 501 and 503. The magnitude of the instantaneous voltage is dependent on the circuit parameters such as AC voltage, supply impedance, average alpha delay angle etc. The duration, in degrees, of the voltage difference between nodes Vp1 and Vp2 is substantially equal to twice the alpha offset angle, or $2\Delta\alpha$. The magnitude and duration of the voltage difference affect the size and cost of the interphase transformer or DC reactor. For low supply frequency applications, an IPT may be a cheaper alternative to limiting the circulating current. For high frequency applications, a DC reactor may be more economical at limiting the circulating current. However, the logic behind this is largely influenced by the cost of raw materials at any one time and is therefore subject to change according to respective global market conditions. The result is a low amplitude voltage with 12 pulse ripple on the DC load 407, as shown in waveform 1206.

Figure 6C:
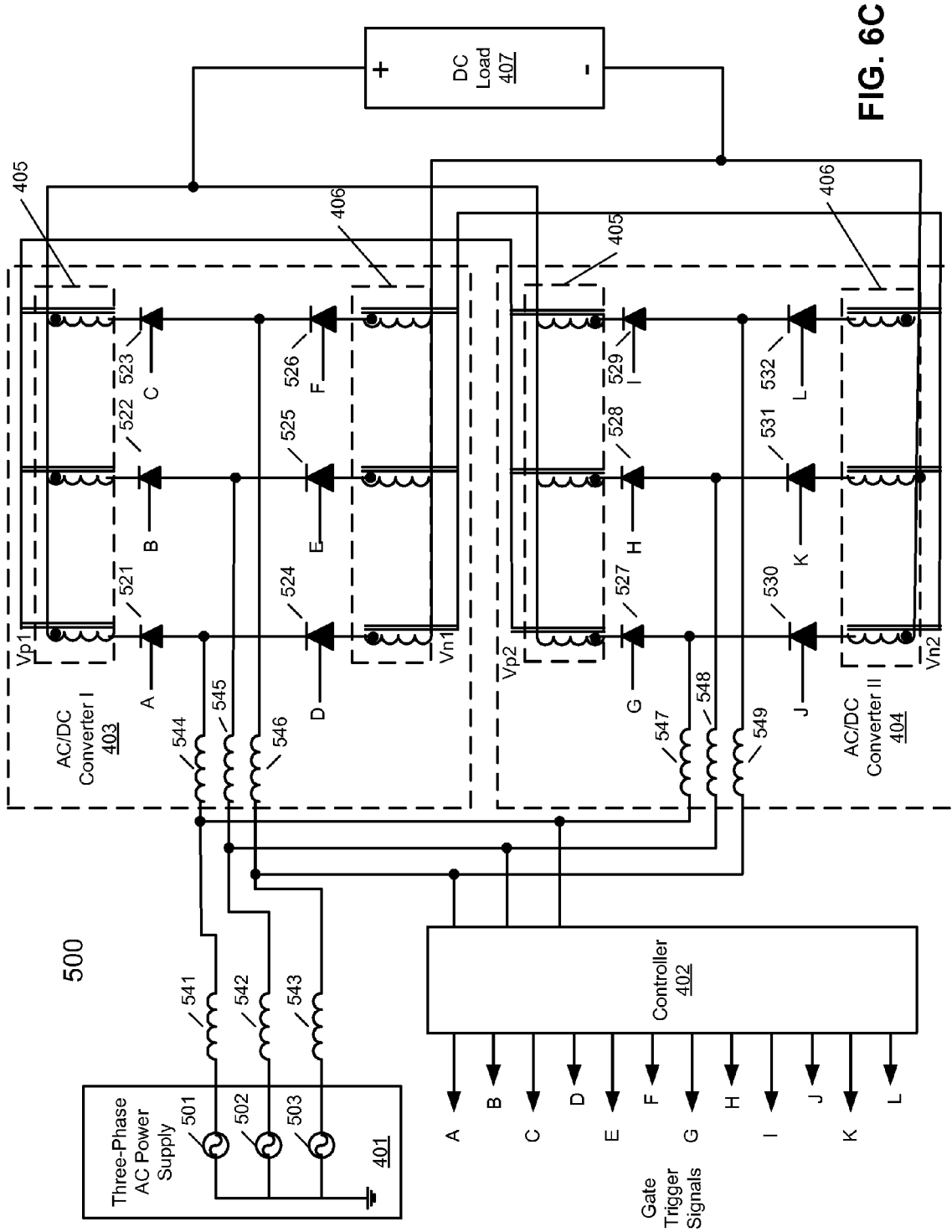

In a further embodiment the IPTs may be inserted in series with individual thyristors, as shown in FIG. 6C. While the electrical performance of the bridge remains substantially identical to that of FIG. 6B described above, in some applications it can be advantageous for assembly sizing to insert the windings of the IPT in a low current rectifier path rather than the high current path of the DC terminals. Additionally, the IPT coils can be carefully physically arranged on the magnetic core to provide the necessary amount of series (leakage) reactance to, in combination with the RC snubbers across each rectifier (not shown for simplicity), protect the rectifiers at turn off. This means the separate line reactors 541-549 are substantially not required to be included in the circuit for protection of the rectifiers, therefore in some applications offering further energy and cost savings.

While the example described and illustrated in this application uses a $\Delta\alpha$ of approximately 15°, $\Delta\alpha$ can be arbitrarily selected for the most appropriate operations. In one embodiment, the operation in the region of the 15° is generally referred to as, for a $\Delta\alpha$ of 15°, the fifth harmonic is reduced to about 6%, while also reducing other higher order harmonic components. In addition, a $\Delta\alpha$ equal to 15° produces a symmetric 12 pulse current in the supply. If a $\Delta\alpha$ of approximately 18° is chosen, the fifth harmonic is substantially reduced or eliminated.

A 12 pulse ripple is desirable as frequency dependent loads, such as the DC inductor can be reduced in capacity to approximately a quarter of that used in systems which provide symmetric 6 pulse operation. Further, the response time of the system is halved from approximately 3.33 milliseconds in a classical (typical) six pulse thyristor bridge (FIG. 1) to approximately 1.67 milliseconds in the case of $\Delta\alpha$=15 degrees. The dynamic response is also significantly faster than in a classical six pulse bridge due to the lower necessary DC impedance. The value of $\Delta\alpha$ can be set at a fixed value for a given application, or periodically adjusted. As an example, a control algorithm can be implemented on a microprocessor or controller to adjust $\alpha$ and/or $\Delta\alpha$ as required.

In one embodiment, the interphase transformers 405-406 are much smaller and more efficient than the three-phase transformers used in existing phase shifting applications as described above. Phase shifting transformers are triple wound, galvanically isolated magnetic components that are expensive, bulky and inefficient. Also, inrush currents of fully rated phase shifting transformers are avoided. Each of interphase transformers 405-406 has two windings, and is rated for the difference in voltage between two converters 403-404 and operates at approximately 1.5 times the supply frequency. The interphase transformers 405-406 may be gapped to prevent saturation due to a difference in DC currents. Alternatively, the firing angles of the positive or negative group of rectifiers can be adjusted slightly to ensure equal DC currents flow through the windings of the interphase transformers 405-406.

According to a further embodiment, two or more converter circuits of the type described above can be paralleled to produce waveforms having more component pulses. For example, the addition of a converter circuit can be arranged to produce 18 pulse current waveforms, providing even lower supply harmonic distortion (see FIG. 11D). An additional pair of converter circuits can be arranged to produce 24 pulse AC current waveforms, and so on.

As indicated by the various cases, the described method of symmetrical phase control is applicable through the full range of converter phase angle control, making it suitable for conversion, inversion, or reactive converter operations. The described conversion system avoids the need for splitting and phase shifting the power supply using bulky transformers. The control of gating pulses allows harmonic current cancellation, and thus a significantly decreased level of harmonic distortion drawn from the power supply.

Figure 20A:
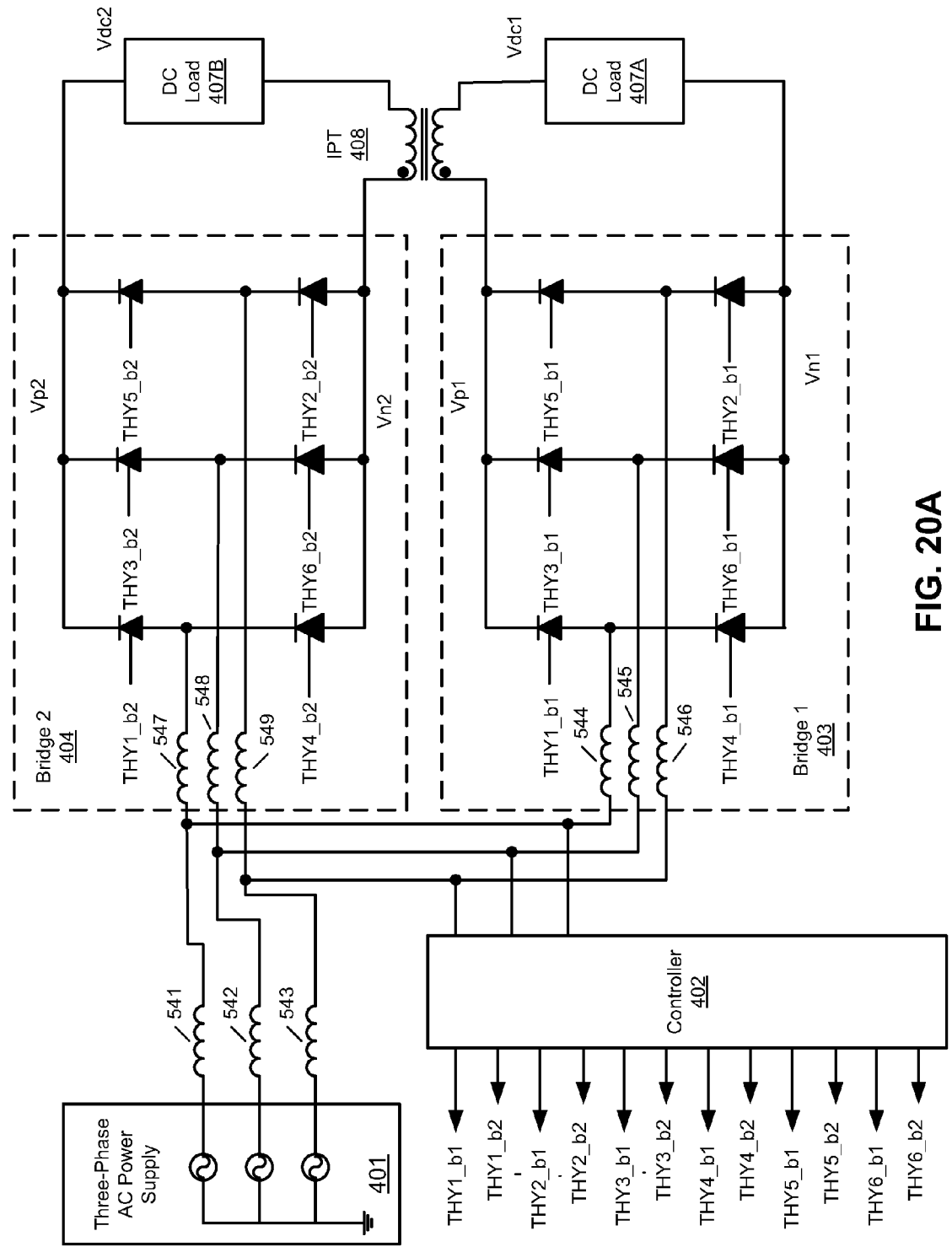
FIGS. 20A and 20B are schematic diagrams illustrating converter circuits according to some embodiments of the invention.

In another embodiment, as shown in FIG. 20A, the DC terminals of each bridge are coupled to each other only magnetically through the IPT coils, and there is no physical conductive connection between the DC terminals. In this embodiment, there are now two pairs of DC terminals for which to connect two separate loads. The load can be a battery or a resistance, similar to FIGS. 6A, 6B, and 6C. The advantage of this embodiment is that two separate IPTs 405 and 406 shown in FIG. 6A have been reduced to a single IPT of substantially the same rating as IPT 405 and 406 combined. The firing sequence of the controller 402 of FIGS. 20A and 20B is identical to those detailed in FIGS. 7-10.

Figure 21:
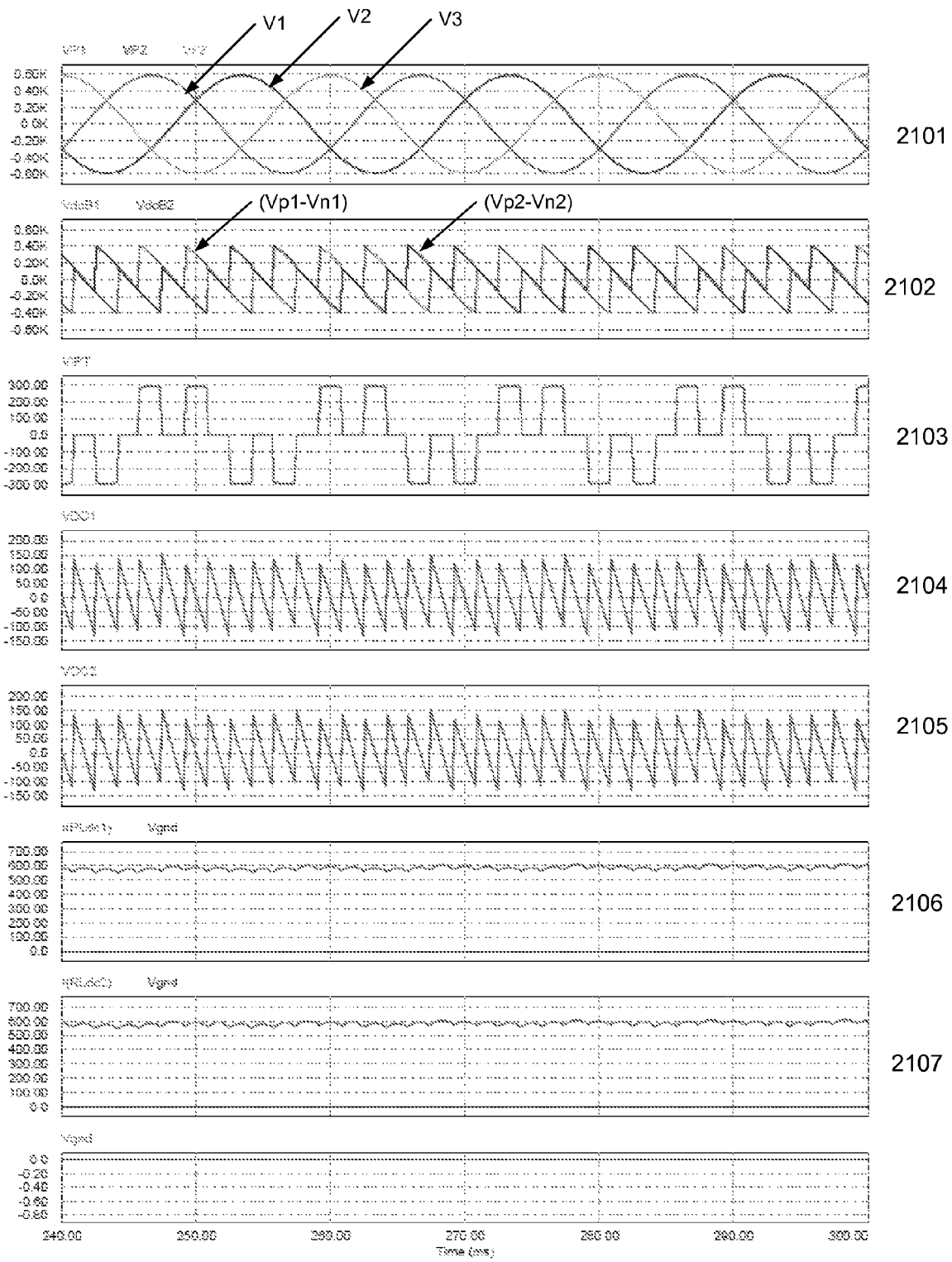
FIG. 21 shows certain waveforms of a three-phase converter circuit as shown in FIG. 20A.

FIG. 21 shows various DC voltage and current waveforms of each bridge 403 and 404 according to one embodiment. Waveform 2102 contains graphs of the DC voltage of converter circuit 403-404. The DC voltage of converter 403 is defined as the difference between Vp1 and Vn1. The DC voltage of converter 404 is defined as the difference between Vp2 and Vn2. Waveform 2103 represents the voltage across one winding of the interphase transformer 408. Due to a phase shift between the two bridges 403 and 404 (the phase shift reverses polarity every 2 power cycles, but the magnitude remains the same) there is a transmission of voltage from one bridge to another via the IPT. This results in a 12 pulse DC ripple voltage across each load 407a and 407b, as shown in waveform 2104 and 2105 respectively. Waveform 2106 and 2107 show the DC current through DC load 407a and 407b, respectively.

Figure 20B:
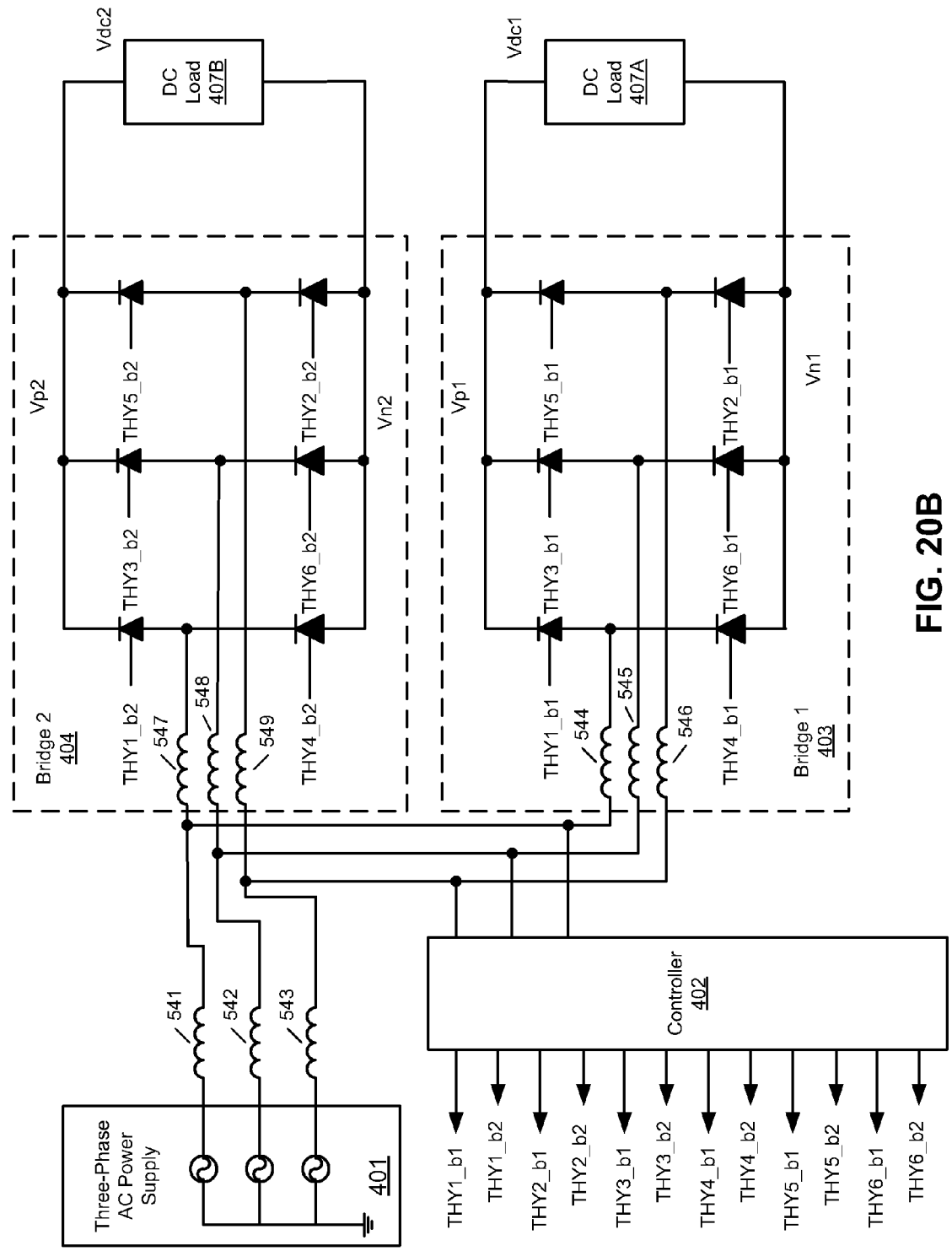

Another embodiment is shown in FIG. 20B. FIG. 20B shows a circuit with all elements and firing signals identical to FIG. 20A but with the IPT 408 removed. The AC current waveforms through reactors 541-543 are substantially the same as for the system of FIG. 20A, however, the required size of the DC reactor 407a and 407b is larger in order to obtain the same harmonic distortion in the AC supply currents through reactors 541-543. This is because the removal of the IPT 407 has rendered the DC voltage ripple across each load 407a and b to be essentially 6 pulses. The phase shift between converters 403 and 404 still provides harmonic cancellation.

Fixed Displacement Firing Embodiments

Figure 22A:
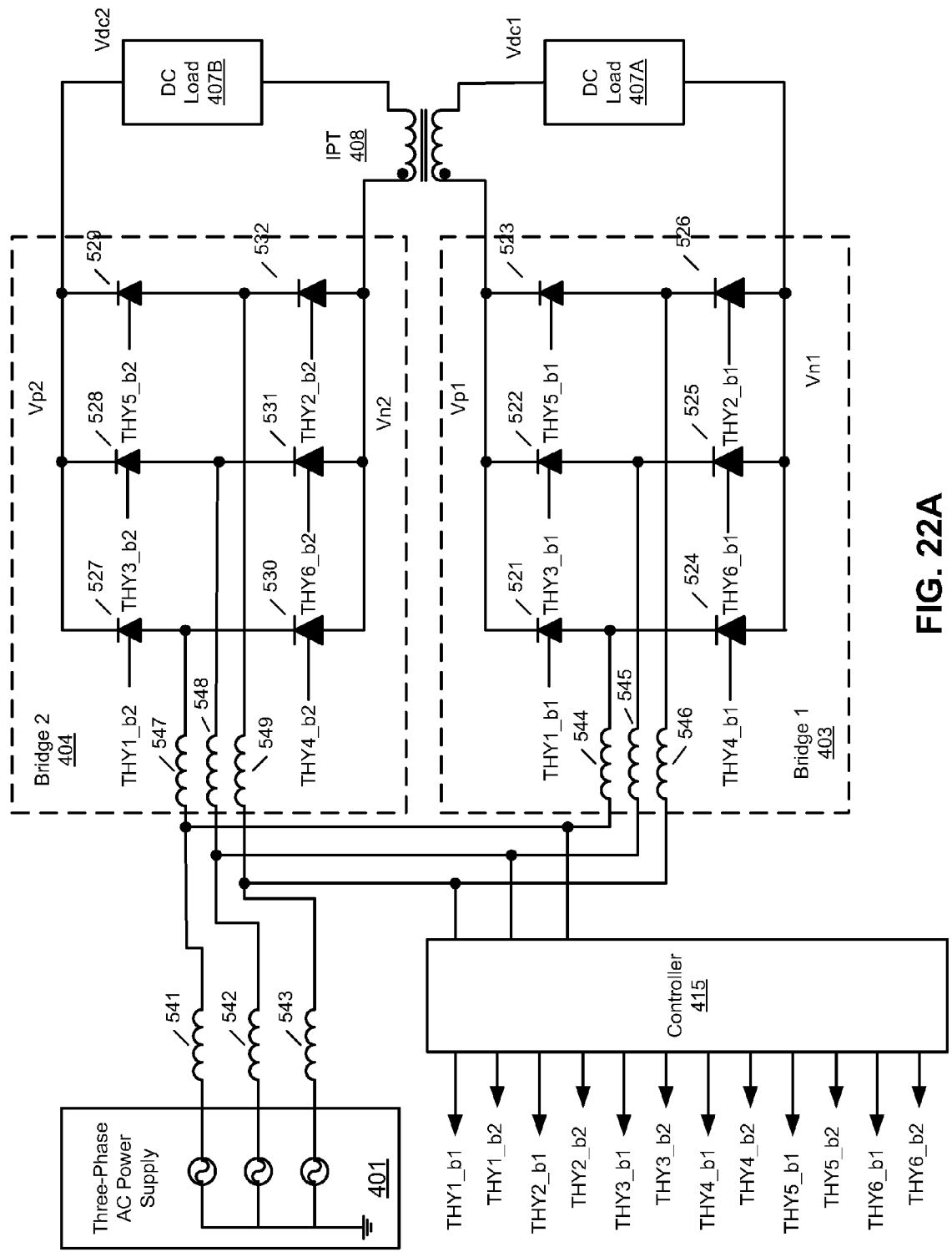
FIGS. 22A and 22B are schematic diagrams illustrating converter circuits according to some embodiments of the invention.
Figure 22B:
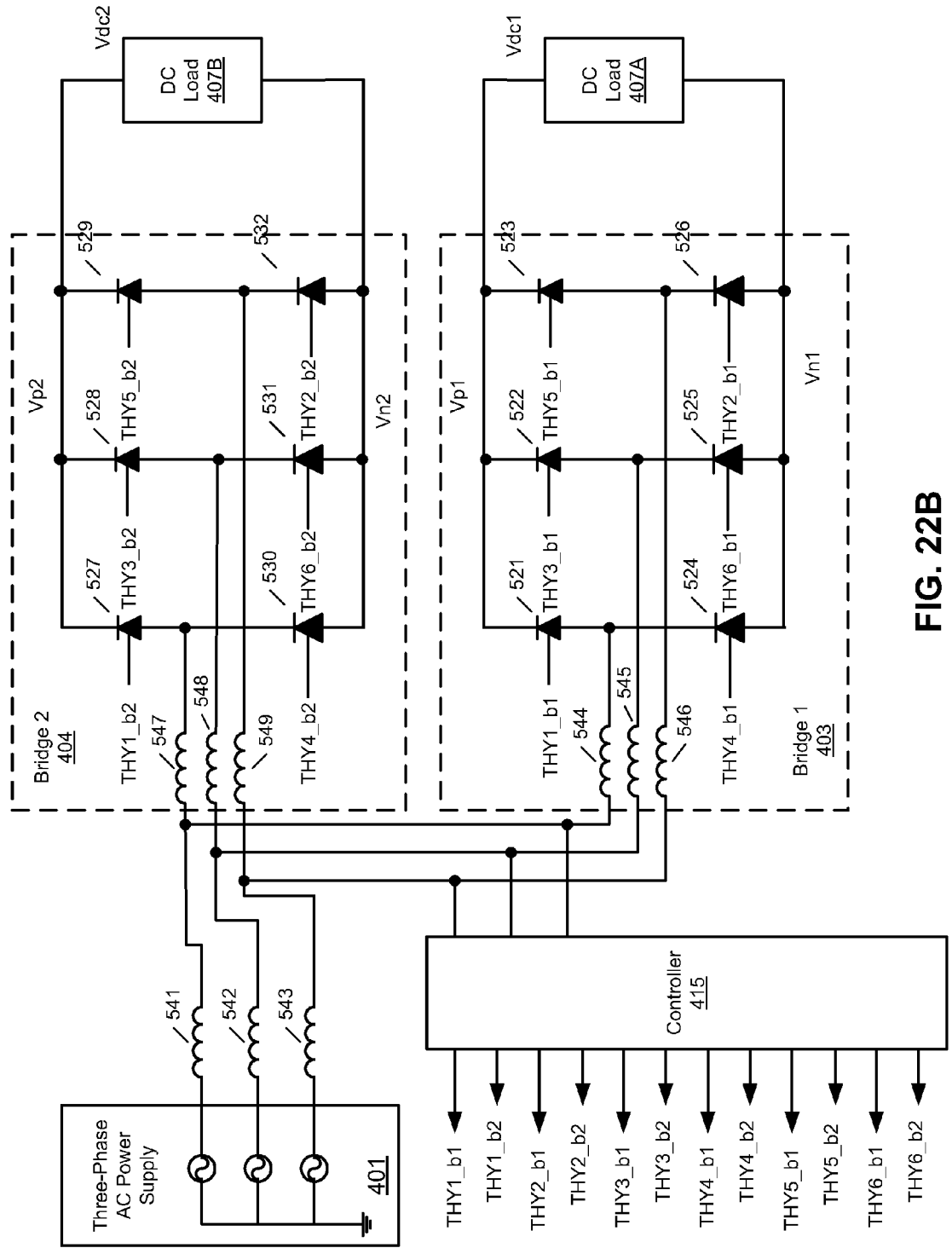

According to some embodiments, the rectifiers in bridges 403 and 404 of FIG. 20 can be controlled using a different technique to the one illustrated in FIGS. 7 to 11. FIG. 22A is a schematic diagram similar to FIG. 20 but with a different controller 415. In one embodiment, the controller 415 triggers rectifiers at a delay angle from their respective anode-cathode zero crossing according to the group in which they belong inside bridge 403 and 404. Each converter circuit is controlled by controller 415 for symmetrically controlling the respective rectifier groups so that the firing angles for the respective rectifier groups in each converter circuit are substantially equally but oppositely offset from a nominal control angle (also referred to as a base or average angle). The firing signals from controller 415 are fixed for each group of rectifiers, and do not change within each period, or from period to period. As a result, the net (or combined) AC and DC current of the converter circuits has a greater number of component pulses than if either converter circuit operated alone.

Referring to FIG. 22A, converters 403-404 are referred to as three-phase bridges. Rectifiers 521, 522, and 523 are referred to as the positive group of rectifiers of converter 403. Rectifiers 527, 528, and 529 are referred to as the positive group of rectifiers of converter 404. Rectifiers 524, 525, and 526 are referred to as the negative group of rectifiers of bridge 403. Rectifiers 530, 531, and 532 are referred to as the negative group of rectifiers of bridge 404. According to one embodiment, FIG. 22A is controlled at a nominal control angle $\alpha$ (in the case illustrated in this paper alpha is approximately 90 degrees), therefore drawing substantially only reactive power from the AC supply 401 in this example. The DC loads, 407a and 407b, is considered mostly inductive. Rectifier groups inside converter circuits 403-404 are switched in a complementary fashion, at firing angles which are substantially equally offset (offset, meaning advanced or delayed, or added/subtracted) from the nominal control angle by an offset angle $\Delta\alpha$. Firing signal delay or advance from controller 415 to each rectifier group are constant and are not cyclic (i.e. they do not change from power cycle to power cycle).

In one embodiment, the positive rectifier group of converter 403 containing rectifiers 521, 522, and 523 is fired, in every power cycle, at an advanced offset angle Ao to a nominal delay angle $\alpha$. Conversely, the positive rectifier group of converter 404 containing rectifiers 527, 528, and 529 is fired, in each power cycle, at a delayed offset angle $\Delta\alpha$ to a nominal delay angle $\alpha$. Additionally, the negative rectifier group of converter 403 containing rectifiers 524, 525, and 526 is fired, in every power cycle, at an delayed offset angle $\Delta\alpha$ to a nominal delay angle $\alpha$. Conversely, the negative rectifier group of converter 404 containing rectifiers 530, 531, and 532 is fired, in each power cycle, at an advanced offset angle $\Delta\alpha$ to a nominal delay angle $\alpha$.

Within a converter, the positive and negative groups of rectifiers may have opposing offset angle polarity. If the positive group of converter 403 is chosen to be fired at an offset angle that is advanced from the nominal delay angle then negative group of rectifiers of converter 403 may be fired at an offset angle that is delayed from the nominal delay angle $\alpha$.

Between converters 403 and 404, the positive and negative groups of rectifiers may have opposing offset angle polarity. If the positive group of converter 403 is chosen to be fired at an offset angle that is advanced from the nominal delay angle, then the positive group of converter 404 must be fired in a complementary fashion at an offset angle that is delayed from the nominal delay angle $\alpha$.

Figure 23:
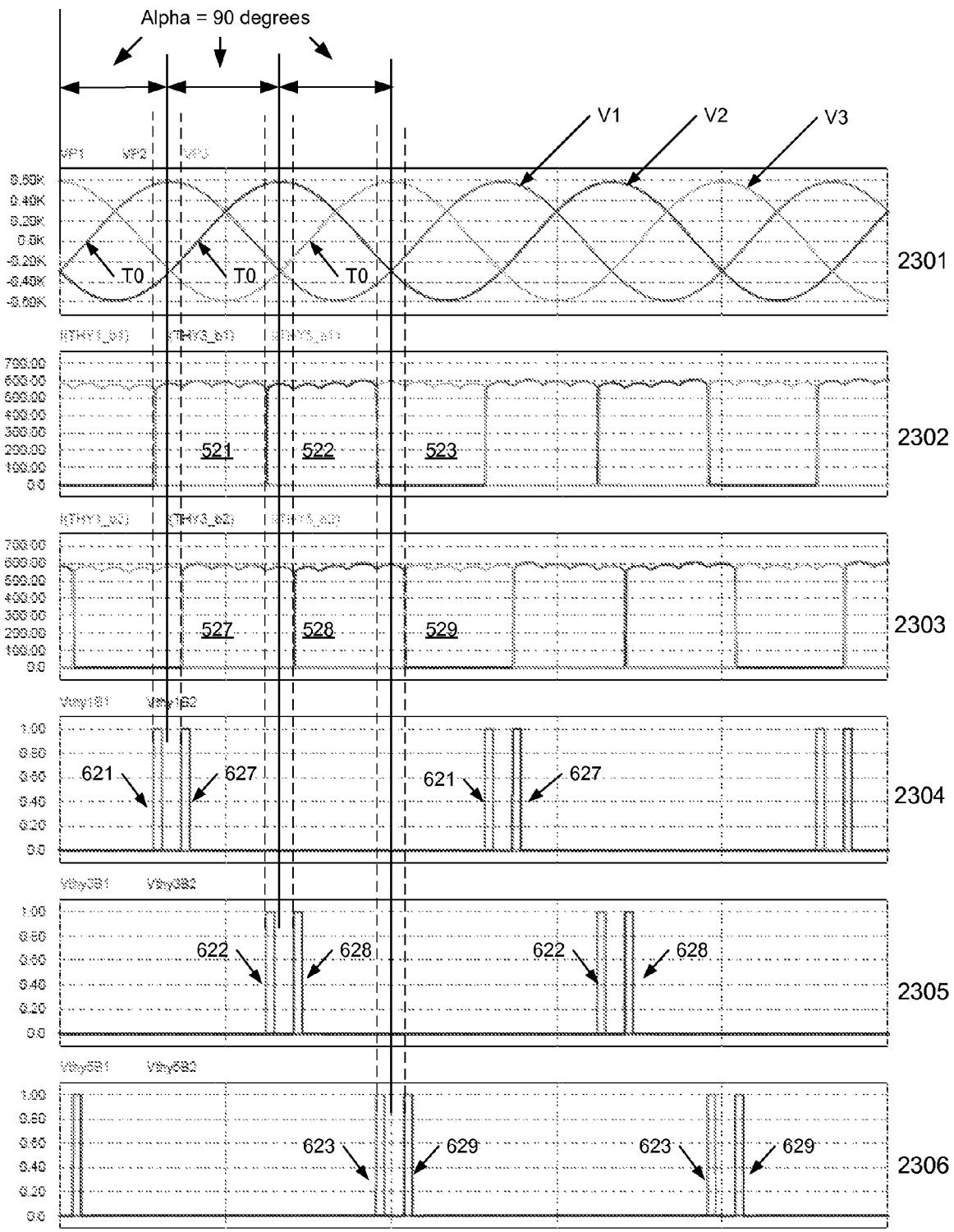
FIGS. 23-27 show certain waveforms of a three-phase converter circuit as shown in FIG. 22A.
Figure 24:
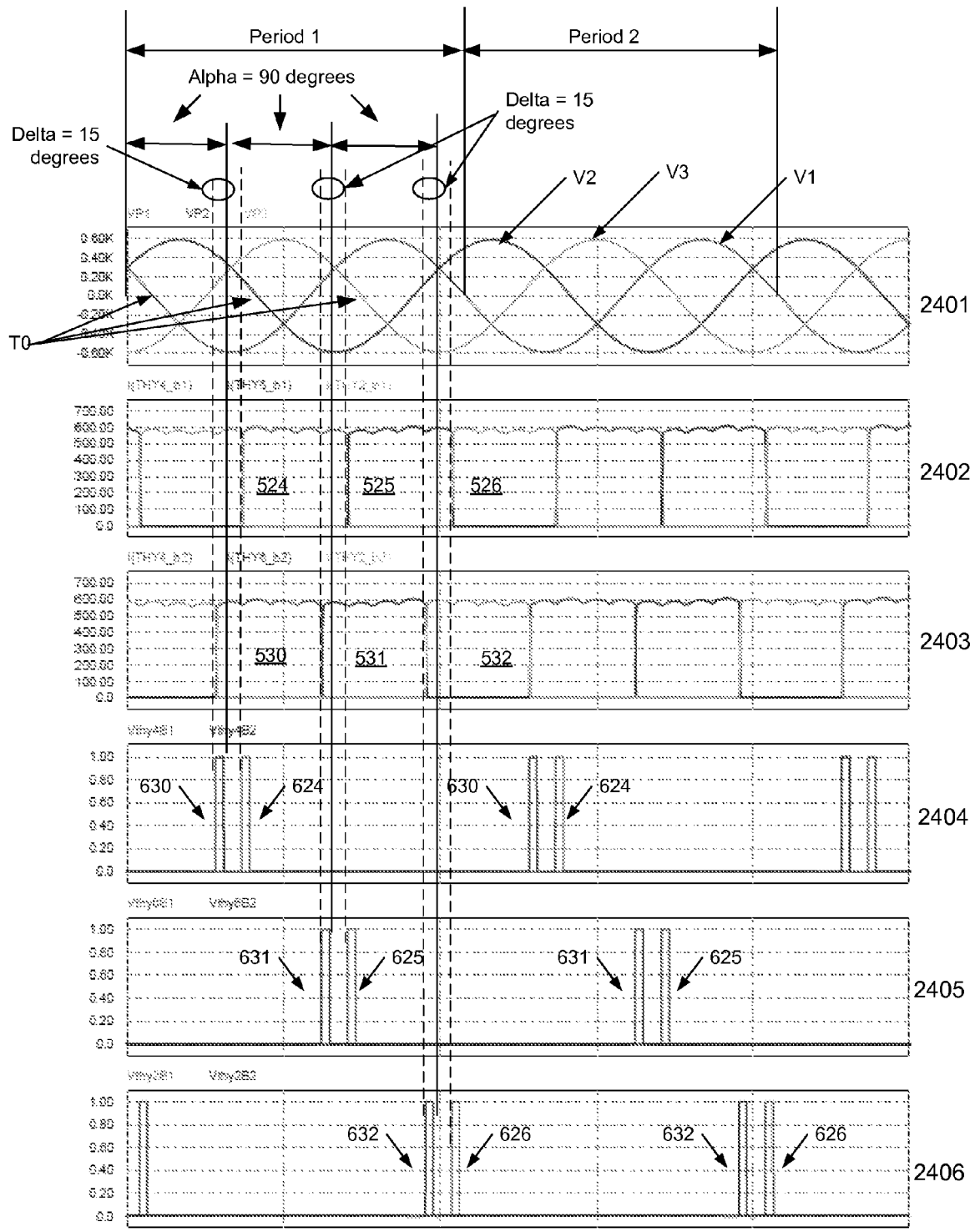
Figure 25:

Referring to FIGS. 23 and 24. For purpose of illustration, the firing sequence of the positive group of rectifiers of bridges 403 and 404 (FIG. 23) and the negative group of rectifiers (FIG. 24) is shown in separate figures. FIG. 25A shows the AC current in each converter 403 and 404 (the current through reactors 544-549) and the total combined AC current of bridges 403 and 404 (the AC current through reactors 541-543).

Waveform 2301 is the three-phase line to line voltage of the AC supply used as a reference by controller 415 to produce signals 621-623 and 627-629 to fire positive group rectifiers 521-523 and 527-529, respectively. T0 of V1, V2, and V3 in waveform 2301 is referred to as the anode-cathode zero voltage crossover point for positive group thyristors 521-527, 522-528, and 523-529, respectively. V1 is defined as the difference in potential between AC node voltage 501 and 503. V2 is defined as the difference in potential between AC node voltage 502 and 501. V3 is defined as the difference in potential between AC node voltage 503 and 502. Waveform 2302 shows the instantaneous current through each of rectifiers 521, 522, and 523, and waveform 2303 is the instantaneous current through each rectifier 527, 528, and 529, shown over two power cycles. Waveform 2304 shows the gate trigger signals 621 and 627 generated by controller 415 to fire rectifiers 521 and 527. Waveform 2305 shows the gate trigger signals 622 and 628 for rectifiers 522 and 528. Waveform 2306 shows the gate trigger signals 623 and 629 for rectifiers 523 and 529.

Waveform 2401 is the three-phase reference voltage of the AC supply used as a reference by controller 415 to produce signals 624-626 and 630-632 to fire negative group rectifiers 524-526 and 530-532, respectively. T0 of V1, V2, V3 in waveform 2401 is considered the anode-cathode zero voltage crossover point for negative group thyristors 524-530, 525-531, and 526-532, respectively. Waveform 2402 shows the instantaneous current through each of rectifiers 524-526 and waveform 2403 is the instantaneous current through each of rectifiers 530-532, shown over two power cycles. Waveform 2404 shows gate trigger signals 624 and 630 generated by controller 415 to fire rectifiers 524 and 530. Waveform 2405 contains gate trigger signals 625 and 631 for rectifiers 525 and 531. Waveform 2406 contains gate trigger signals 626 and 632 for rectifiers 526 and 532.

Waveform 2501 of FIG. 25A is similar to waveform 2301. Referring to FIG. 22A, waveform 2502, 2503, and 2504 show the AC current through reactors 544, 547, and 541, respectively. Waveform 2505, 2506, and 2507 show the AC current through reactors 545, 548, and 542, respectively. Waveform 2508, 2509, and 2510 show the AC current through reactors 546, 549, and 543, respectively.

Figure 26:
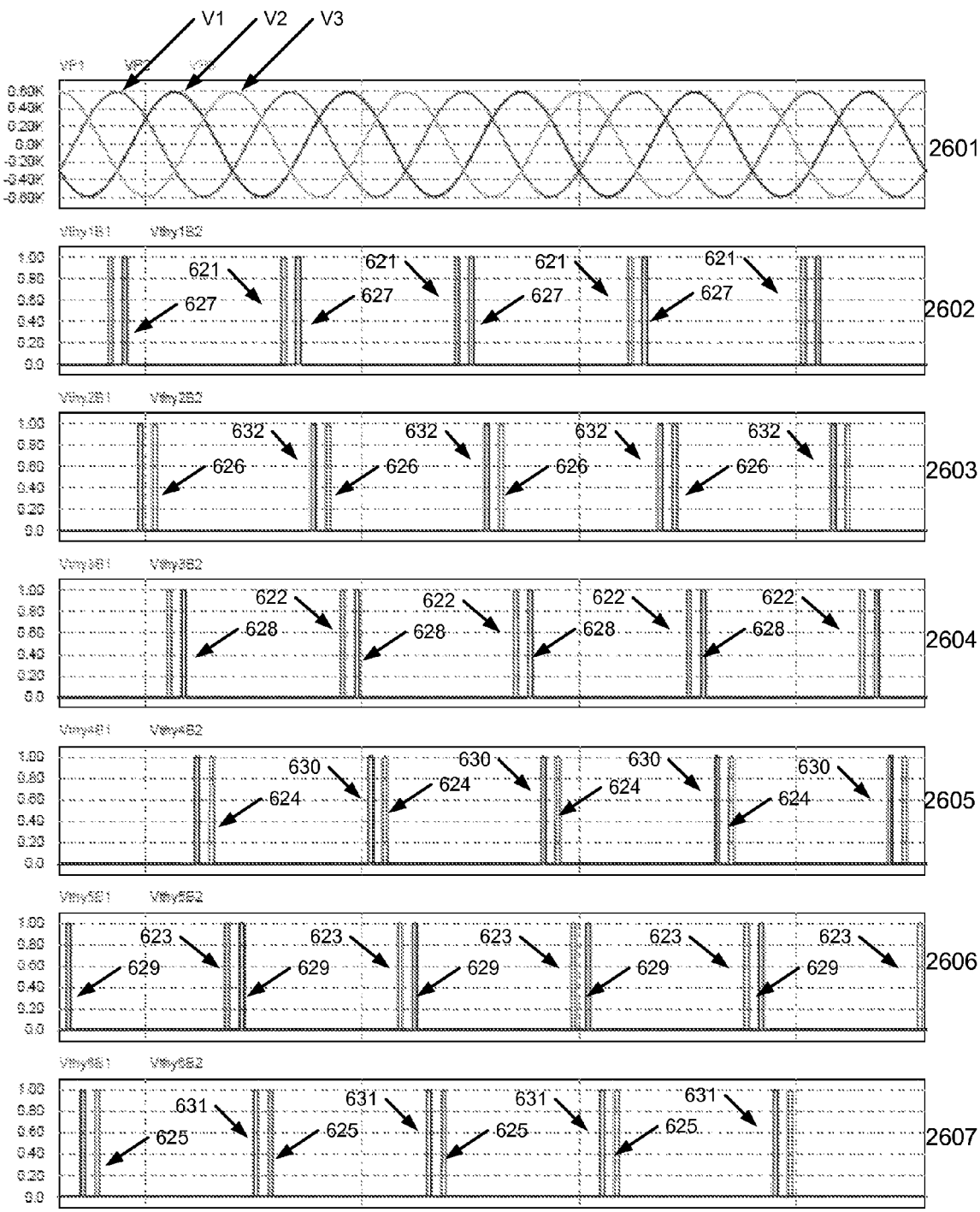

Waveform 2601 of FIG. 26 is similar to waveform 2301. Referring to FIG. 26, waveforms 2602-2607 show gate trigger signals, over 4 power cycles, of rectifiers 521 and 527, 526 and 532, 522 and 528, 524 and 530, 523 and 529, and 525 and 531, respectively.

Figure 27:
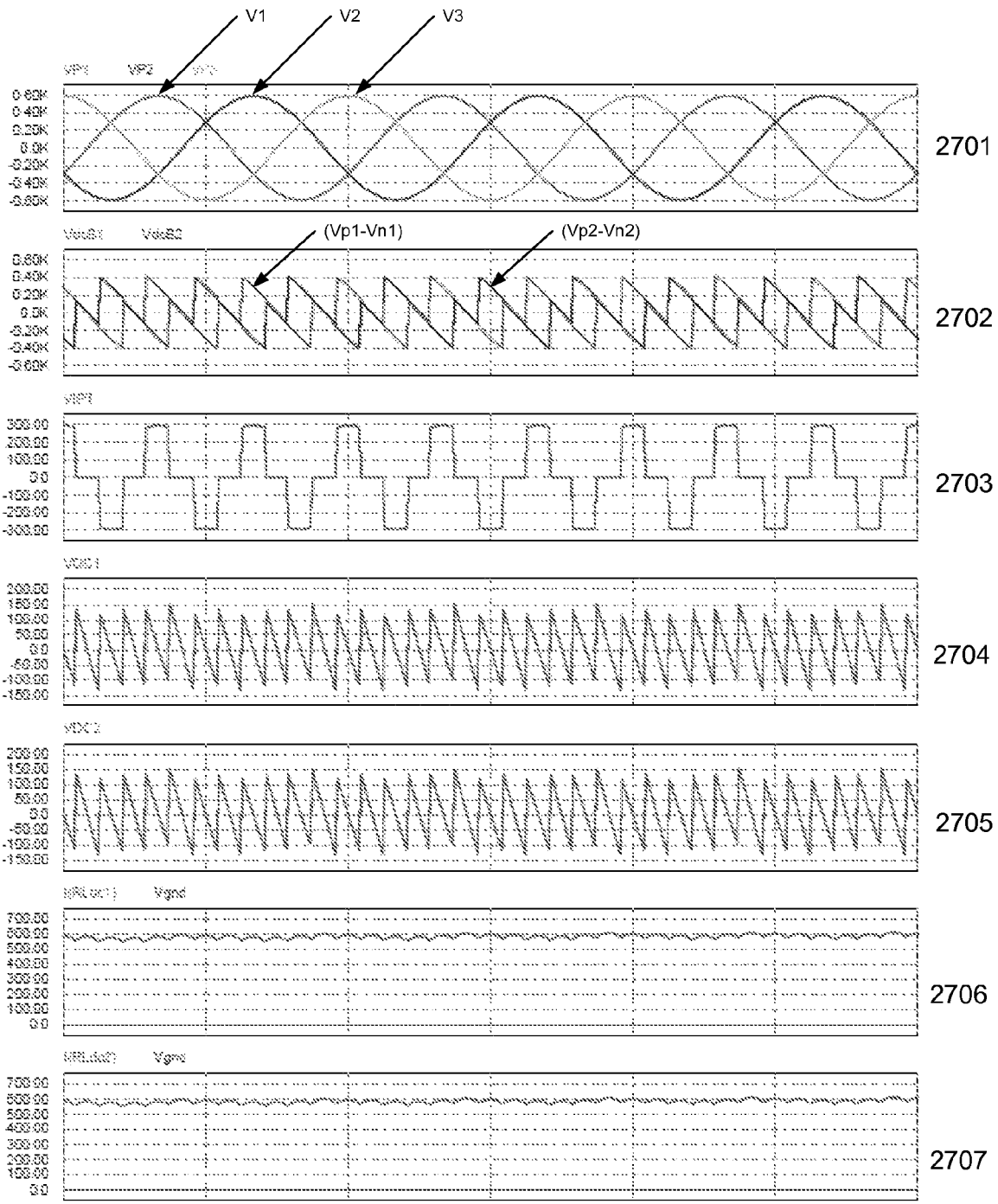

FIG. 27 shows the voltage waveforms and DC current on the DC side of the bridges 403 and 404. Waveform 2702 shows the DC voltage of each bridge (i.e. Vp1-Vn1, and Vp2-Vn2) on the same axis. Waveform 2703 shows the voltage across one IPT coil. Waveform 2704 and 2705 are substantially the same, showing the resulting 12 pulse, low amplitude voltage ripple across each load 407a and 407b. Waveform 2706 and 2707 show the DC current in each bridge.

Referring back to FIG. 23, which contains the firing sequence for the positive group of rectifiers in converters 403 and 404, the nominal alpha delay angle $\alpha$, for both bridges 403 and 404 is 90 degrees (shown as a continuous line). The nominal alpha control angle is the delay, in degrees, between the anode-cathode zero voltage crossover (shown as T0 for each respective phase and rectifier) and the trigger signal generated by controller 415 for the relevant rectifier. A positive voltage trigger signal voltage will turn on rectifier 521, corresponding to an instantaneous rise of current through the device (waveform 2302). All rectifiers 521-532 in this example are considered line commutated devices, (e.g. thyristors) meaning the process of turn off is not gate controlled but controlled by the AC voltage of the supply. Hence, no gate signals for turn off are shown (or required in practice). Observing waveform 2301 as a reference voltage, it can be seen that rectifier 521 is fired at an alpha delay angle of $(\alpha-\Delta\alpha)$ in each period. In each period, rectifier 527 is fired in a complementary fashion to rectifier 521, while rectifier 527 is fired at an alpha delay angle of $(\alpha+\Delta\alpha)$. Waveform 2304 shows the gate signals 621 and 627 for corresponding rectifiers 521 and 527 respectively in bridge 403 and 404 on the same axis to give the reader a clearer understanding of the unchanged symmetry of the firing signals about a nominal delay angle, $\alpha$, on a cycle per cycle basis. $\Delta\alpha$ in this example is approximately 15 degrees.

Additionally in FIG. 23, within each of bridges 403 and 404, the switching order (i.e. the order that each rectifier belonging to the same group is switched within a single power cycle) of each rectifier is shown. In the positive and negative rectifier group of each of converters 403 and 404, within a single power cycle, each rectifier conducts for substantially 120 degrees before the next rectifier in the same group (positive or negative) is triggered. Triggering of the next rectifier in succession may switch off the previous rectifier in the same group. In this example, there are three rectifiers in each group each conducting for approximately 120 degrees of a power cycle, adding to approximately 360 degrees for a full power cycle. As can be seen in FIG. 23, a rectifier of any group conducts once per power cycle, triggered at an offset angle to the nominal delay angle that is the same in polarity each power cycle.

It is useful to note that the polarity of the offset angle $\Delta\alpha$ chosen for positive and negative groups in each bridge 403 and 404 has no substantial effect on the line current supplied by the AC supply 401. It may be only essential to ensure the polarity of the offset angle $\Delta\alpha$ is opposite between respective positive rectifier groups of 403 and 404 and negative rectifier groups of 403 and 404. Also, it is important that the offset angle $\Delta\alpha$ of the positive and negative rectifier groups within a bridge 403 or 404 may be opposite in polarity.

Single-Phase Converter Embodiments

Figure 12:
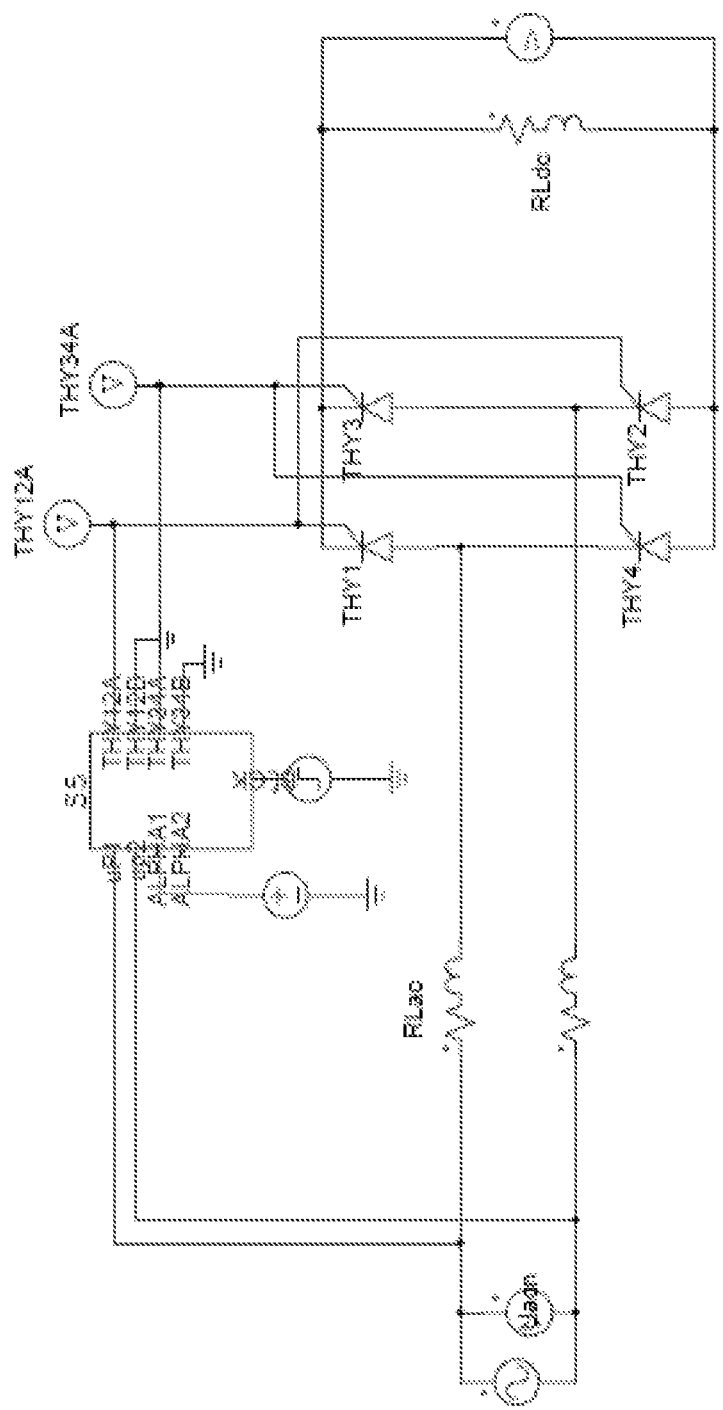
FIG. 12 is a schematic diagram illustrating a typical single-phase converter.

According to some embodiments, the techniques described above can also be applied to single-phase converters. FIG. 12 is a schematic diagram illustrating a conventional single-phase converter. Referring to FIG. 12, the converter contains four switches and one AC power supply. Each switch conducts current for 180 degrees out of 360 degrees in a power cycle. During the positive half cycle of the AC power sine wave, thyristors 1 and 2 are fired (substantially simultaneously) at an angle of alpha delay past the zero crossing of their anode cathode voltage. Alpha can have a range of 0 to 90 degrees in the case where the bridge is acting as a rectifier and 90 to 180 degrees in the case where the converter is acting as an inverter.

Figure 13:
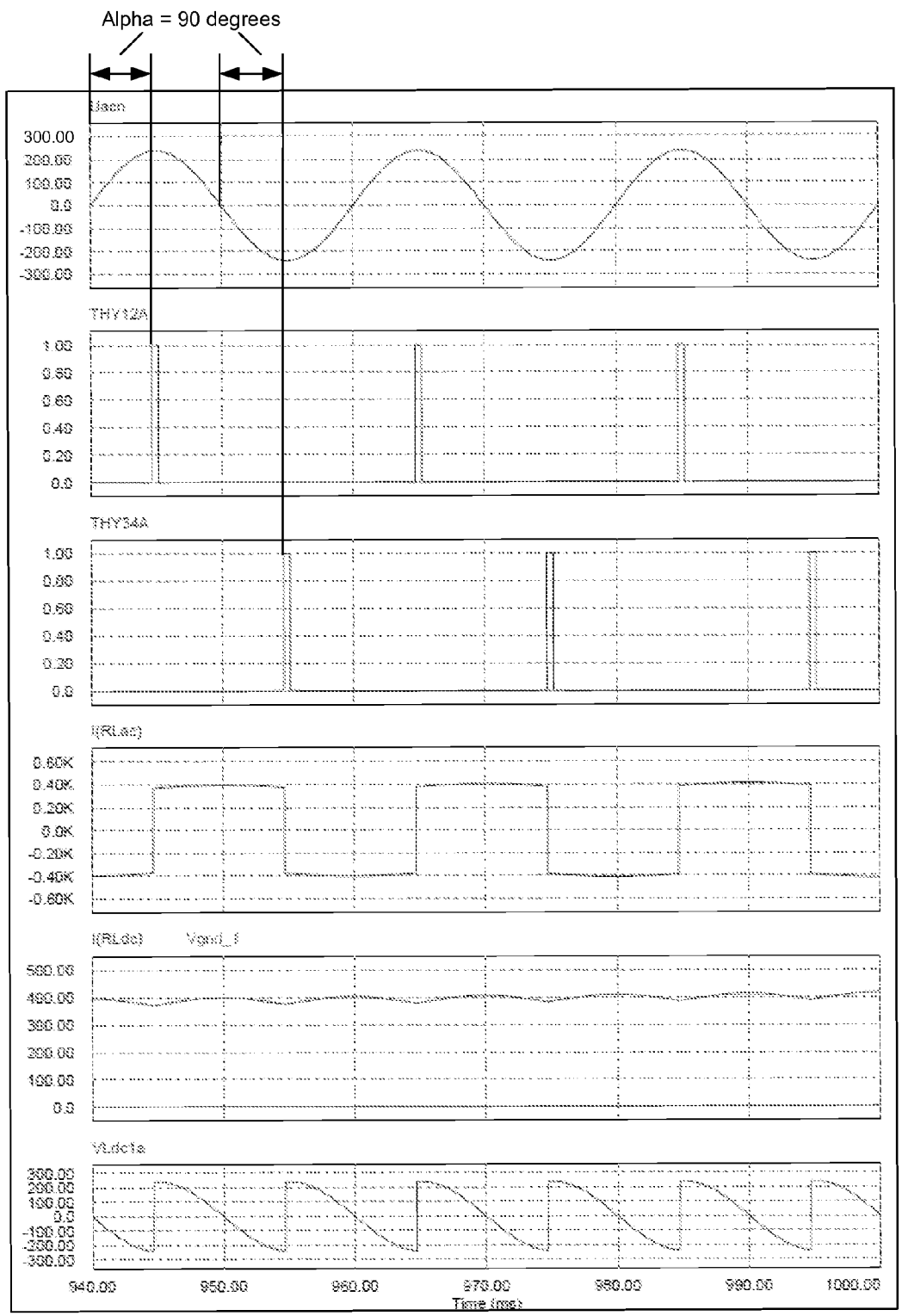
FIG. 13 is a diagram illustrating waveforms of various nodes for the circuit shown in FIG. 12.

During the negative half cycle of the AC power sine wave thyristors 3 and 4 are fired (simultaneously) at an angle of delay past the zero crossing of their anode to cathode voltage. The resulting current waveform is shown in FIG. 13. At all times, irrespective of alpha angle of delay, each thyristor conducts current for 180 degrees, or half a power cycle. The resulting AC line current, drawn from the AC power supply, is shown in FIG. 13. Note that at no instant is the AC current equal to zero (amps) for any substantial length of time. In other words the AC current is rigorously bipolar, crossing zero with a (relatively) sharp rate of change of current, at the instant of firing the positive (thyristor 1 and 2) or negative (thyristor 3 and 4) group of thyristors. The AC line current is rich in current harmonics, beginning from the third order (3 times the fundamental frequency) upwards. The total harmonic current distortion is approximately 45% (at least, theoretically), with the third harmonic reaching up to 33% of fundamental current. Harmonic filters are the predominant technique used for reducing the THID to acceptable levels in an AC network (adherence to IEEE 519).

Figure 14:
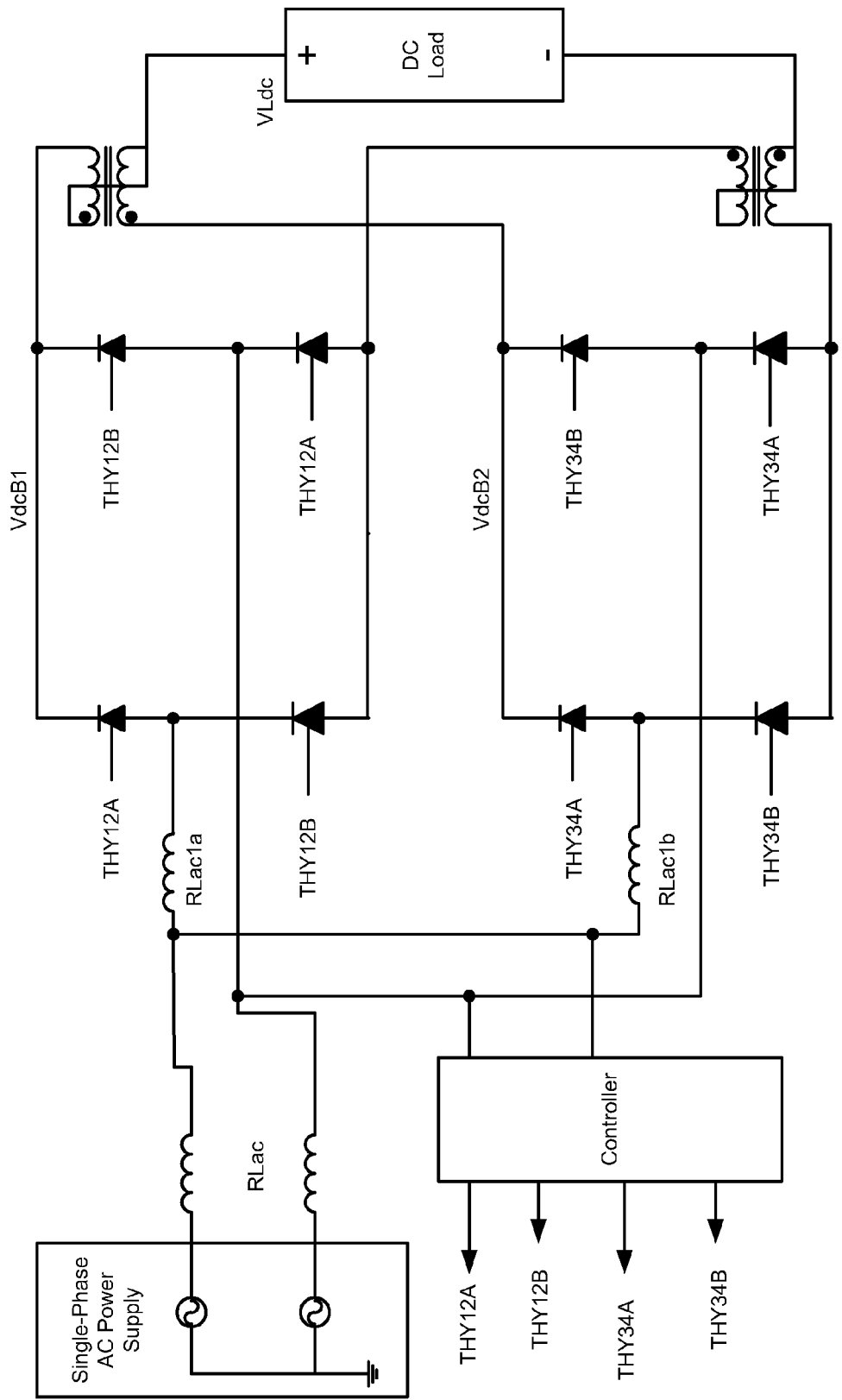
FIG. 14 is a schematic diagram illustrating a single-phase converter according to one embodiment.

According to some embodiments, multiple converters are utilized, connected in parallel, and fired in a sequence to achieve a reduction in harmonic currents that would otherwise normally be generated in prior art. FIG. 14 is a schematic diagram illustrating a single-phase converter according to one embodiment of the invention. Referring to FIG. 14, two single-phase bridges are connected in parallel. Note that more bridges can also be connected in parallel to achieve further harmonic reduction. The positive groups of thyristors, in both bridges, are considered to be thyristor 1 and 2. These thyristors fire, at an alpha delay angle, only during the positive half of the power frequency sine wave. Alpha, as described before, can range, theoretically, approximately between 0 to 180 degrees delay from the anode-cathode voltage crossing.

In one embodiment, thyristor 1 and 2 are fired at the same time (as can be seen their gate signals are tied) to provide a path for the positive half cycle of current. The negative groups of thyristors, in both bridges, are considered to be thyristor 3 and 4. They fire, at an alpha delay angle, only during the negative half of the power frequency sine wave. Thyristor 3 and 4, in a single bridge, are fired at the same time. As can be observed in FIGS. 14 and 15A-15B, their gate signals are tied within a bridge. The AC current harmonics are reduced by firing the group of thyristors (positive or negative) from the pair of bridges symmetrically about an average alpha delay angle.

Figure 15A:
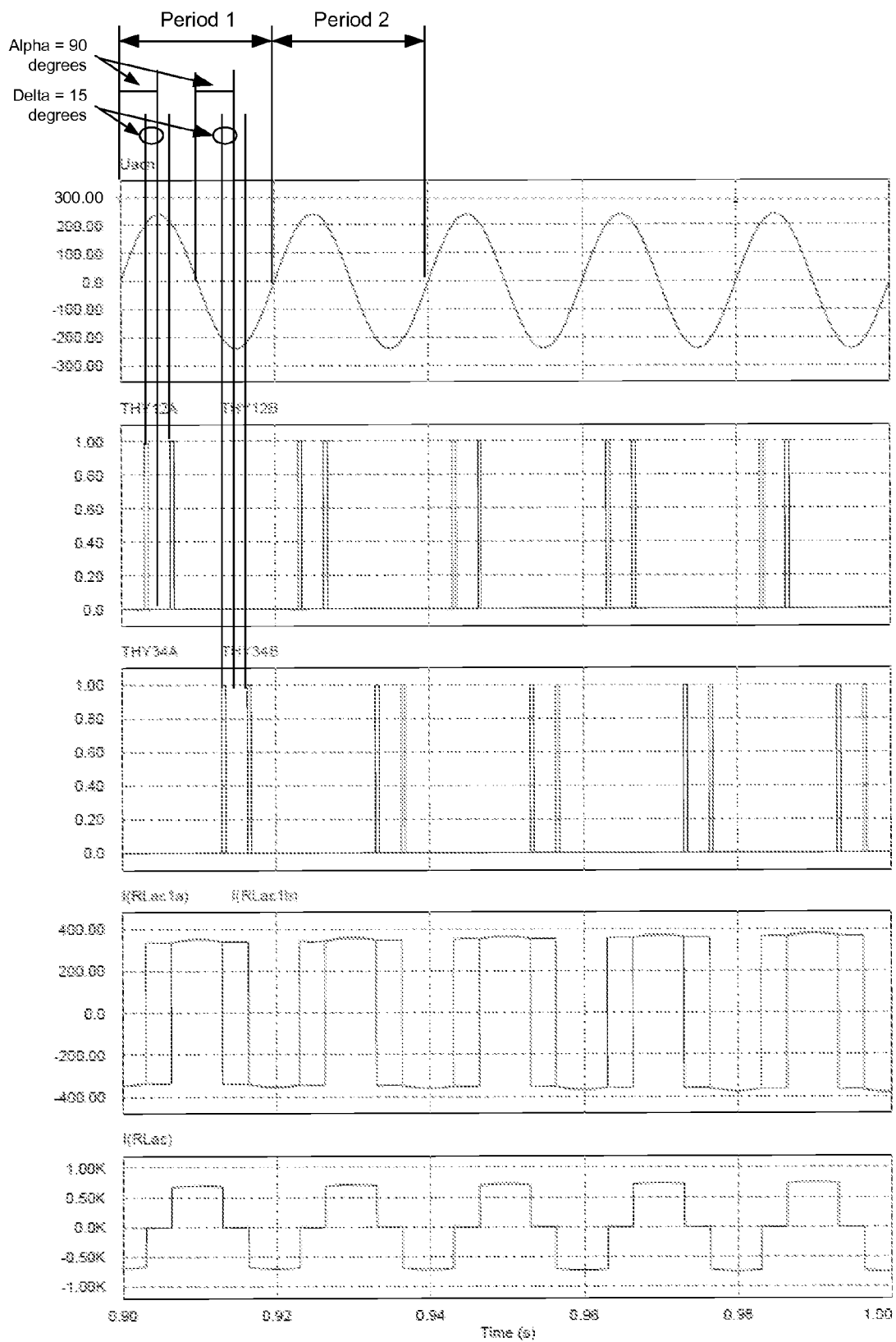
FIGS. 15A and 15B are diagrams illustrating waveforms of certain nodes for the circuit shown in FIG. 14.
Figure 15B:
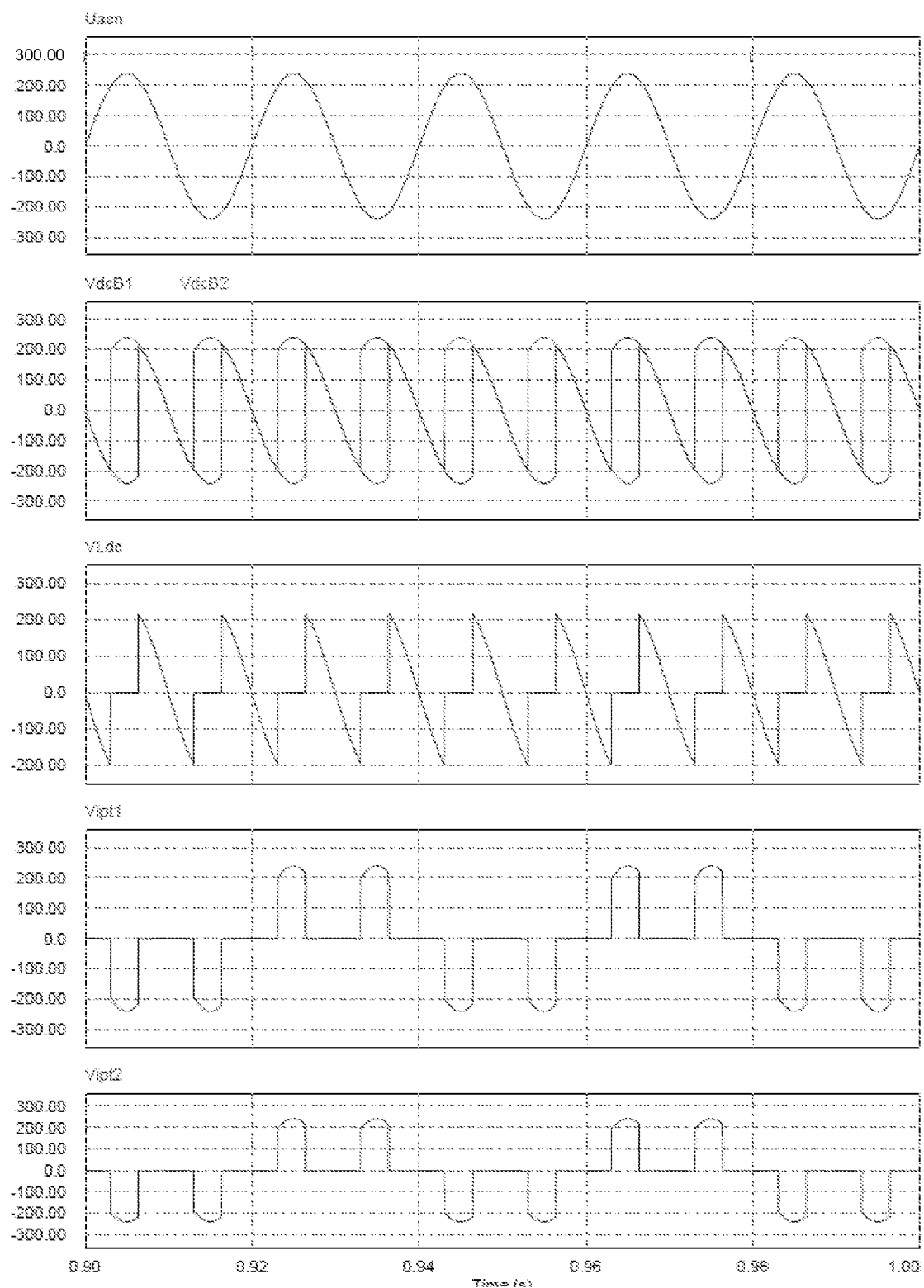

In a single power cycle, according to one embodiment, the same group in each bridge may be fired symmetrically about an average common alpha delay angle. In other words, in the first power cycle, the positive group of thyristors of bridge A are fired at delay ($\alpha+\Delta\alpha$) and the positive group of thyristors of bridge B are fired at delay ($\alpha-\Delta\alpha$). In the second power cycle, the delay angles are reversed between the two groups of thyristors. In the second power cycle the positive group of thyristors of bridge A are fired at delay ($\alpha-\Delta\alpha$) and the positive group of thyristors of bridge B are fired at delay ($\alpha+\Delta\alpha$). In the third power cycle the positive group of thyristors of bridge A are fired at delay ($\alpha+\Delta\alpha$) and the positive group of thyristors of bridge B are fired at delay ($\alpha-\Delta\alpha$). The third power cycle firing delay is exactly the same as the first power cycle, so the pattern can be considered to repeat itself at this point. The combined AC current of the two bridges results in a quasi-square waveform. The conduction time of the waveform is dependent on the $\Delta\alpha$ chosen. For a $\Delta\alpha=15$ degrees a conduction time of 120 degrees results. The total harmonic distortion of such a waveform is reduced to (theoretically) around 30%, as shown in FIGS. 15A and 15B.

Figure 16:
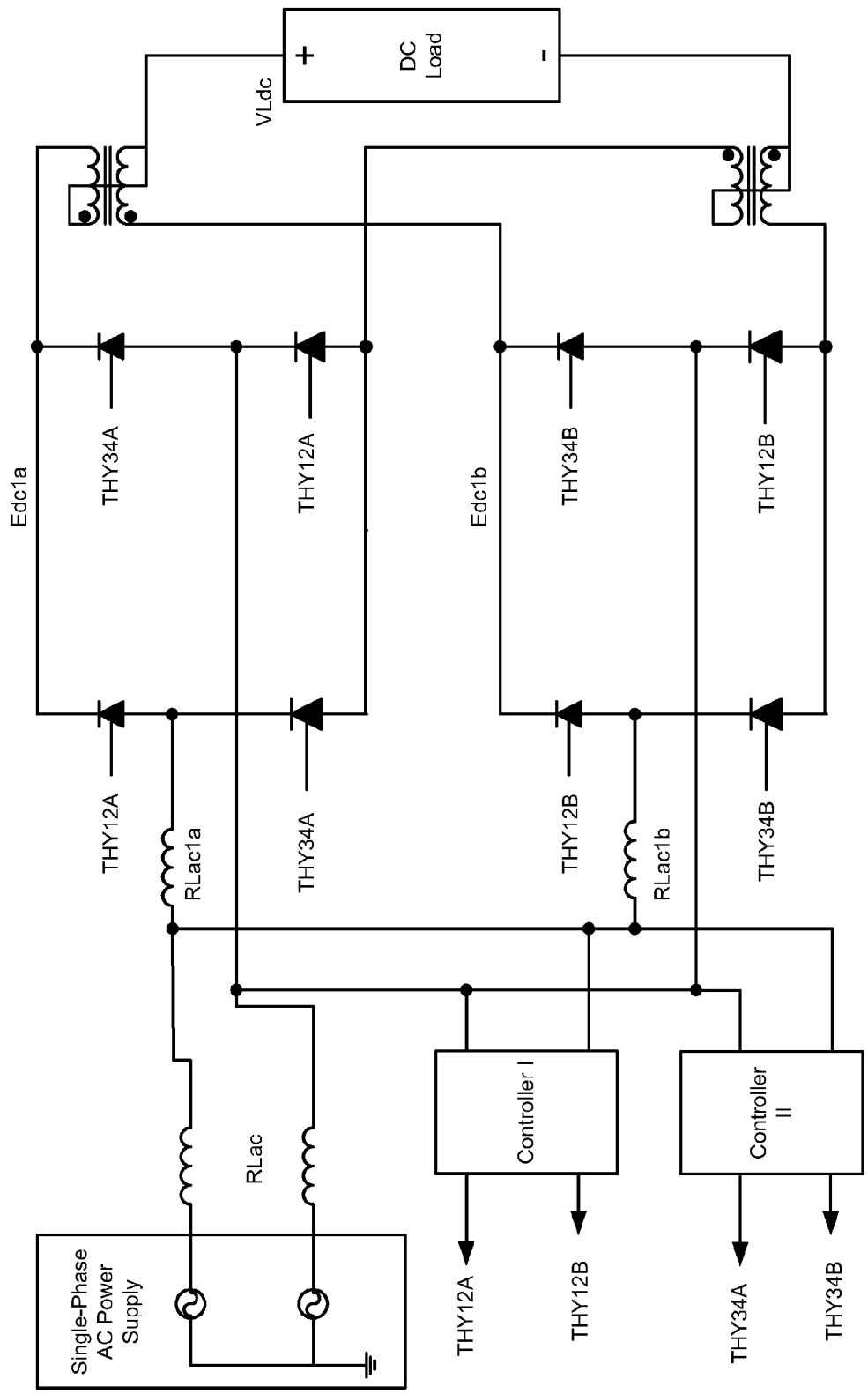
FIG. 16 is a schematic diagram illustrating a single-phase converter according to another embodiment.
Figure 17A:
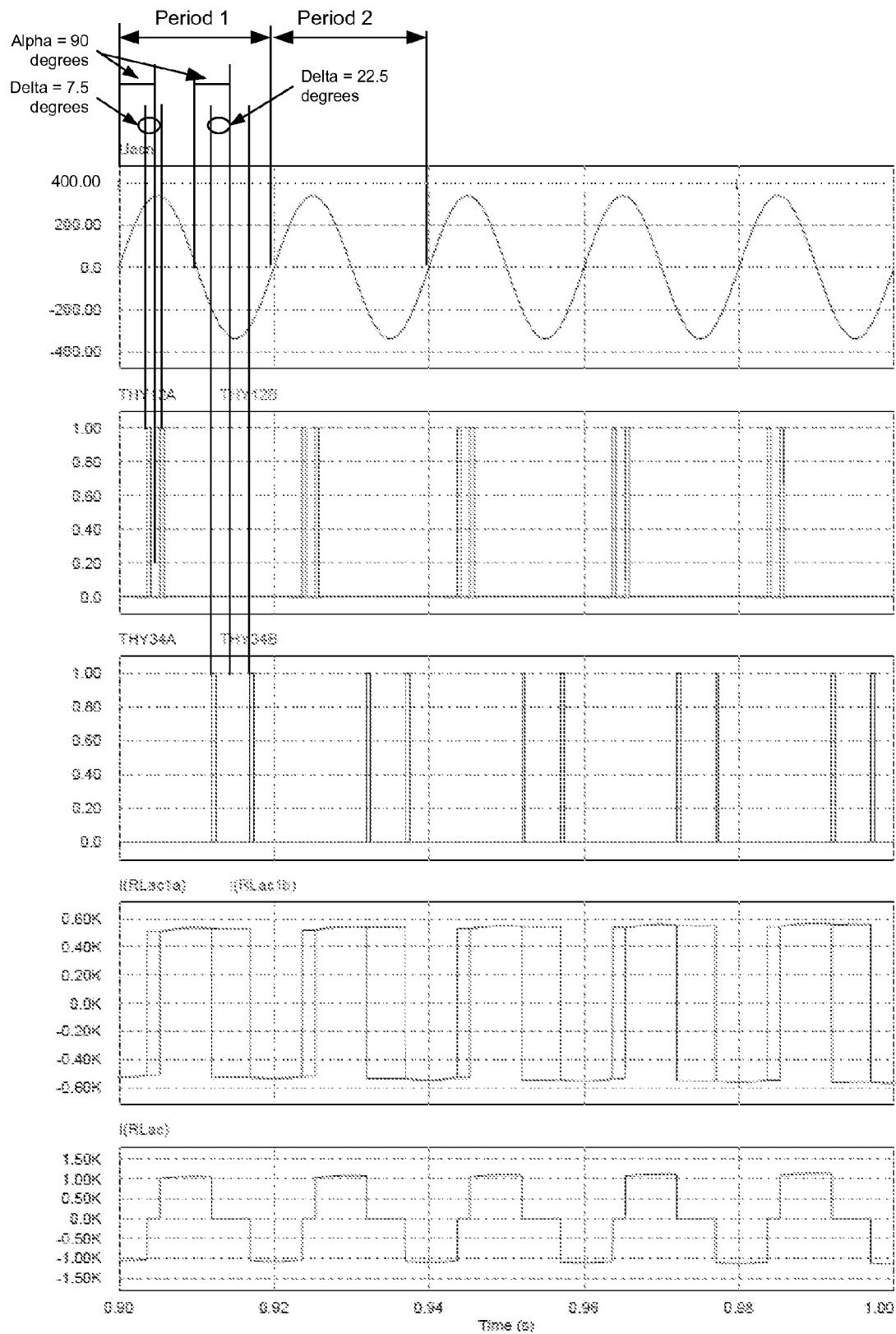
FIGS. 17A and 17B are diagrams illustrating waveforms of certain nodes for the circuit shown in FIG. 16.
Figure 17B:
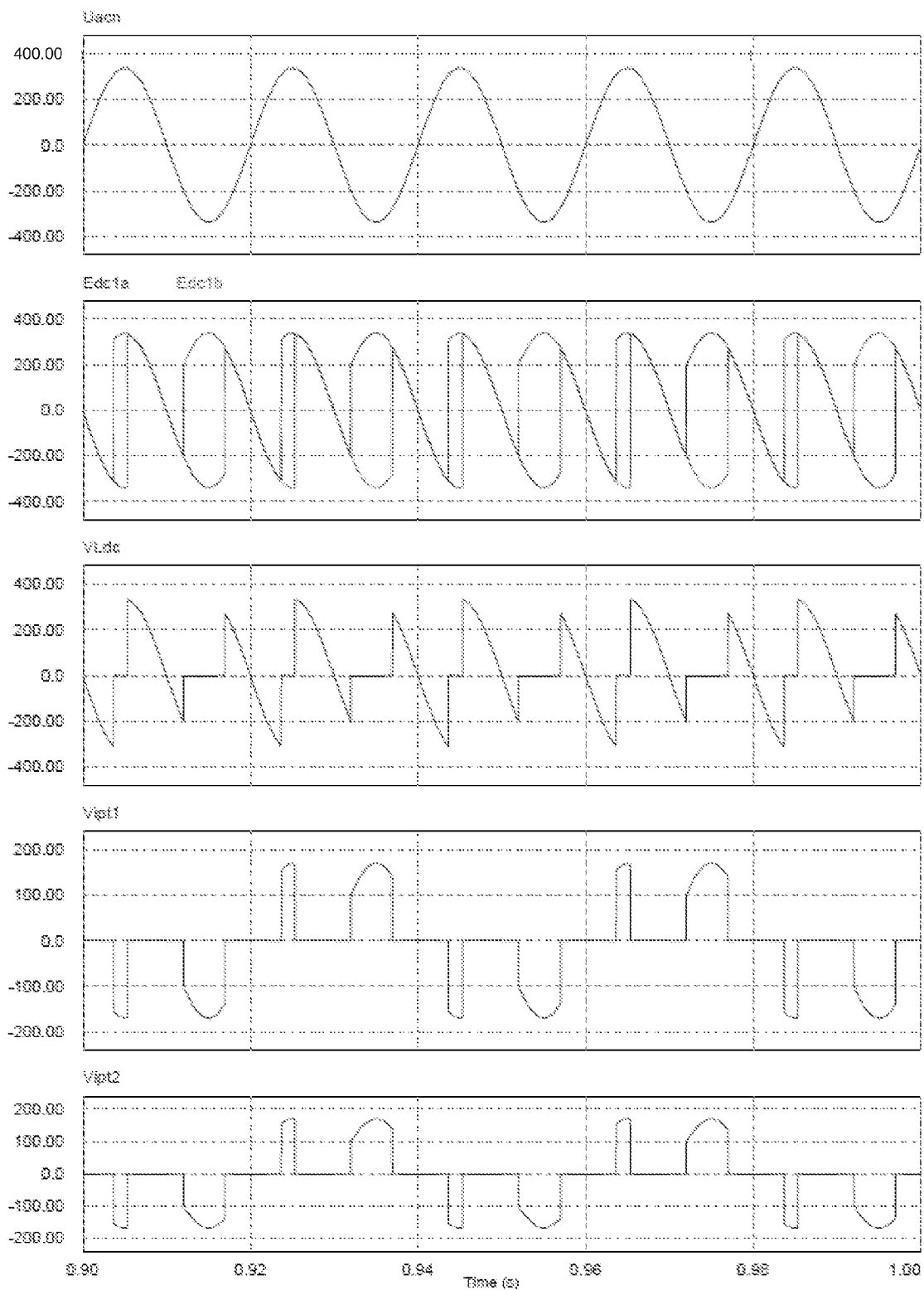

Further, the $\Delta\alpha$ chosen for the positive group of thyristors is allowed to be different (greater or less) than the $\Delta\alpha$ chosen for the negative group. FIG. 16 is a schematic diagram illustrating a converter according to another embodiment of the invention. This will result in an AC quasi square current waveform that is advanced (or delayed) in the positive half cycle of the power cycle, and delayed (or advance) in the negative half cycle of the power cycle, as shown in FIGS. 17A and 17B.

Figure 18:
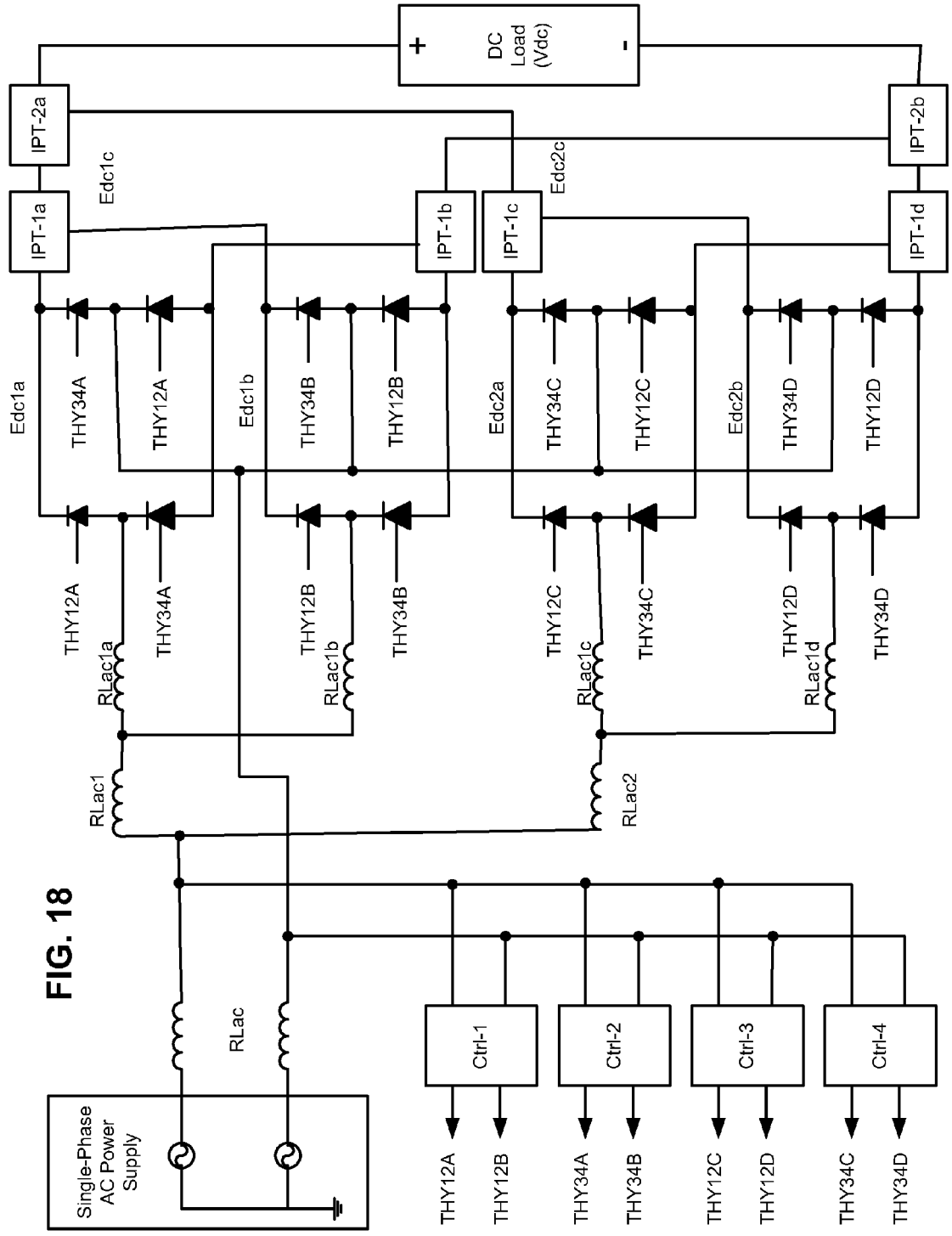
FIG. 18 is a schematic diagram illustrating a single-phase converter according to another embodiment.
Figure 19A:
FIGS. 19A-19C are diagrams illustrating waveforms of certain nodes for the circuit shown in FIG. 18.
Figure 19B:
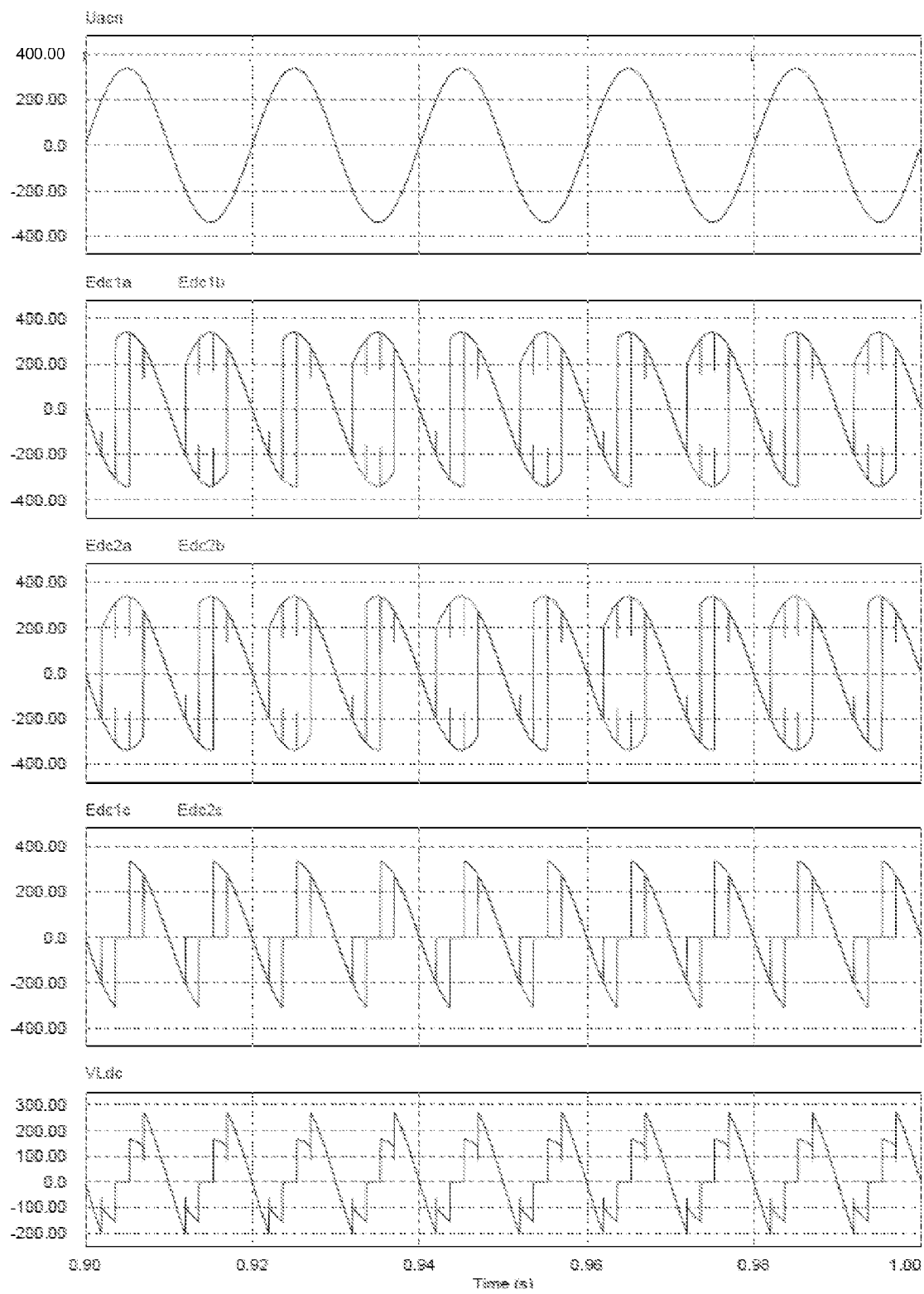
Figure 19C:
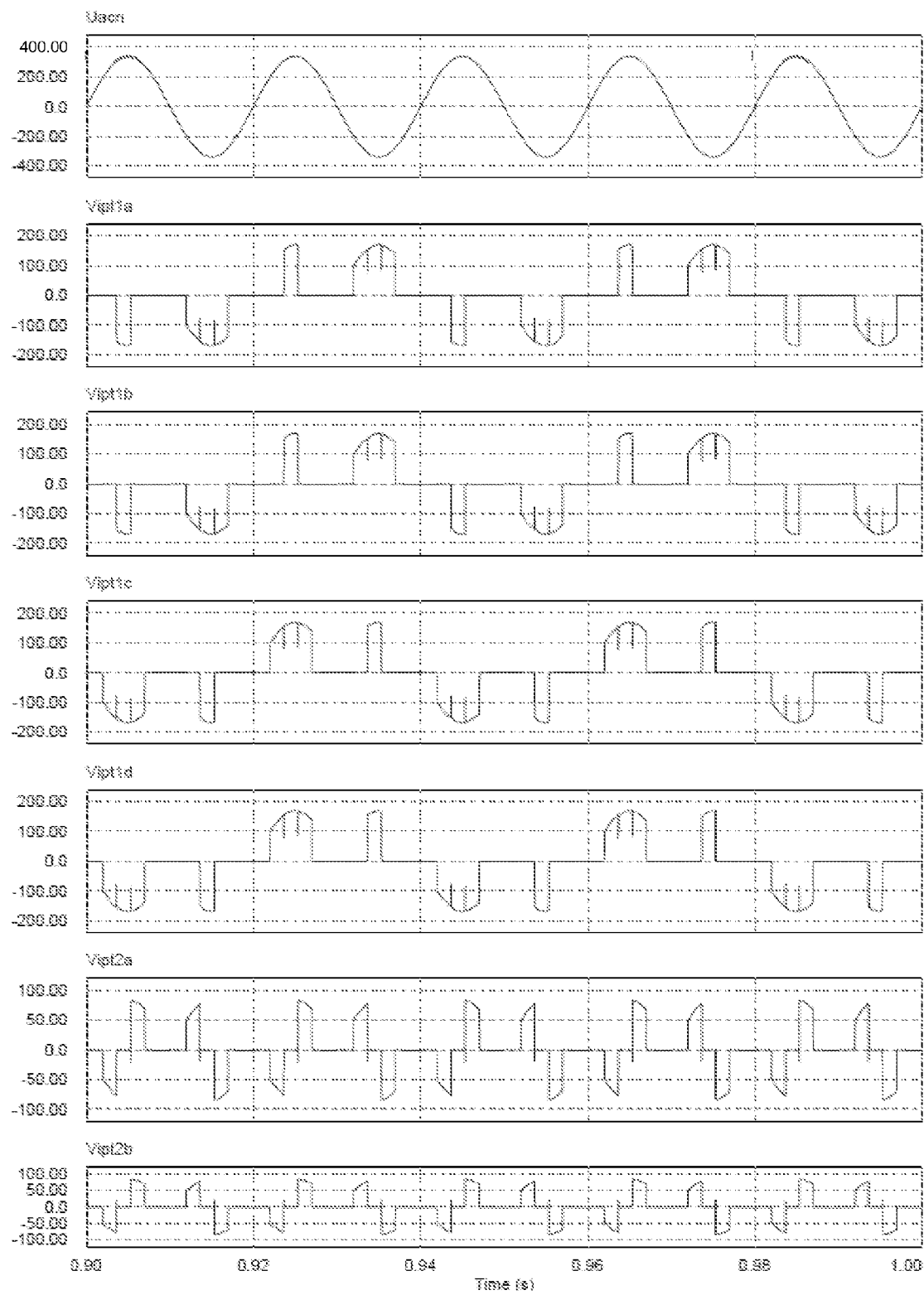

By combining multiple pairs or bridges with this arrangement of firing, according to one embodiment, the combined AC current distortion can be reduced further. FIG. 18 is a schematic diagram illustrating a converter according to another embodiment of the invention. Referring to FIG. 18, in this example, there are four bridges (or two pairs) and the THD reduces to about 14%, as shown in FIGS. 19A-19C. It will be appreciated that more paralleled bridges may reduce the current distortion further.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An alternating current (AC) power conversion system, comprising:
    a first AC/DC converter to be coupled to a direct current (DC) load and a multi-phase AC power supply, the first AC/DC converter having a plurality of rectifiers including a first positive group of rectifiers and a first negative group of rectifiers;

a second AC/DC converter coupled in parallel with the first AC/DC converter via an interphase transformer to the DC load and the multi-phase AC power supply, the second AC/DC converter having a plurality of rectifiers including a second positive group of rectifiers and a second negative group of rectifiers, wherein each of the rectifiers in the first positive group and the second positive group is coupled in series with a separate winding of a first inter-phase transformer, and wherein each of the rectifiers in the first negative group and the second negative group is coupled in series with a separate winding of a second inter-phase transformer; and a controller coupled to the first and second AC/DC converters, wherein the controller is configured to generate a gate trigger signal for firing each of the rectifiers for the first and second AC/DC converters, wherein during a first power cycle, a rectifier of the first AC/DC converter is fired at a firing angle advanced to a firing angle of a corresponding rectifier of the second DC/DC converter, and wherein during a second power cycle, the rectifier of the first AC/DC converter is fired at a firing angle lagging to a firing angle of the corresponding rectifier of the second AC/DC converter.

2. The system of claim 1, wherein the corresponding rectifiers of the first and second AC/DC converters are fired at firing angles with an advanced (subtracted) or delayed (added) offset ($\Delta\alpha$) to a nominal firing angle ($\alpha$) in an alternate manner during different power cycles.

3. The system of claim 2, wherein during the first power cycle, the rectifier of the first AC/DC converter is fired at a firing angle of ($\alpha-\Delta\alpha$) and the corresponding rectifier of the second AC/DC converter is fired at a firing angle of ($\alpha+\Delta\alpha$), and wherein during the second power cycle, the rectifier of the first AC/DC converter is fired at a firing angle of ($\alpha+\Delta\alpha$) and the corresponding rectifier of the second AC/DC converter is fired at a firing angle of ($\alpha-\Delta\alpha$).

4. The system of claim 3, wherein the offset ($\Delta\alpha$) is configured to be 15 degrees.

5. The system of claim 3, wherein each of the first and second AC/DC converters includes six rectifiers coupled to each other forming a bridge.

6. The system of claim 5, wherein the controller is configured to generate 12 gate trigger signals to six rectifiers of the first AC/DC converter and six rectifiers of the second AC/DC converter in an asymmetrical manner.

7. The system of claim 6, wherein the six rectifiers of the first AC/DC converter and the six rectifiers of the second AC/DC converters coupled to form six pairs of corresponding rectifiers.

8. The system of claim 7, wherein for each pair of rectifiers of the first and second AC/DC converters different power cycles, firing angles are substantially equally, but oppositely offset from the nominal control angle in an alternated manner.

9. The system of claim 1, wherein a net current of the first and second converters has a greater number of component pulses than an individual AC/DC converter operating alone.

10. The system of claim 9, wherein corresponding AC harmonic current components of the first and second AC/DC converters are reduced, and wherein at least a portion of higher order harmonics in the net current is at least partially cancelled.

11. The system of claim 1, wherein the rectifiers include at least one controllable thyristor.

12. An alternating current (AC) power conversion system, comprising:

at least two AC power converter circuits for coupling respective loads in parallel to a multi-phase AC power supply, each AC power converter circuit including a plurality of rectifiers for passing respective phases of the AC power supply in turn at respective firing angles, wherein a first of the AC power converter circuit includes a first positive group of rectifiers and a first negative group of rectifiers, and wherein a second of the AC power converter circuit includes a second positive group of rectifiers and a second negative group of rectifiers;

a controller coupled to the at least two AC power converter circuits for symmetrically controlling the rectifiers of the at least two AC power converter circuits, such that the firing angles for the at least two AC power converter circuits are substantially equally, but oppositely offset from a nominal control angle, wherein a net current of the at least two AC power converter circuits has a greater number of component pulses than an individual AC power converter operating alone; and an interphase transformer coupling the at least two AC power converter circuits such that circulating currents between two or more positive nodes and two or more negative nodes are limited to a low percentage of maximum DC current, wherein a portion of higher order harmonics in the net current are at least partially cancelled, wherein the interphase transformer includes a first interphase transformer and a second interphase transformer, wherein each of the rectifiers in the first positive group and the second positive group is coupled in series with a separate winding of a first inter-phase transformer, and wherein each of the rectifiers in the first negative group and the second negative group is coupled in series with a separate winding of a second inter-phase transformer.

13. The system of claim 12, wherein the corresponding rectifiers of the at least two AC power converter circuits are fired at firing angles with an advanced or lagging offset ($\Delta\alpha$) to a nominal firing angle ($\alpha$) in an alternate manner during different power cycles.

14. The system of claim 13, wherein during the first power cycle, the rectifier of a first of the at least two AC power converter circuits is fired at a firing angle of ($\alpha-\Delta\alpha$) and the corresponding rectifier of a second of the at least two AC power converter circuits is fired at a firing angle of ($\alpha+\Delta\alpha$), and wherein during the second power cycle, the rectifier of the first of the at least two AC power converter circuits is fired at a firing angle of ($\alpha+\Delta\alpha$) and the corresponding rectifier of the second of the at least two AC power converter circuits is fired at a firing angle of ($\alpha-\Delta\alpha$).

15. The system of claim 14, wherein the offset ($\Delta\alpha$) is configured to be 15 degrees.

16. The system of claim 14, wherein each of the at least two AC power converter circuits includes six rectifiers coupled to each other forming a bridge.

17. The system of claim 16, wherein the controller is configured to generate 12 gate trigger signals to six rectifiers of the first of the at least two AC power converter circuits and six rectifiers of the second of the at least two AC power converter circuits in a symmetrical manner.

\* \* \* \* \*